United States Patent
Inoue et al.

(10) Patent No.: US 7,325,148 B2
(45) Date of Patent: Jan. 29, 2008

(54) POWER SUPPLY MANAGEMENT SYSTEM IN PARALLEL PROCESSING SYSTEM BY OS FOR SINGLE PROCESSORS AND POWER SUPPLY MANAGEMENT PROGRAM THEREFOR

(75) Inventors: Hiroaki Inoue, Tokyo (JP); Yoshiyuki Ito, Tokyo (JP); Junji Sakai, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 10/853,656

(22) Filed: May 26, 2004

(65) Prior Publication Data

US 2004/0268171 A1 Dec. 30, 2004

(30) Foreign Application Priority Data

May 27, 2003 (JP) .............................. 2003-149859

(51) Int. Cl.
G06F 1/00 (2006.01)
G06F 1/26 (2006.01)
G06F 1/32 (2006.01)

(52) U.S. Cl. ...................... 713/300; 713/320; 713/323; 713/330

(58) Field of Classification Search ................ 713/500, 713/300, 320, 323
See application file for complete search history.

(56) References Cited

U.S. PATENT DOCUMENTS

| | | | |
|---|---|---|---|
| 4,954,945 A * | 9/1990 | Inoue | 718/105 |
| 5,142,684 A | 8/1992 | Perry et al. | |
| 5,790,817 A * | 8/1998 | Asghar et al. | 710/311 |
| 5,940,785 A * | 8/1999 | Georgiou et al. | 702/132 |
| 5,951,683 A * | 9/1999 | Yuuki et al. | 713/1 |
| 6,141,762 A * | 10/2000 | Nicol et al. | 713/300 |
| 6,192,391 B1 * | 2/2001 | Ohtani | 709/201 |
| 6,745,335 B1 | 6/2004 | Kusano | |
| 7,065,641 B2 * | 6/2006 | Schelling | 713/2 |
| 2003/0037268 A1 | 2/2003 | Kistler | |

FOREIGN PATENT DOCUMENTS

| | | |
|---|---|---|
| JP | 03-113563 | 5/1991 |
| JP | 03-257652 | 11/1991 |
| JP | 2001-109729 A | 4/2001 |
| JP | 2002-099433 A | 4/2002 |
| JP | 2003-058515 | 2/2003 |
| WO | WO 98/01803 | 1/1998 |

* cited by examiner

Primary Examiner—Rehana Perveen
Assistant Examiner—Michael J. Brown
(74) Attorney, Agent, or Firm—Foley & Lardner LLP

(57) ABSTRACT

In a parallel processing system by an OS for single processors which operates an OS and an existing application for single processors on a multiprocessor to realize parallel processing by the multiprocessor with respect to the application, a processor on a first processor side receives a request for activating or stopping a processor from a unit of work on any of the processors and controls a power supply management device of the OS for single processors to conduct activation or stop of the requested processor, while the processor requested to be activated or stop executes processing necessary for the activation or stop based on a notification from the first processor side.

31 Claims, 38 Drawing Sheets

FIG.19 (DOWN OPERATION BY SEMAPHORE)

FIG. 20 (UP OPERATION BY SEMAPHORE SYSTEM IN THE SAME PROCESSOR)

FIG.21 (UP OPERATION BY SEMAPHORE SYSTEM BETWEEN DIFFERENT PROCESSORS)

FIG. 22 (MESSAGE RECEPTION OPERATION BY MESSAGE QUEUE SYSTEM)

FIG. 26 (MESSAGE TRANSMISSION OPERATION BY MESSAGE QUEUE SYSTEM BETWEEN DIFFERENT PROCESSORS)

POWER SUPPLY MANAGEMENT SYSTEM IN PARALLEL PROCESSING SYSTEM BY OS FOR SINGLE PROCESSORS AND POWER SUPPLY MANAGEMENT PROGRAM THEREFOR

BACKGROUND OF THE INVENTION

1. Field of the Invention

The present invention relates to a power supply management system in a parallel processing system by a multiprocessor and, more particularly, to a power supply management system in a parallel processing system by an OS for single processors capable of operating an OS and an existing application for single processors on a multiprocessor to enable the application to realize parallel processing by the multiprocessor.

2. Description of the Related Art

In data processing devices such as mobile terminals including a mobile phone and a mobile PC, an operating system for single processors (hereinafter referred to as an OS for single processors) and an application for single processors (hereinafter simply referred to as an application) are basically executed on a single processor.

Under these circumstances, when using the above-described application without modification on a multiprocessor basis, the application should be executed on an OS for multiprocessors in place of the above-described OS for single processors.

Among such systems which control execution of an OS for multiprocessors and an application on a multiprocessor system as described above are, for example, the conventional art disclosed in Japanese Patent Laying-Open (Kokai) No. Heisei 3-257652 and Japanese Patent Laying-Open (Kokai) No. Heisei 3-113563.

Japanese Patent Laying-Open (Kokai) No. Heisei 3-257652 (Literature 1) discloses a method of controlling interruptions between processor elements in a multiprocessor system composed of a plurality of processor elements.

Japanese Patent Laying-Open (Kokai) No. Heisei 3-113563 (Literature 2) discloses a method of scheduling processes to be assigned to a plurality of processors in a multiprocessor system.

On the other hand, Japanese Patent Laying-Open (Kokai) No. 2003-058515 (Literature 3) discloses a method of executing an individual process in a plurality of processor elements.

When operating an existing application on an OS for multiprocessors as in conventional art, however, the OS for multiprocessors provides services for multiprocessors even when the application uses only one among a plurality of processors, or continues processing mutually exclusive of other processors even when no other application operates, so that the extra processing causes overheads, or another problem might occur that modifying the above-described application so as to be used in multiprocessors requires enormous labor and costs.

In particular, when realizing a parallel processing system by a multiprocessor in small-sized data processing devices such as mobile terminals including a mobile phone and a mobile PC, overheads in processing of an OS for multiprocessors and modification of an application become hindrances.

Under these circumstances, when an application is used without modification on an existing OS for single processors, demanded is realization of a parallel processing system capable of operating an existing application on a multiprocessor.

Furthermore, when realizing a parallel processing system by a multiprocessor in small-sized data processing devices such as mobile terminals including a mobile phone and a mobile PC, power supply management is indispensable in order to reduce power consumption as much as possible.

In power supply management in a conventional parallel processing system by an OS for multiprocessors, because power supply management is conducted with a functionally symmetric power supply management unit provided in each processor, state of power supply of each processor needs to be seized and managed among all the processors. Therefore, when changing a state of power supply such as starting or stopping a specific processor, mutually exclusive control should be conducted among processors in order to maintain consistency in the system as a whole, resulting in making control complicated.

In such a system as operating an OS for single processors on each processor of a multiprocessor, application of complicated power supply management of a parallel processing system by an OS for multiprocessors requires drastic modification of the OS for single processors itself to involve labor and costs, while making execution of parallel processing by the multiprocessor meaningless because of extremely complicated control as bottleneck.

Among conventional art of conducting power supply management by a multiprocessor is a technique disclosed in U.S. Pat. No. 5,142,684 (Literature 4), for example. In the power supply management recited in Literature 4, with two kinds of processors whose processing speeds are different provided, a processor is selected according to processing to be executed and power necessary for the selected processor is controlled and supplied. The technique recited in Literature 4 is to conduct power supply control for two kinds of processors having different capabilities, which requires dedicated hardware and takes into consideration of none of such systems of operating an OS for single processors on each processor of a multiprocessor.

SUMMARY OF THE INVENTION

An object of the present invention is to provide a power supply management system and a power supply management program enabling power supply management of a processor to be realized with simple control on a parallel processing system by an OS for single processors which operates an OS and an existing application for single processors on a multiprocessor without modifying them to enable the existing application to realize parallel processing by the multiprocessor.

According to the first aspect of the invention, a power supply management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, the processor on the first processor side accepts a request for activating or stopping a processor from a unit of work on any of the processors and controls a device of the OS for single processors to activate or stop the requested processor, and the processor requested to be activated or stop executes processing necessary for the activation or stop based on a notification from the first processor side.

In the preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit.

In another preferred construction, the request for activation or stop of the processor is a boot request or a halt request.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit, wherein the request for activation or stop of the processor is a boot request or a halt request.

In another preferred construction, the power supply management system in a parallel processing system by an OS for single processors comprises a main power supply management unit which is mounted, as a device of the OS for single processors, on the OS for single processors on the first processor side to manage a state of power supply of the second processor, as well as using a predetermined request for device management provided in advance in the OS for single processors as a request for power supply management to make a request for changing a state of power supply, and a sub power supply management unit provided in the OS for single processors on the second processor side to execute processing necessary for the activation or stop, as well as transmitting an activation message to the main power supply management unit at the time of activation.

In another preferred construction, a plurality of the main power supply management units are provided corresponding to the respective processors on the second processor side.

In another preferred construction, a probe or remove request which is a predetermined request for device management is read as the request for activation or stop of the processor.

In another preferred construction, a plurality of the main power supply management units are provided corresponding to the respective processors on the second processor side, and a probe or remove request which is a predetermined request for device management is read as the request for activation or stop of the processor.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, on the second processor side, a sub power supply management unit having a function of executing processing necessary for the activation or stop and a function of making a request for activation or stop of other processor to the main power supply management unit, and an inter-process communication unit provided in the processor on the first processor side and in the processor on the second processor side to enable synchronous processing and data transmission and reception between units of work on the processor on the first processor side and on the processor on the second processor side, wherein the inter-process communication unit executes synchronous processing for power supply management between the main power supply management unit and the sub power supply management unit.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit, the main power supply management unit and the sub power supply management unit being incorporated as a module.

In another preferred construction, when the processor to which the request for activation or stop is made is on the way to activation or on the way to stopping, the request is queued until the on the way to activation or stopping state is fixed.

In another preferred construction, when the processor to which the request for activation or stop is made is on the way to activation or on the way to stopping, the request is ignored.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit, wherein in making the processor activation request, the main power supply management unit having received the request activates the requested processor, as well as receiving a notification of completion of activation from the sub power supply management unit of the activated processor to change the state of power supply of the activated processor to an activated state.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit, wherein in making the processor stop request, the main power supply management unit having received the request requests the sub power supply management unit of the requested processor to execute processing necessary for stopping, and receives a notification of completion of the processing from the processor to stop the requested processor and change the state of power supply of the activated processor to a stopped state.

In another preferred construction, the power supply management system in a parallel processing system by an OS for single processors comprises on the first processor side, a main power supply management unit having a function, regarding power supply management of each processor, of managing a state of power supply of the second processor and a function of making a request for changing a power supply state to the OS for single processors, and on the second processor side, a sub power supply management unit having a function of executing processing necessary for the activation or stop and a function of making a request for activation or stop of other processor to the main power supply management unit, wherein in making a request for stopping all the processors, the main power supply management unit having received the request requests the sub power supply management unit of other processor to execute processing necessary for stopping, and receives a notification of completion of the processing from the other processor to stop the other processor and thereafter controls the device of the OS for single processors to stop the processor to which the unit belongs.

In another preferred construction, in addition to activation or stop of a processor, a request for halting or returning a processor is received to control the device of the OS for single processors, thereby halting or returning the requested processor, and a processor requested to make the halt or return executes processing necessary for the halt or return based on a notification from the first processor side.

In another preferred construction, in addition to activation or stop of a processor, a request for changing a power supply voltage or a clock frequency of a processor is received to control the device of the OS for single processors, thereby changing the power supply voltage or the clock frequency of the requested processor, and the processor requested to have the power supply voltage or clock frequency changed executes processing necessary for changing the power supply voltage or clock frequency based on a notification from the first processor side.

According to another aspect of the invention, a power supply management program in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, the processor on the first processor side accepts a request for activating or stopping a processor from a unit of work on any of the processors and controls a device of the OS for single processors to execute a function of activating or stopping the requested processor, and the processor requested to be activated or stop executes a function of executing processing necessary for the activation or stop based on a notification from the one processor.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, description will be made of a parallel processing system to which a power supply management system according to the present invention is applied. In the parallel processing system which will be described in the following, parallel processing is executed on a multiprocessor by adding a mechanism for asking for processing with respect to a plurality of processors and a mechanism for protecting a critical section in the provision of OS services to a plurality of processors without adding any modification to a conventional OS for single processors.

Figure 1:
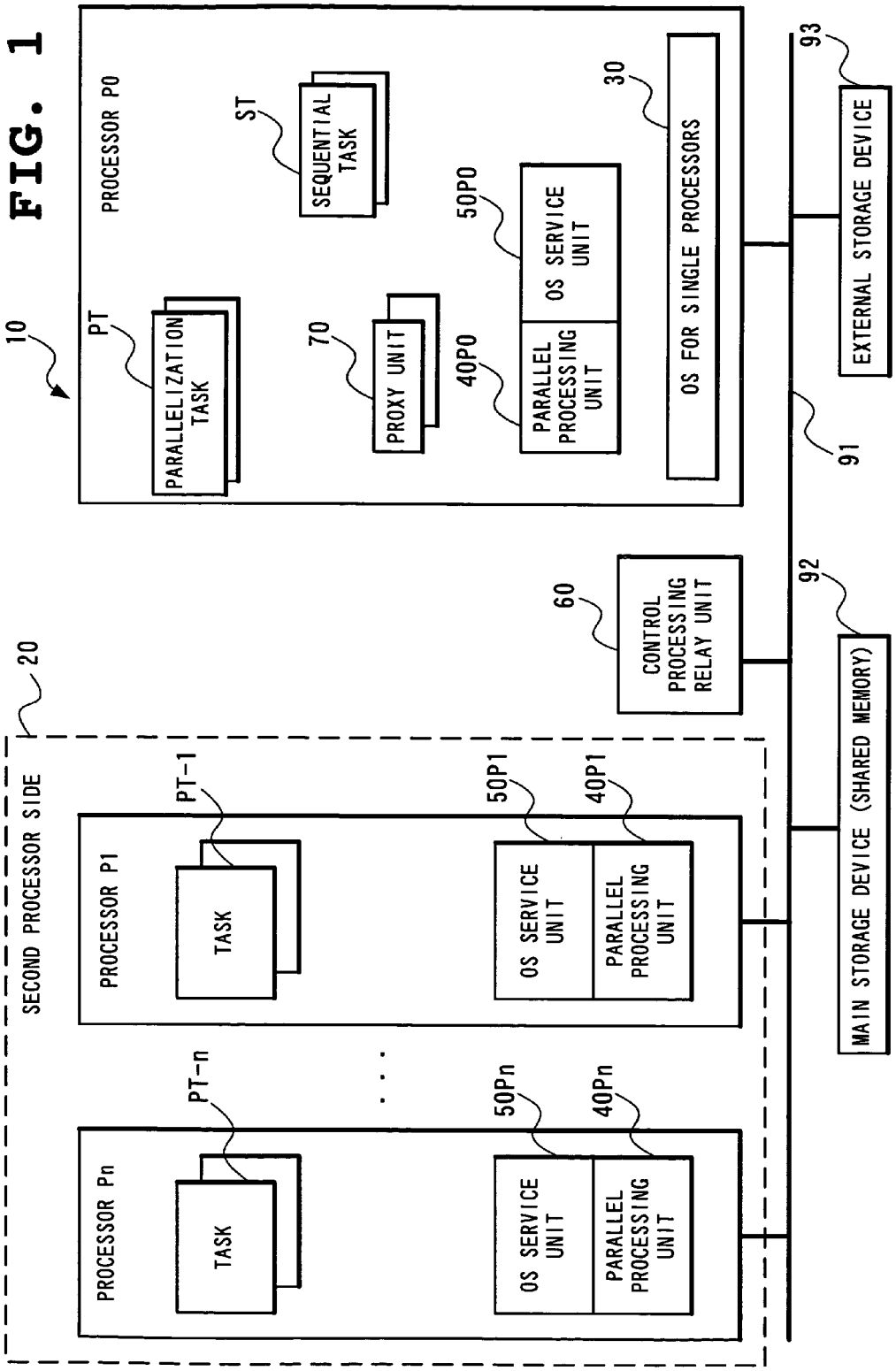
FIG. 1 is a block diagram showing a structure of a parallel processing system according to a first example of the present invention.

FIG. 1 is a block diagram showing a structure of a parallel processing system as a first example.

As shown in FIG. 1, the parallel processing system of the first example includes a multiprocessor composed of a plurality of processors (CPU) P0 to Pn (n is an integer not less than 1) connected through a system bus 91, which is logically divided into two groups of a first processor side 10 and a second processor side 20, with an OS 30 for single processors mounted which operates on the processor P0 on the first processor side 10 and with parallel processing units 40P0 to 40Pn for executing parallel processing and OS service units 50P0 to 50Pn for processing OS service mounted on the processor P0 on the first processor side 10 and the processors P1 to Pn on the second processor side 20, respectively. Connected to the system bus 91 are a main storage device 92 as a shared memory shared by the respective processors P0 to Pn and an external storage device 93 such as a disk device.

The above-described multiprocessor may be structured not only to include a plurality of processors of the same kind but also to include a plurality of processing devices of different kinds such as a DSP and a security engine.

Between the first processor side 10 and the second processor side 20, a control processing relay unit 60 is uniquely provided for transmitting and receiving a control signal and data and a proxy unit 70 is provided on the first processor side 10 through which the OS 30 for single processors communicates with a task executed on the second processor side 20.

The processor on the above-described first processor side 10 does not necessarily exist as a single processor but exist as a plurality of processors. It is possible, for example, that two processors are provided on the first processor side 10 and each is mounted with a different OS for single processors.

Used as the OS 30 for single processors activated by the processor on the first processor side 10 is an existing OS. For example, a real time OS and a UNIX (R) OS are used without modification.

Task used in this specification represents a unit of work for executing parallel processing of a process and a thread on a UNIX (R) OS, a task on a real time OS and the like.

In the parallel processing system of the present example, an application operates on the OS for single processors on the first processor side 10 and among the units of work of the application, a task (sequential task) which can not be parallelized is processed by the processor P0 on the first processor side 10 and a task which can be parallelized within the application is created as a new task on the second processor side 20 and parallel-processed.

The parallel processing unit 40P0 and the parallel processing units 40P1 to 40Pn have a function of performing creation, activation, stop, termination and deletion of a task and other control related to tasks. Here, the parallel processing unit 40P0 of the first processor side 10 conducts such processing as creation, activation, stop, termination and deletion of a task through the control processing relay unit 60 with respect to the parallel processing units 40P1 to 40Pn of the respective processors P1 to Pn on the second processor side 20. As to signal notification, it is processed bidirectionally from both the parallel processing unit 40P0 and the parallel processing units 40P1 to 40Pn.

The OS service unit 50P0 and the OS service units 50P1 to 50Pn have a function as an interface for conducting various kinds of accesses to an external apparatus and control of the same and an interface for conducting various kinds of accesses to a resource shared among tasks and control of the same.

The control processing relay unit 60 is a unit for transmitting and receiving a control signal and data between the first processor side 10 and the second processor side 20 and used in control between a plurality of tasks processed in parallel to each other by a plurality of processors.

The proxy unit 70 is associated with tasks (a part or all of them) executed on the second processor side 20 and is mounted for signal notification (notification of various kinds of control signals for controlling tasks) between the task on the second processor side 20 and the OS 30 for single processors.

In the following, detailed description will be made of operation of thus structured parallel processing system of the first example with reference to the drawings.

Assume here that the application operates on the OS for single processors on the first processor side 10 and among the units of work of the application, a unit to be processed by the processor P0 on the first processor side 10 is defined as a sequential task ST and a unit which is a task that can be parallelized within the application and is parallel-processed by the second processor side 20 as tasks PT-1 to PT-n is defined as a parallelization task PT.

Figure 2:
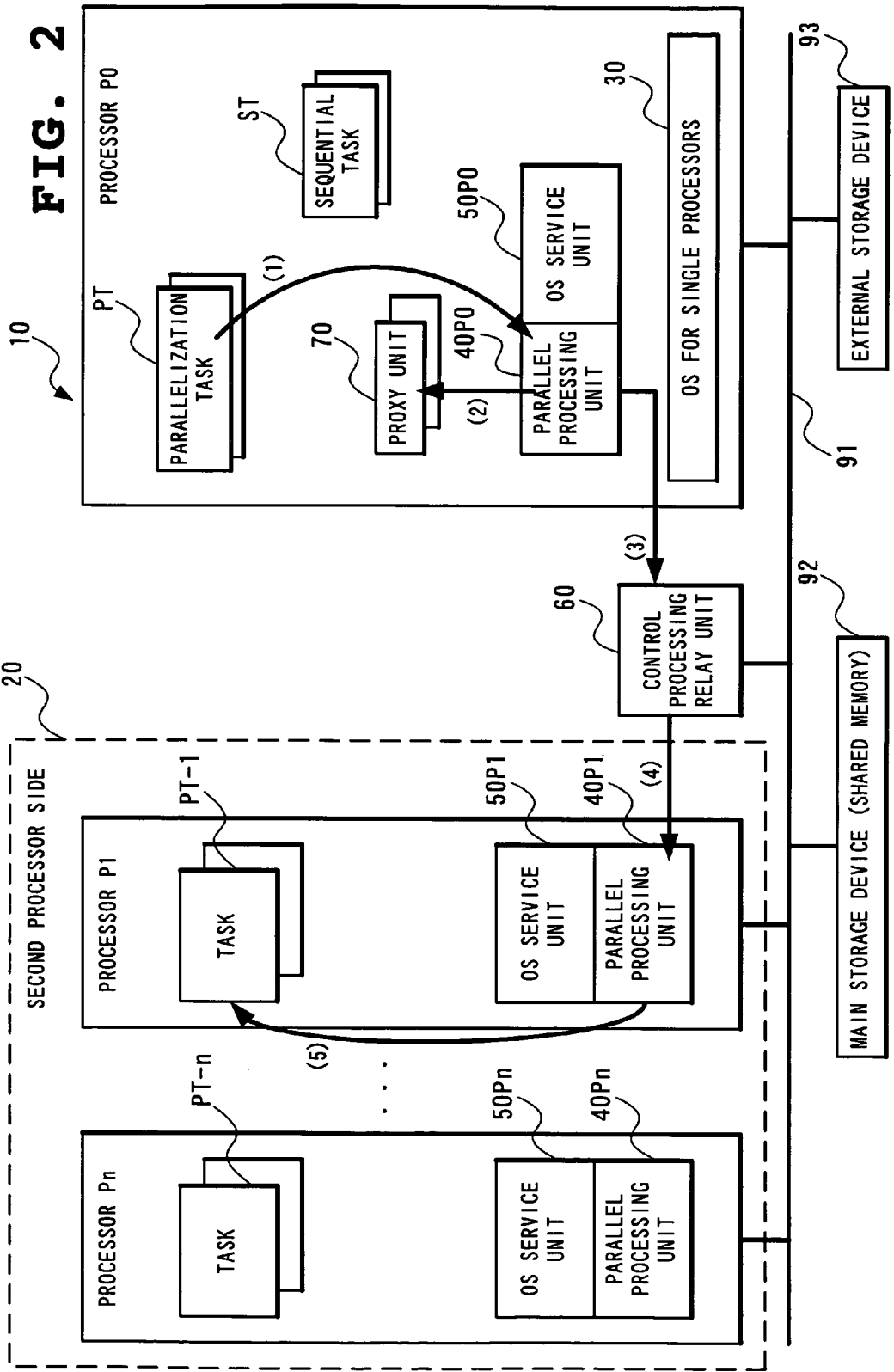
FIG. 2 is a diagram for use in explaining operation of activating parallel processing by a parallel processing unit in the parallel processing system according to the first example.

First, description will be made of operation of activating parallel processing by the parallel processing units 40P0 and 40P1 to 40Pn with reference to FIGS. 2 and 3.

(1) In a case of activating the parallelization task PT on the first processor side 10 as any of the tasks PT-1 to PT-n on the second processor side 20, command the parallel processing unit P40 to create any of the tasks PT-1 to PT-n as a unit of work to be activated on the second processor side 20.

Commands from the parallel processing unit 40P0 and the parallel processing units 40P1 to 40Pn include, for example, create (task creation), delete (task deletion), activate (task activation), terminate (task termination), signal (signal command), etc. Among those commands, create (task creation), delete (task deletion), activate (task activation) and terminate (task termination) are commands sent from the first processor side 10 to the second processor side 20 and signal (signal command) is sent bidirectionally both from the first processor side 10 and the second processor side 20.

Figure 3:
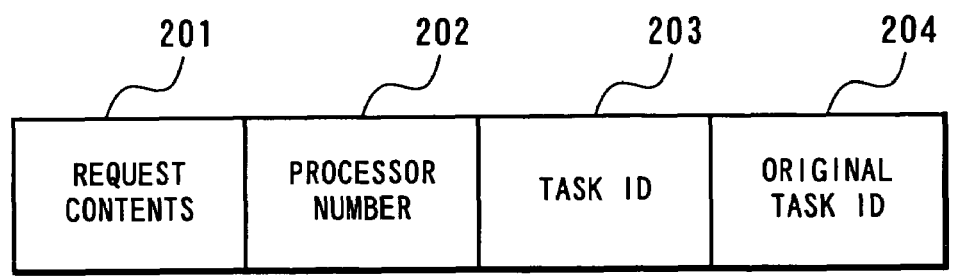
FIG. 3 is a diagram showing arrangement of a message for making a request in the parallel processing activation by the parallel processing unit of the parallel processing system.

These commands are made by a message as shown in FIG. 3. More specifically, by transmitting to the parallel processing unit 40P0 a message composed of a request contents 201 indicative of the contents of a request (task creation in this case), a processor number 202 designating the processor P1~Pn on the second processor side 20 which is to process the task, a task ID 203 indicative of the task PT-1~PT-n to be newly created and an original task ID 204 indicative of a parallelization task PT requesting task creation, task creation is requested. As to other commands than the task creation, the commands will be sent according to the message shown in FIG. 3.

(2) The parallel processing unit 40P0 responsively activates the proxy unit 70 corresponding to the task PT-1~PT-n to be created. The proxy unit 70 is activated in order to prevent management contents of the task from being shared between the first processor side 10 and the second processor side 20 and to complete the exclusive processing on the first processor side 10. At this time, the task number of the task PT-1~PT-n is held in the proxy unit 70.

(3) The parallel processing unit 40P0 further sets data necessary for task creation such as the above-described task number and request contents (task creation on the processors P1 to Pn on the second processor side 20) and communication reason information designating "parallel processing" at the control processing relay unit 60.

This processing results in executing, for the control processing relay unit 60, setting of contents to be communicated to the main storage device 92 (shared memory) which will be described later and processing for inter-processor interruption.

Here, communication reason information represents a recipient (accepter) of data transferred to the control processing relay unit 60 and in the above-described case, data set in the control processing relay unit 60 will be obtained by the parallel processing unit 40P1~40Pn of the designated processor P1~Pn.

(4) The parallel processing unit 40P1~40Pn on the designated processor P1~Pn on the second processor side 20 obtains the request contents (data required for task control) having "parallel processing" as the communication reason information from the control processing relay unit 60.

(5) Then, the parallel processing unit 40P1~40Pn creates and activates the task PT-1~PT-n on the processor P1~Pn based on the request contents obtained.

The foregoing processing enables a unit of work of the parallelization task PT as a unit of work of the application operating on the OS for single processors on the first processor side 10 to be parallel-processed as the task PT-1~PT-n on the second processor side 20.

Although the foregoing operation has been described with respect to a case where the parallel processing units 40P1 to 40Pn create and activate the tasks PT-1 to PT-n on the processors P1 to Pn based on the obtained request contents, the parallelization task PT on the first processor side 10 may be created in advance as any of the tasks PT-1 to PT-n on the second processors side 20 and the parallel processing units 40P1 to 40Pn may activate the tasks PT-1 to PT-n on the processors P1 to Pn based on the obtained request contents.

Next, description will be made of OS service processing operation conducted by the OS service units 50P0 and 50P1 to 50Pn.

The OS service units 50P0 and 50P1 to 50Pn have a function of providing, based on a command from the tasks PT-1 to PT-n created on the processors P1 to Pn on the second processor side 20, services related to various kinds of accesses to an external apparatus and control of the same and various kinds of accesses to a resource shared by other task and control of the same which are the services by the OS30 for single processors. The main target services provided by the OS30 for single processors are equivalents of a system call and an API provided by an ordinary OS.

Figure 4:
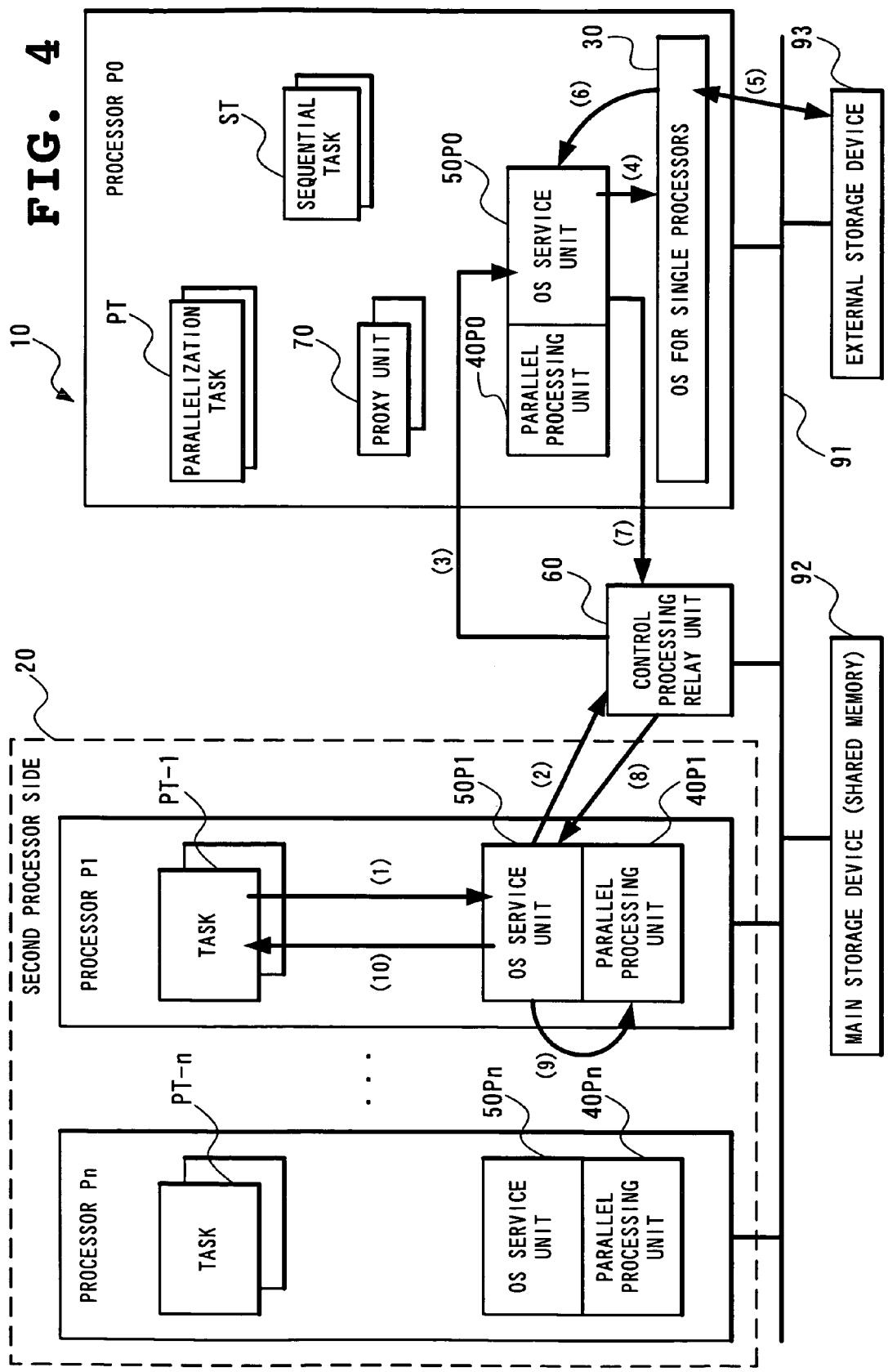
FIG. 4 is a diagram for use in explaining operation of an OS service unit to be conducted in response to a file access request from a task on a second processor side in the parallel processing system according to the first example.

Description will be made of operation of the OS service units 50P0 and 50P1 to 50Pn in response to a file access (e.g. various kinds of processing with respect to a file on the external storage device 93) command from the tasks PT-1 to PT-n on the processors P1 to Pn on the second processor side 20 with reference to FIG. 4.

Here, file access includes such processing as open (open a file), close (close a file), read (read a file), write (write a file), seek (move a file writing position), remove (delete a file) and rename (change a file name).

(1) When the need of file access processing arises in the tasks PT-1 to PT-n on the second processor side 20, the tasks PT1 to PTn request the OS service units 50P1 to 50Pn on the second processor side 20 to provide service for file access. Called up by this file access service command, for example, are a write function defined as processing of writing to a file by the OS service units 50P1 to 50On and a read function defined as file reading processing.

Here, the OS service units 50P1 to 50Pn set data necessary for the processing (file access processing by the OS30 for single processors) on the first processor side 10. Necessary data here includes such information as a request content (e.g. write request), a descriptor of a file to be accessed (file descriptor), a pointer to a character string, a length of a character string and a task number.

(2) With the communication reason information set to "OS service", by setting the necessary data containing the request contents at the control processing relay unit 60, the OS service unit 50P1 50Pn issues a file access command to the first processor side 10.

Thereafter, the task PT-1~PT-n having issued the service command for file access enters a waiting state and in the corresponding processor P1~Pn, processing is switched to other task by the parallel processing unit 40P1~40Pn (task switching).

(3) The OS service unit 50P0 on the first processor side 10 obtains, from the control processing relay unit 60, the above-described file access command having "OS service" as the communication reason information.

(4) The OS service unit 50P0 on the first processor side 10 requests file access from the OS30 for single processors according to the obtained request contents.

(5) As a result, the OS30 for single processors makes a file access (write, read or the like) to the external storage device 93 based on the command. This file access processing is executed using the file access service without modification which the OS30 for single processors originally has.

(6) Upon completion of the requested file access processing, the OS30 for single processors sends a returned value for the file access command back to the OS service unit 50P0 on the first processors side 10 to return the processing.

(7) Furthermore, the OS service unit 50P0 sets the communication content, which is data including the returned value and the task number of the task PT-1~PT-n that has requested the file access, at the control processing relay unit 60 with "OS service" as the communication reason information, thereby notifying the processors P1-Pn on the second processor side 20 of the completion of the file access.

(8) The OS service unit 50P1~50Pn of the corresponding processor P1~Pn receives thus set returned value and the notification of completion from the control processing relay unit 60.

(9) Then, the OS service unit 50P1~50Pn on the second processor side 20 asks the parallel processing unit 40P1~40Pn to activate the task PT-1~PT-n which has given the file access command.

As a result, the processing switches to the task PT-1~PT-n at the waiting state.

(10) The task PT-1~PT-n activated by the parallel processing unit 40P1~40Pn receives the returned value of the file access from the OS service unit 50P1~50Pn to continue the processing.

The foregoing processing enables, without providing an individual processing unit for file access on the second processor side 20, the task PT-1~PT-n on the second processor side 20 to make file access while using the service of the OS30 for single processors without modification. Also with this arrangement, exclusive processing for file access is completed on the first processor side 10, so that parallel processing can be realized with no overhead caused by such exclusive processing as in operating an application on an OS for multiprocessors.

In a case where the task PT-1~PT-n on the processor P1~Pn on the second processor side 20 makes file access to read-only data on the external storage device 93, for example, direct access may be made to the external storage device 93 from each processor P1~Pn without such processing by the OS service unit 50P1~50Pn as described above.

Figure 5:
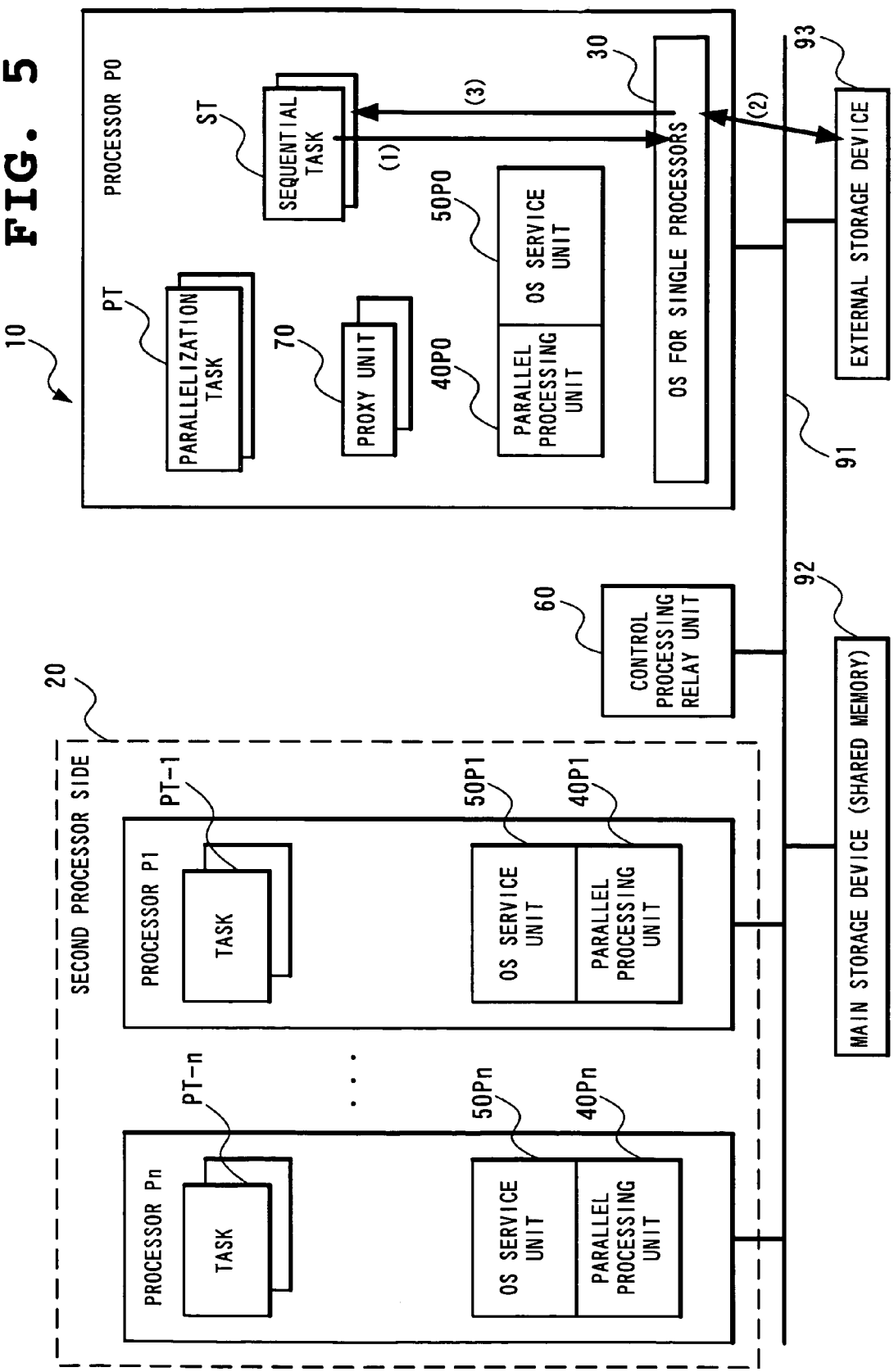
FIG. 5 is a diagram for use in explaining operation executed in response to a file access request from a sequential task on a first processor side.

Here, as to a file access command from the sequential task ST on the processor P0 on the first processor side 10, the processing is directly executed by the OS30 for single processors without using the OS service unit. In the following, the processing will be described with reference to FIG. 5.

(1) The sequential task ST on the processor P0 requests the OS30 for single processors to make file access.

(2) As a result, the OS30 for single processors conducts file access (write, read, etc.) to the external storage device 93 or the like based on the command. The file access processing is executed by using the file access service that the OS30 for single processors originally has without modification.

(3) When the file access processing is completed, the OS30 for single processors sends a returned value for the file access command back to the sequential task ST to return the processing.

Since in response to the OS service command from the sequential task ST, mutual exclusive control and the like is unnecessary, no extra overhead will be generated.

Processing operation by the control processing relay unit 60 will be described with reference to FIGS. 6 and 7.

Figure 6:
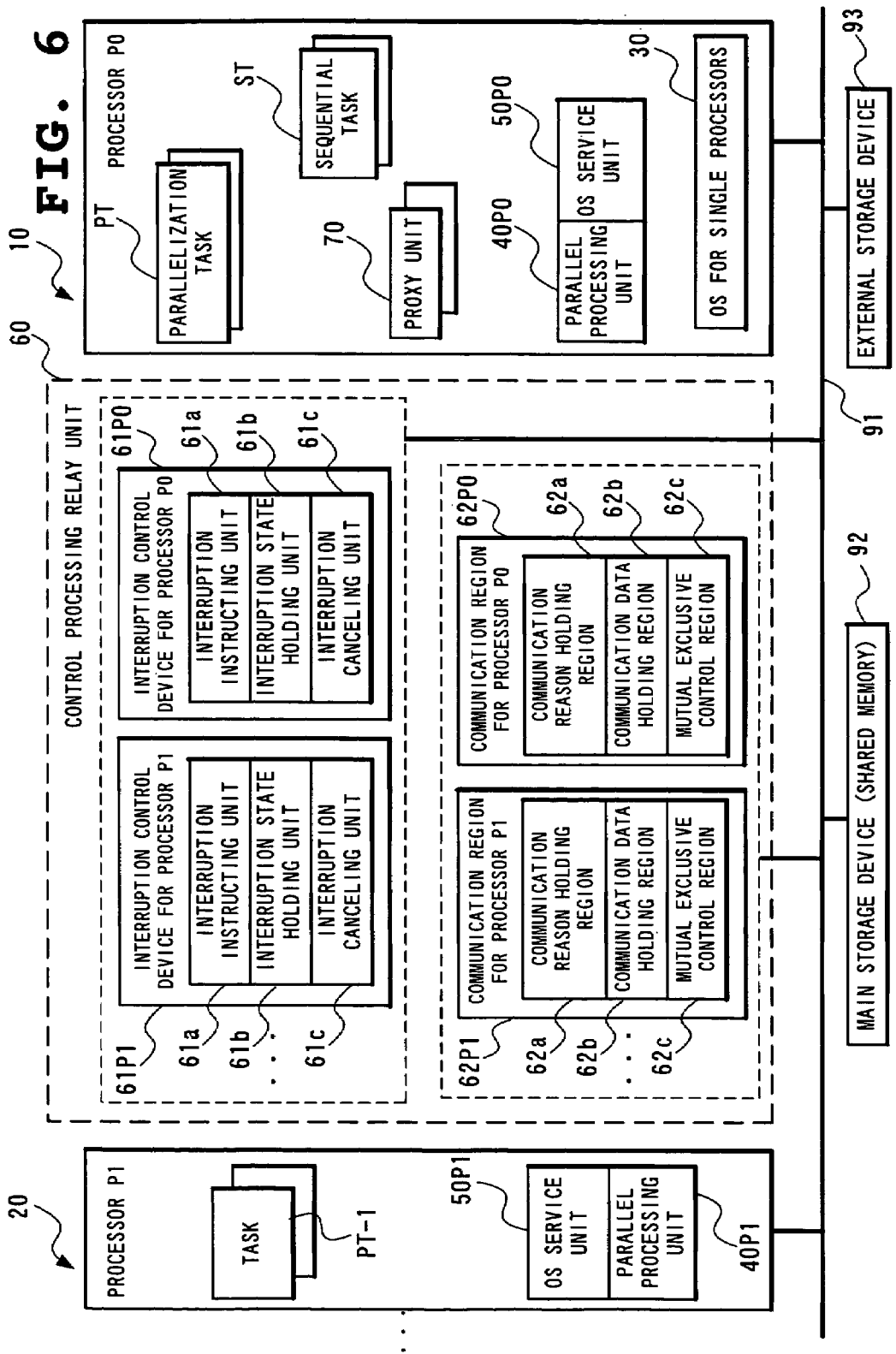
FIG. 6 is a block diagram showing an internal structure of a control processing relay unit in the parallel processing system according to the first example.
Figure 7:
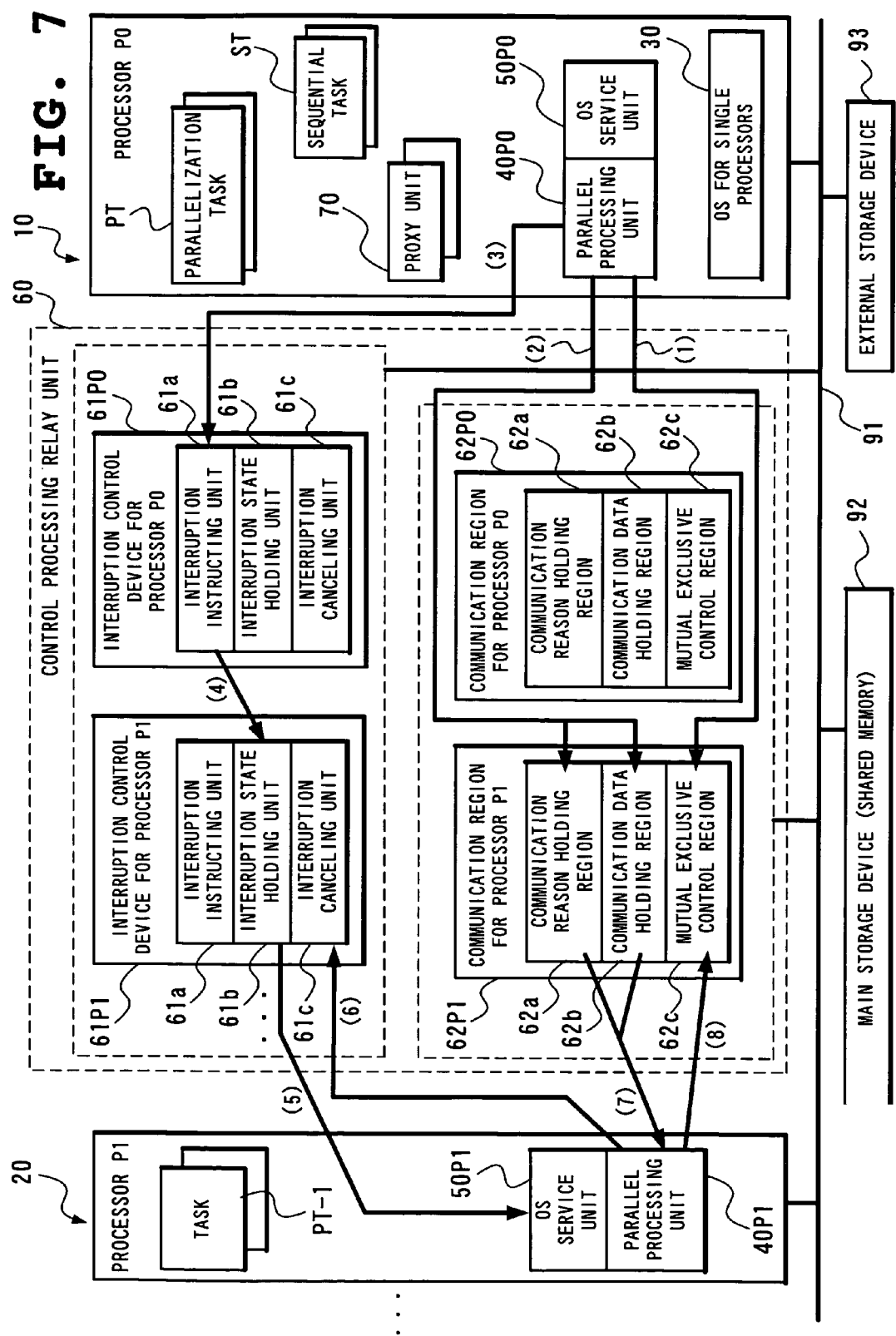
FIG. 7 is a diagram for use in explaining processing operation of the control processing relay unit in the parallel processing system according to the first example.

First, structure of the control processing relay unit 60 is shown in FIG. 6. As illustrated in the figure, the control processing relay unit 60 includes interruption control devices 61P0 to 61Pn corresponding to the respective processors P0 to Pn and communication regions 62P0 to 62Pn corresponding to the respective processors P0 to Pn. Here, the communication regions 62P0 to 62Pn are ensured in the main storage device 92.

The interruption devices 61PO to 61Pn each further include an interruption instructing unit 61a for instructing other processor on an interruption, an interruption state holding unit 61b for holding information that an interruption is made in response to an interruption instruction and an interruption canceling unit 61c for clearing an interruption.

The communication regions 62P0 to 62Pn each include a communication reason holding region 62a for holding communication reason information from a processor as a communication source, a communication data holding region 62b for holding communication data to be communicated and a mutual exclusive control region 62c for locking a communication region in order to ensure communication.

At this time point, in the communication data holding region 62b, a pointer to the main storage device 92 will be stored, in which communication data to be communicated (necessary data including request contents) is stored.

Operation will be described with respect to processing of communication from the parallel processing unit 40P0 on the first processor side 10 to the processor P1 on the second processor side 20 as an example with reference to FIG. 7.

(1) The parallel processing unit 40P0 locks the mutual exclusive control region 62c of the communication region 62P1 for the processor P1. More specifically, by bringing a lock variable stored in the mutual exclusive control region 62c to a locked state, prevent the communication region 62P1 for the processor P1 in question from being used by other processor.

When the region is already locked by other processor, wait for the lock to be released.

(2) When the lock of the communication region 62P1 is obtained, the parallel processing unit 40P0 stores the communication reason information and the communication data (necessary data including request contents) in the communication reason holding region 62a and the communication data holding region 62b of the communication region 62P1, respectively.

Communication reason information to be stored is, in a case of communication processing for creating a task as described above, information indicative of "parallel processing" (e.g. data such as a numerical value predetermined corresponding to the parallel processing).

(3) The parallel processing unit 40P0 instructs the interruption instructing unit 61a of its own interruption control device 61P0 to interrupt the processor P1.

(4) The interruption instructing unit 61a of the interruption control device 61P0 sets the information indicative of the interruption at the interruption state holding unit 61b of the interruption control device 61P1 corresponding to the processor P1. This brings the processor P1 to an interrupted state.

(5) The parallel processing unit 40P1 of the processor P1 determines from the state of the interruption state holding unit 61b of the interruption control device 61P1 in the control processing relay unit 60 that the interruption is set.

(6) The parallel processing unit 40P1 of the processor P1 releases itself from the interrupted state by clearing the interruption information in its own interruption state holding unit 61b of the control processing relay unit 60.

(7) The parallel processing unit 40P1 of the processor P1 obtains the communication reason information and the communication data (required data including the request contents) from the communication reason holding region 62a and the communication data holding region 62b of its own communication region 62P1 in the control processing relay unit 60, respectively.

(8) Upon being allowed to receive next communication, the parallel processing unit 40P1 of the processor P1 releases the lock of the mutual exclusive control region 62c of its own communication region 62P1. More specifically, by bringing the lock variable stored in the mutual exclusive control region 62c to the unlocked state, the communication region 62P1 for the processor P1 in question is released so that it may be used by other processor.

Thus, using the control processing relay unit 60 realizes transmission and reception of control signals and data between the first processor side 10 and the second processor side 20.

Figure 8:
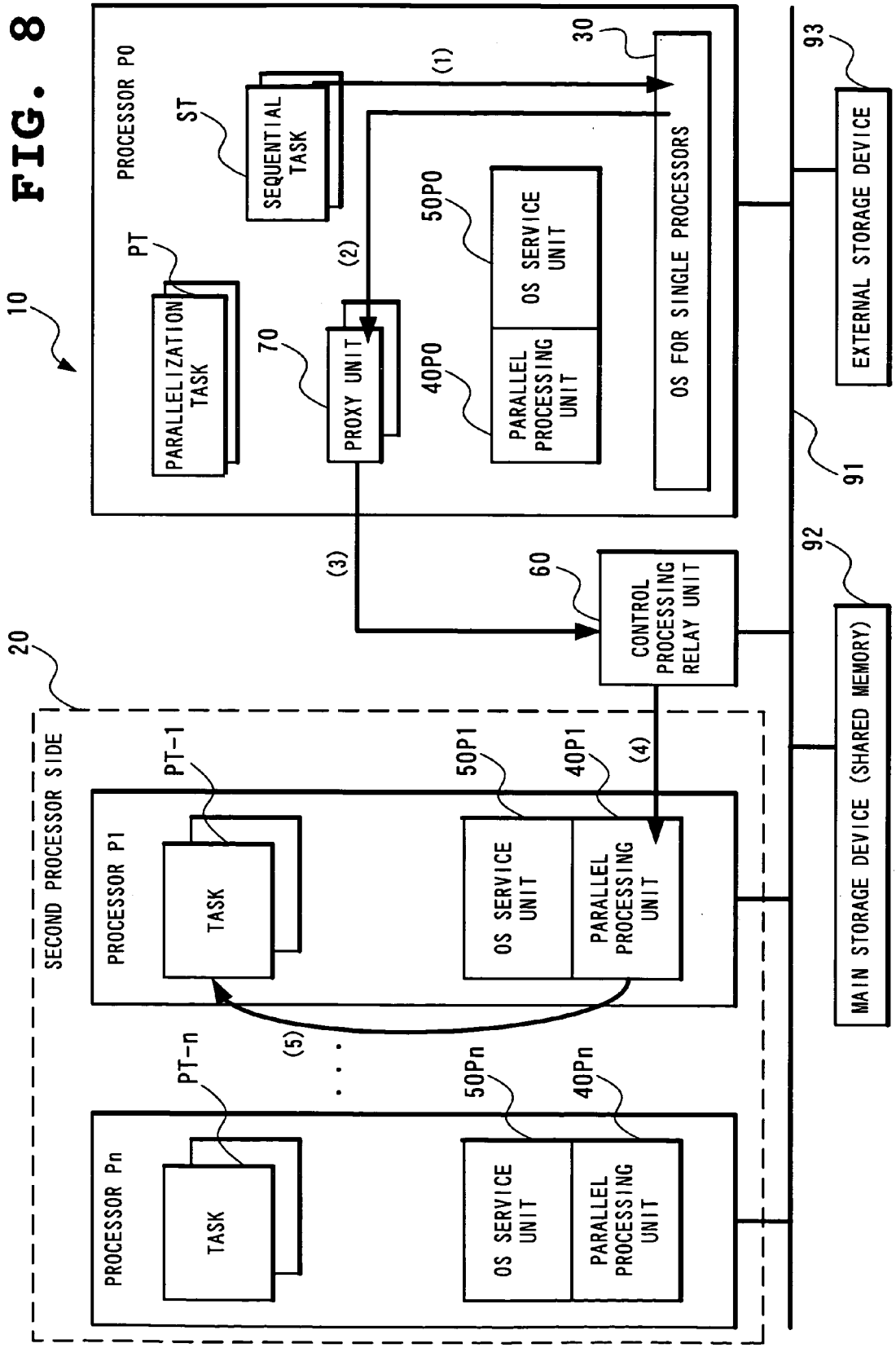
FIG. 8 is a diagram for use in explaining signal notification processing operation by a proxy unit in the parallel processing system according to the first example.

Operation of signal notification processing by the proxy unit 70 will be described with reference to FIG. 8.

The proxy unit 70 has a function of enabling the OS30 for single processors to communicate with the tasks PT-1 to PT-n generated on the second processor side 20 by using a signal (control signal). The task numbers of the corresponding tasks PT-1 to PT-n are held in the proxy unit 70.

The proxy unit 70 may be one-to-one associated with each of the plurality of tasks PT-1 to PT-n, or the plurality of tasks PT-1 to PT-n may be associated with one proxy unit 70.

(1) The sequential task ST on the first processor side 10 requests signal notification service from the OS30 for single processors. The signal communicated by the signal notification is a control signal for controlling the tasks PT-1 to PT-n activated on the respective processors P1 to Pn on the second processor side 20 by the service function which the OS30 for single processors originally has.

(2) The OS30 for single processors notifies the signal to the corresponding proxy unit 70.

(3) Through the control processing relay unit 60, the proxy unit 70 notifies the notified signal to the processor P1~Pn in which its corresponding task PT-1 exists on the second processor side 20. At this point, "parallel processing" is set as the communication reason information.

(4) Since the communication reason information to the control processing relay unit 60 is "parallel processing", the parallel processing unit 40P1~40Pn of the corresponding processor on the second processor side 20 obtains a signal notification command from the control processing relay unit 60.

(5) The parallel processing unit 40P1~40Pn having obtained the signal. notification command notifies the corresponding task PT-1~PT-n of the signal (control signal).

Thus, since the proxy unit 70 is associated with the task PT-1~PT-n on the processor P0~Pn on the second processor side 20 by the task number, on the first processor side 10, the signal notification service by the OS30 for single processors can be performed with respect to the tasks PT-1 to PT-n.

Lastly, inter-task cooperative operation on the second processor side 20 will be described with reference to FIGS. 9 and 10.

Figure 9:
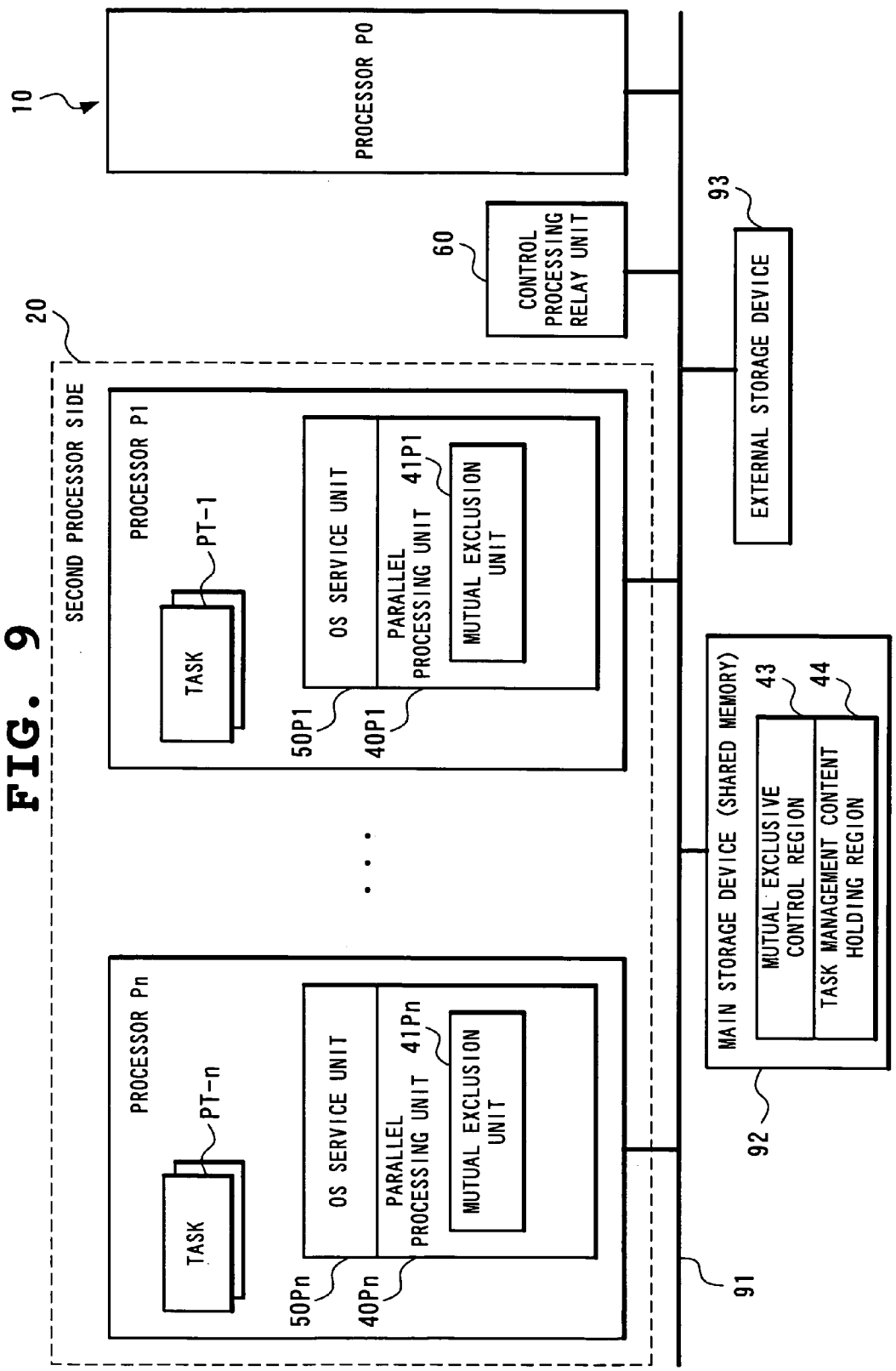
FIG. 9 is a block diagram showing a structure for realizing cooperative operation between tasks on the second processor side in the parallel processing system according to the first example.
Figure 10:
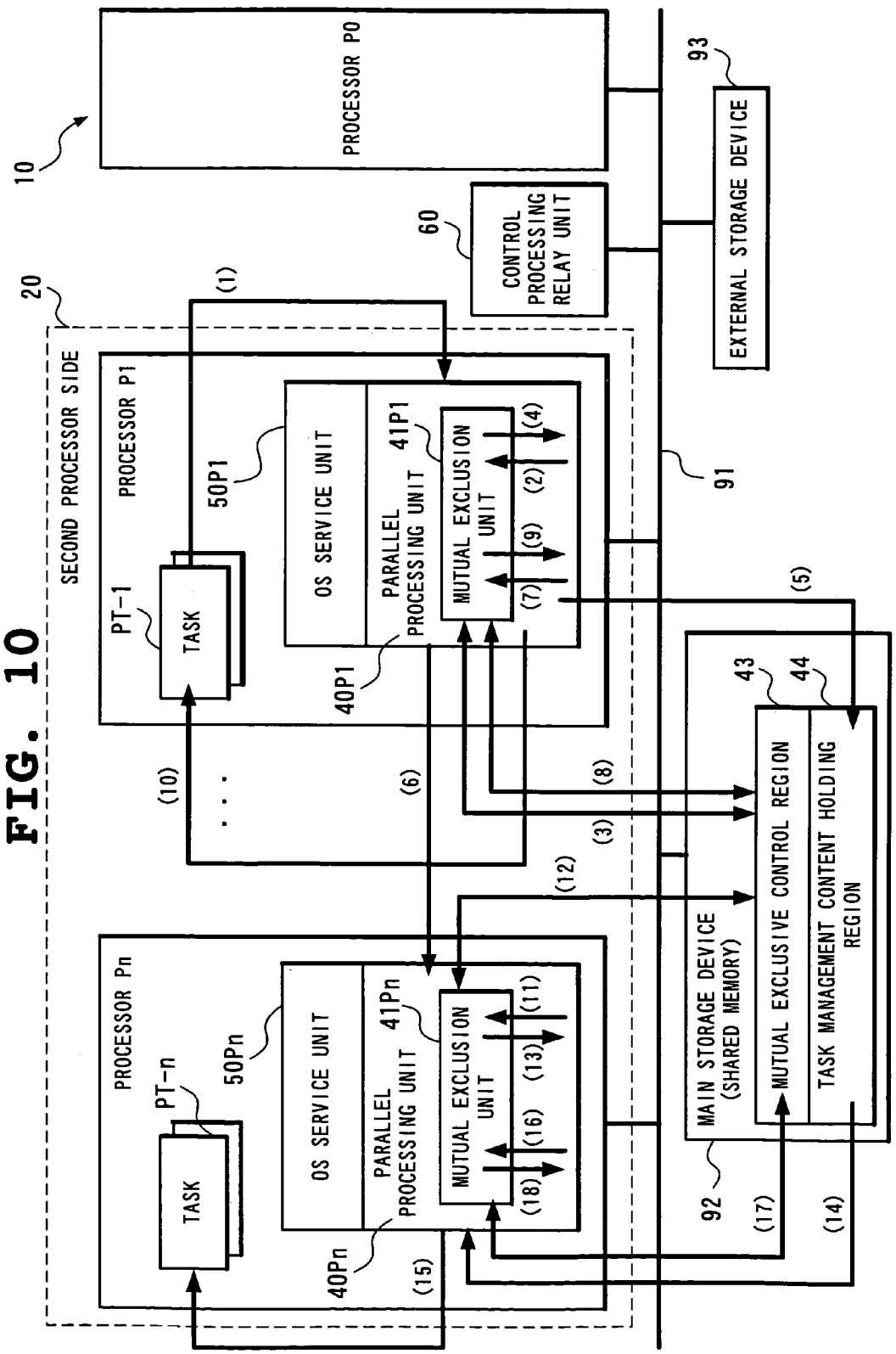
FIG. 10 is a diagram for use in explaining cooperative operation between tasks on the second processor side in the parallel processing system according to the first example.

FIG. 9 shows the structure of the parallel processing units 40P1 to 40Pn for obtaining cooperation among the tasks. As illustrated in the figure, the parallel processing units 40P1 to 40Pn are provided with mutual exclusion units 41P1 to 41Pn.

The main storage device 92 also includes a mutual exclusive control region 43 and a task management content holding region 44 to obtain task cooperation.

(1) The task PT-1 on the processor P1 requests desired parallel processing from its own parallel processing unit 40P1.

(2) The parallel processing unit 40P1 of the processor P1 requests lock acquisition from the mutual exclusion unit 41P1 in order to ensure the resources for use in parallel processing.

(3) The mutual exclusion unit 41P1 obtains the lock by using the mutual exclusive control region 43 of the main storage device 92.

(4) The mutual exclusion unit 41P1 notifies the parallel processing unit 40P1 that the lock has been obtained.

(5) The parallel processing unit 40P1 holds, in the task management content holding region 44, the management content (request contents, task number and other required data) of the task PT-1 having requested parallel processing on the processor P1.

(6) The parallel processing unit 40P1 interrupts other processor P2-Pn which is executing a low-priority task. Assume here that the processor Pn is interrupted.

(7) The parallel processing unit 40P1 asks the mutual exclusion unit 41P1 to release the lock ensured as described above.

(8) The mutual exclusion unit 41P1 unlocks the mutual exclusive control region 43 of the main storage device 92.

(9) The mutual exclusion unit 41P1 notifies the parallel processing unit 40P1 of the completion of the unlocking.

(10) The parallel processing unit 40P1 returns the processing to the task PT-1.

(11) The parallel processing unit 40Pn of the processor Pn requests lock acquisition from the mutual exclusion unit 41Pn in order to ensure the resources for use in parallel processing.

(12) The mutual exclusion unit 41Pn obtains the lock by using the mutual exclusive control region 43 of the main storage device 92.

(13) The mutual exclusion unit 41Pn notifies the parallel processing unit 40Pn of the completion of the lock acquisition.

(14) The parallel processing unit 40Pn obtains the task management contents stored in the task management content holding region 44.

(15) The parallel processing unit 40Pn creates and activates a new task based on the task management contents.

(16) The parallel processing unit 40Pn requests, from the mutual exclusion unit 41Pn, release of the lock ensured as described above.

(17) The mutual exclusion unit 41Pn unlocks the mutual exclusive control region 43 of the main storage device 92.

(18) The mutual exclusion unit 41Pn notifies the parallel processing unit 40Pn of the completion of the unlocking.

Such task cooperative operation as described above allows the task PT-1~PT-n activating on a certain processor P1~Pn to have its own unit of work be parallel-processed by other processor.

As an example of applications to thus structured parallel processing system, description will be made of a case where the application is operated on a mobile terminal of a multiprocessor.

Figure 11:
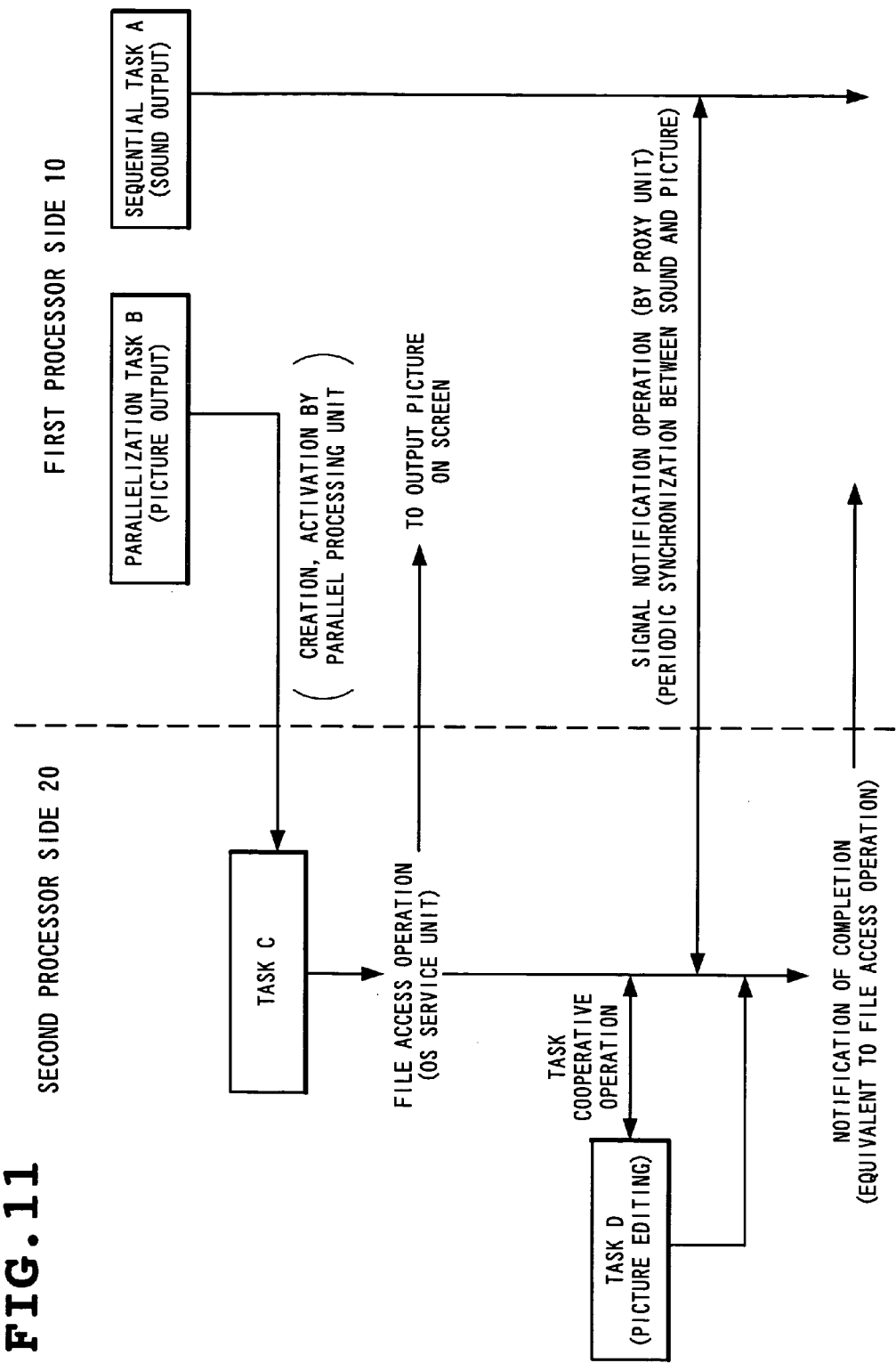
FIG. 11 is a diagram for use in explaining a case of operating an application on a mobile terminal of a multiprocessor as an example of application to the parallel processing system.

Here, the description will be made with reference to FIG. 11, assuming a case where with the application having a function of reproducing picture (moving picture) and sound simultaneously on a mobile terminal and with sound output processing being defined as a sequential task A and picture output processing being defined as a parallelization task B, the application is operated on the processor P0 on the first processor side 10.

The parallelization task B is created and activated as a task C on any of the processors P1 to Pn on the second processor side 20 by the above-described parallel processing unit The created task C outputs the picture on a screen by file access processing of the OS service unit.

Concerning the sound output by the sequential task A, the sound is output by the service of the OS30 for single processors.

For periodically synchronizing the sound and the picture, synchronization is attained by giving a signal notification between the sequential task A and the task C through the signal notification operation by the proxy unit 70.

In addition, when executing processing of editing the picture in the task C, the editing processing is created and activated as a task D on other processor by task cooperation processing.

When the picture output processing by the task C is completed, the task C notifies the OS for single processors of the termination by the file access operation.

In the present parallel processing system, provision of the parallel processing units 40P0 to 40Pn, the OS service units 50P0 to 50Pn, the control processing relay unit 60 and the proxy unit 70 as modules enables the OS30 for single processors and the application to operate without overheads on a multiprocessor system structure without modifying the OS30 for single processors and the application operated on the processor P0, while receiving benefits from the parallel processing by the multiprocessor.

Figure 12:
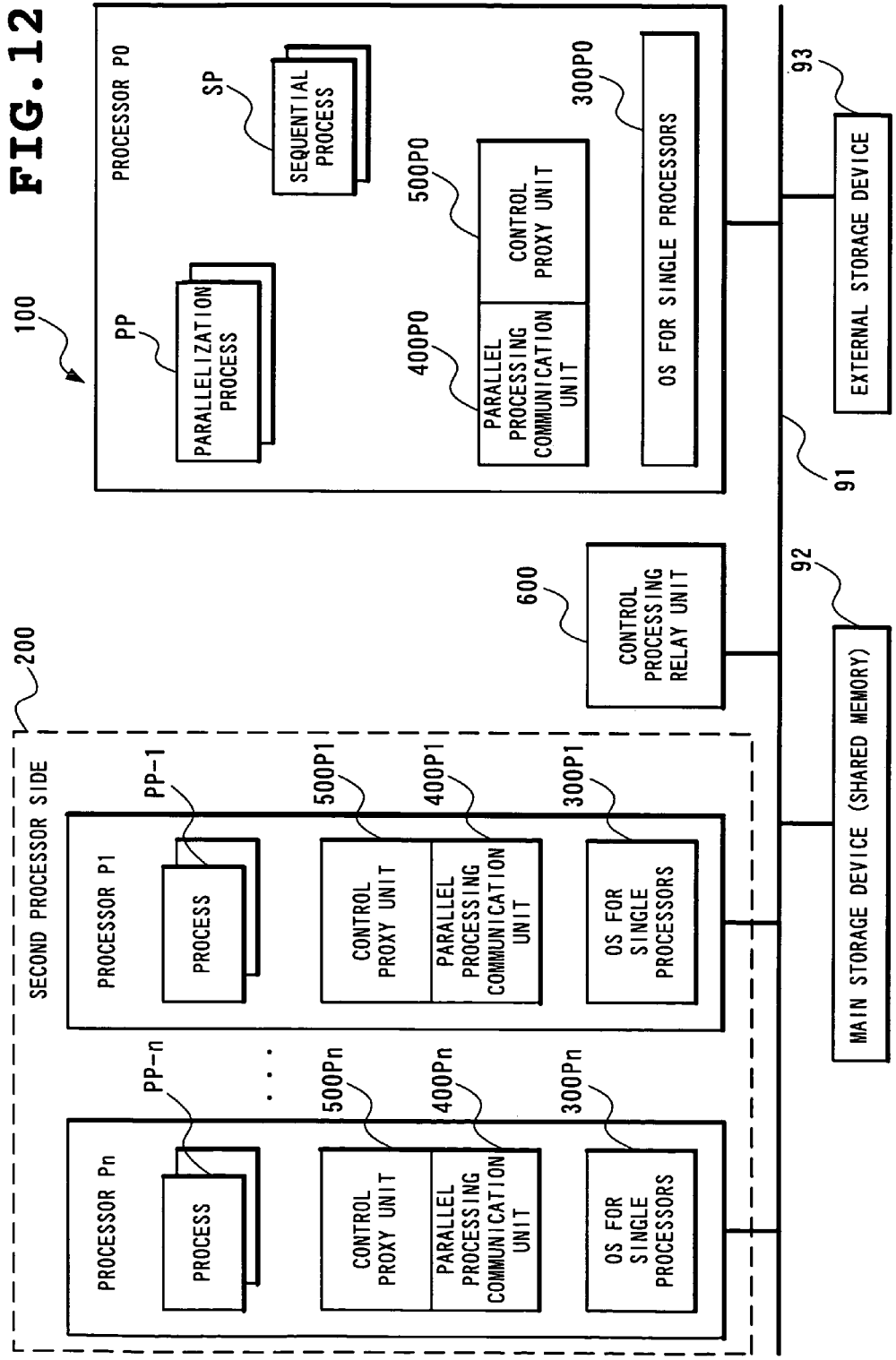
FIG. 12 is a block diagram showing a structure of a parallel processing system according to a second example to which the present invention is applied.

Next, a parallel processing system of a second example to which the present invention is applied will be described with reference to FIG. 12 and the drawings to follow. FIG. 12 is a block diagram showing a structure of the parallel processing system according to the second example, in which components common to FIG. 1 are referenced by the same numerals. Illustrated in the second example shown in FIG. 12 is a case where the parallel processing units 40P0 to 40Pn in the first example are formed of parallel processing communication units 400P0 to 400Pn and control proxy units 500P0 to 500Pn, respectively.

As shown in FIG. 12, the parallel processing system of the present example is the same as the first example in that a multiprocessor formed of a plurality of processors (CPU) P0 to Pn (n is an integer not less than 1) connected through a system bus 91 is logically divided into two groups, i.e., a first processor side 100 and a second processor side 200.

In the second example, OSes 300P0 to 300Pn for single processors are implemented which operate on the processor P0 on the first processor side 100 and the respective processors (CPU) P0 to Pn on the second processor side 200.

In addition, the parallel processing communication units 400P0 to 400Pn and the control proxy units 500P0 to 500Pn for parallel processing are mounted on the processor P0 on the first processor side 100 and the processors P1 to Pn on the second processor side 200, respectively. A main storage device 92 as a shared memory which is shared among the respective processors P0 to Pn and an external storage device 93 such as a disk device are connected to the system bus 91.

Also, a control processing relay unit 600 is uniquely provided for transmitting and receiving control signals and data between the first processor side 100 and the second processor side 200.

Since regarding the proxy unit 70 shown in the first example through which the OS 300P0 for single processors on the first processor side 100 communicates with processes executed on the second processor side 200, the unit executes completely the same function in the second example as that in the first example, no description will be made here for the sake of convenience.

While in the first example, it has been described that the switching of tasks is performed in response to a file access command from the tasks on the processors PT-1 to PT-n on the second processor side 20, also in the present example, file access from the second processor side 200 is possible and switch of processes PP-1 to PPn on the second processor side 200 which have given a file access command is conducted by the OSes 300P1 to 300Pn for single processors on the second processor side 200.

As to the OSes 300P0 to 300Pn for single processors mounted on the respective processors P0 to Pn, they are different from those of the first example in that not only OSes having no virtual memory mechanism which realizes a memory protection function such as a real-time OS but also OSes having a virtual memory mechanism such as Linux and Windows (R) as existing OSes can be used and that a memory protection mechanism can be realized on all or a part of the processors P0 to Pn.

In addition, the OSes 300P0 to 300Pn for single processors need not be OSes of the same kind but may be OSes of kinds different from each other.

In the present example, the task, which is a unit of work for performing parallel processing, is memory-protected between the processors and in that sense, is referred to as a process to distinguish from the task in the first example.

In the parallel processing system according to the present example, among the units of work of an application operating on the OS 300P0 for single processors on the first processor side 100, those processes which cannot be parallelized (sequential processes SP) are processed by the processor P0 on the first processor side 100, and those tasks which can be parallelized within the application are created as new processes PP-1 to PP-n on the second processor side 200 and parallel-processed.

The parallel processing communication unit 400P0 and the parallel processing communication units 400P1 to 400Pn have the function of transmitting and receiving information related to process creation, activation, stop, termination and deletion and other control regarding the processes between the processes and the OSes 300P0 to 300Pn for single processors.

Here, control information and data related to creation, activation, stop, termination, deletion or the like of tasks are transmitted and received between the first processor side 100 and the second processor side 200 through the control processing relay unit 600.

In addition, the control proxy unit 500P0 and the control proxy units 500P1 to 500Pn have the function of obtaining a processing command from the OS 300P0~300Pn for single processors to the process and activating the process.

The control processing relay unit 600 is a unit for transmitting and receiving control signals and data between the first processor side 10 and the second processor side 20 and is used for control between the plurality of processes parallel-processed by the plurality of processors.

In the following, operation of thus structured parallel processing system according to the second example will be described in detail with reference to the drawings.

Assume here that the application operates on the OS 300P0 for single processors on the first processor side 100, and among the units of work of the application, a unit of work to be processed by the processor P0 on the first processor side 100 is defined as a sequential process SP, and units of work which are processes that can be parallelized within the application and are parallel-processed by the second processor side 200 as the tasks PP-1 to PP-n are defined as a parallelization process PP.

In the parallel processing system in the second example, after a certain process (task) is activated, synchronous activation of parallel processing in which the parallelization process PP as a process (task) on the calling side waits for the termination of the activated process PP-1~PP-n and asynchronous activation of parallel processing in which the parallelization process PP as a process (task) on the calling side needs not wait for the termination of the activated process PP-1~PP-n are both possible.

Figure 13:
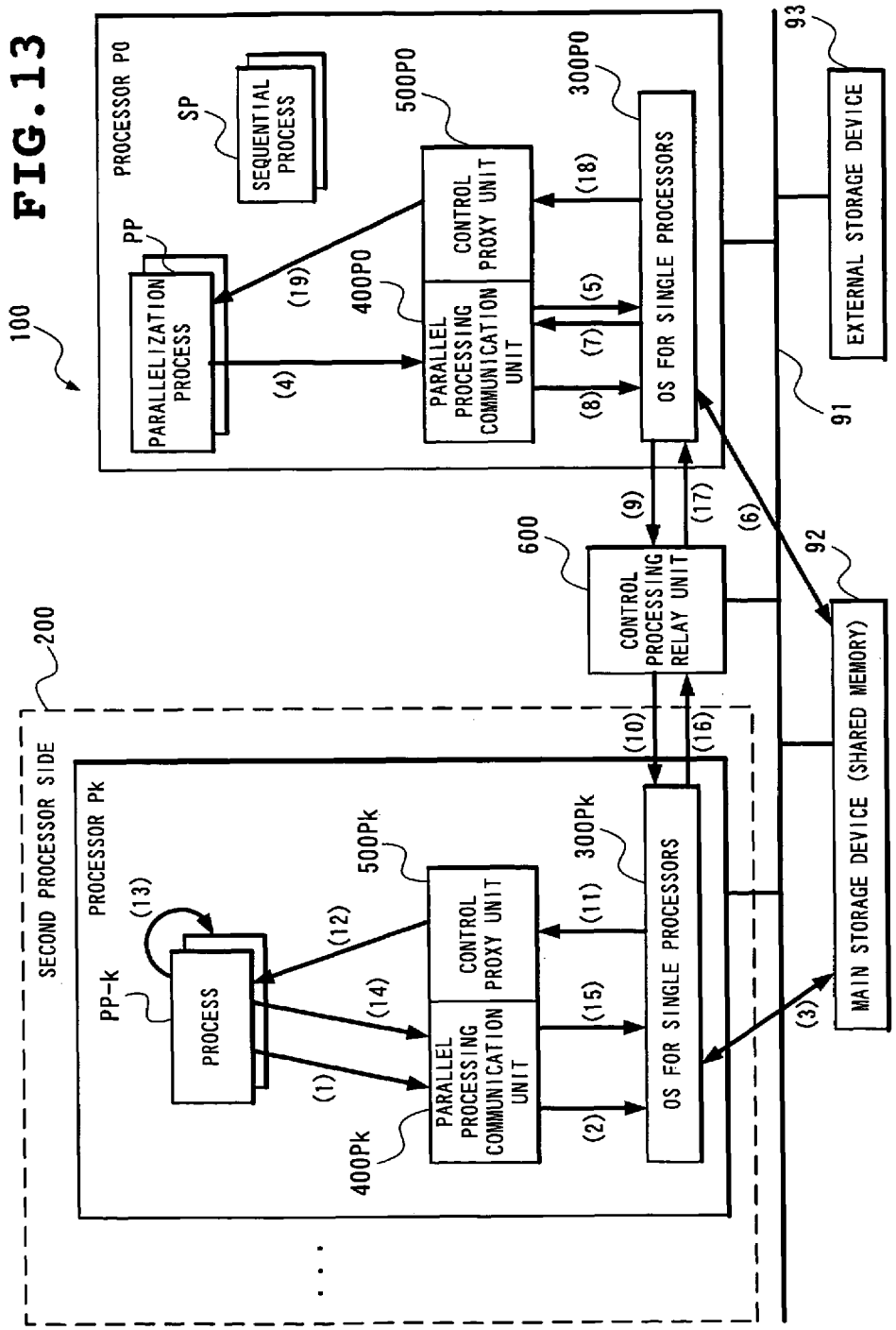
FIG. 13 is a diagram for use in explaining operation of synchronously activating parallel processing of processes in the parallel processing system according to the second example.

First, operation for the synchronous activation of parallel processing of a process will be described with reference to FIG. 13.

Assume here that in a processor Pk ($1 \leq k \leq n$) on the second processor side 200, the parallelization process PP on the first processor side 100 is created in advance as a process PP-k which is a unit of work to be activated on the second processor side 200.

(1) The process PP-k on the processor Pk ($1 \leq k \leq n$) on the second processor side 200 registers, in a parallel processing communication unit 400Pk, the information about the processing belonging to its own process. As a result, the process PP-k enters the standby state.

(2) The parallel processing communication unit 400Pk makes a request for accessing necessary data on the main storage device 92 (shared memory) through an OS 300Pk for single processors.

(3) As a result, the information about the processing belonging to the process PP-k is stored in the main storage device 92 (shared memory).

(4) The process PP on the processor P0 requests synchronous processing from the parallel processing communication unit 400P0. Thereafter, the process PP enters the standby state.

(5) The parallel processing communication unit 400P0 having received the request makes a request to access data onto the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). Thus, a processor number which executes the process PP-k and a process number are obtained.

(8) The parallel processing communication unit 400P0 makes a communication request based on the information obtained from the main storage device 92 (shared memory) through the OS 300P0 for single processors.

(9) The OS 300P0 for single processors sets the information required for communication at the control processing relay unit 600.

(10) As a result, the processing command is sent from the control processing relay unit 600 to the OS 300Pk for single processors of the processor Pk.

(11) The control proxy unit 500Pk of the processor Pk obtains the processing command sent through the OS 300Pk for single processors.

(12) Then, the control proxy unit 500Pk activates the process PP-k according to the processing command obtained.

(13) As a result, the process PP-k at the standby state executes the processing.

(14) After finishing the processing, the process PP-k notifies the parallel processing communication unit 400Pk of the information to that effect.

(15) The parallel processing communication unit 400Pk having received the notification makes a communication request based on the information notified through the OS 300Pk for single processors.

(16) The OS 300Pk for single processors sets the information required for communication at the control processing relay unit 600.

(17) As a result, the processing command is sent from the control processing relay unit 600 to the OS 300P0 for single processors in the processor P0. (18) The control proxy unit 500P0 of the processor P0 obtains the processing command sent through the OS 300P0 for single processors.

(19) Then, the control proxy unit 500P0 activates the process PP according to the processing command obtained.

Thus, synchronous processing is realized between the process PP on the processor P0 on the first processor side 100 and the process PP-k on the second processor side 200.

Figure 14:
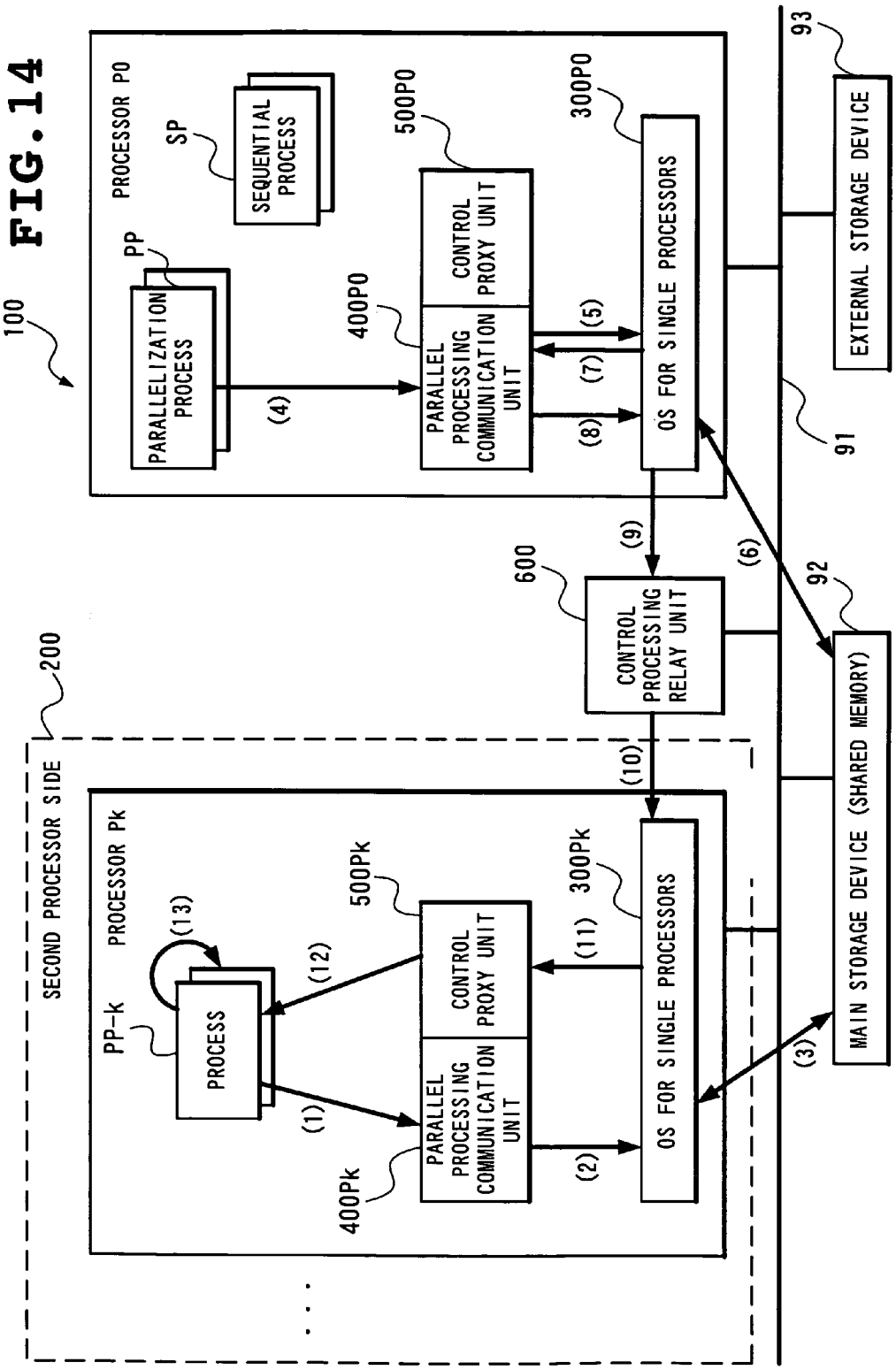
FIG. 14 is a diagram for use in explaining operation of asynchronously activating parallel processing of processes in the parallel processing system according to the second example.

Next, operation for the asynchronous activation of parallel processing of a process will be described with reference to FIG. 14.

Also assume here that in the processor Pk (1≦k≦n) on the second processor side 200, the parallelization process PP on the first processor side 100 is created in advance as the process PP-k which is a unit of work to be activated on the second processor side 200.

(1) The process PP-k which was performing the processing on the processor Pk (1≦k≦n) on the second processor side 200 registers, in the parallel processing communication unit 400Pk, the information about the processing belonging to its own process. As a result, the process PP-k enters the standby. state.

(2) The parallel processing communication unit 400Pk makes a request for accessing required data onto the main storage device 92 (shared memory) through the OS 300Pk for single processors.

(3) As a result, the information about processing belonging to the process PP-k is stored in the main storage device 92 (shared memory).

(4) The process PP on the processor P0 requests asynchronous processing from the parallel processing communication unit 400P0. In this case, the process PP thereafter continues the processing without entering the standby state.

(5) The parallel processing communication unit 400P0 having received the request makes an access request for data on the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). As a result, a processor number executing the process PP-k and a process number are obtained.

(8) The parallel processing communication unit 400P0 makes a communication request, based on the information obtained from the main storage device 92 (shared memory) through the OS 300P0 for single processors.

(9) The OS 300P0 for single processors sets information required for communication at the control processing relay unit 600.

(10) Thus, the processing command is sent from the control processing relay unit 600 to the OS 300Pk for single processors in the processor Pk.

(11) The control proxy unit 500Pk of the processor Pk obtains the processing command sent through the OS 300Pk for single processors.

(12) The control proxy unit 500Pk then activates the process PP-k according to the processing command obtained.

(13) Thus, the process PP-k at the standby state executes the processing.

In the foregoing manner, asynchronous processing is realized between the process PP on the processor P0 on the first processor side 100 and the process PP-k on the second processor side 200.

The processing operation by the control processing relay unit 600 in the parallel processing system according to the second example will be described with reference to FIGS. 15 and 16.

Figure 15:
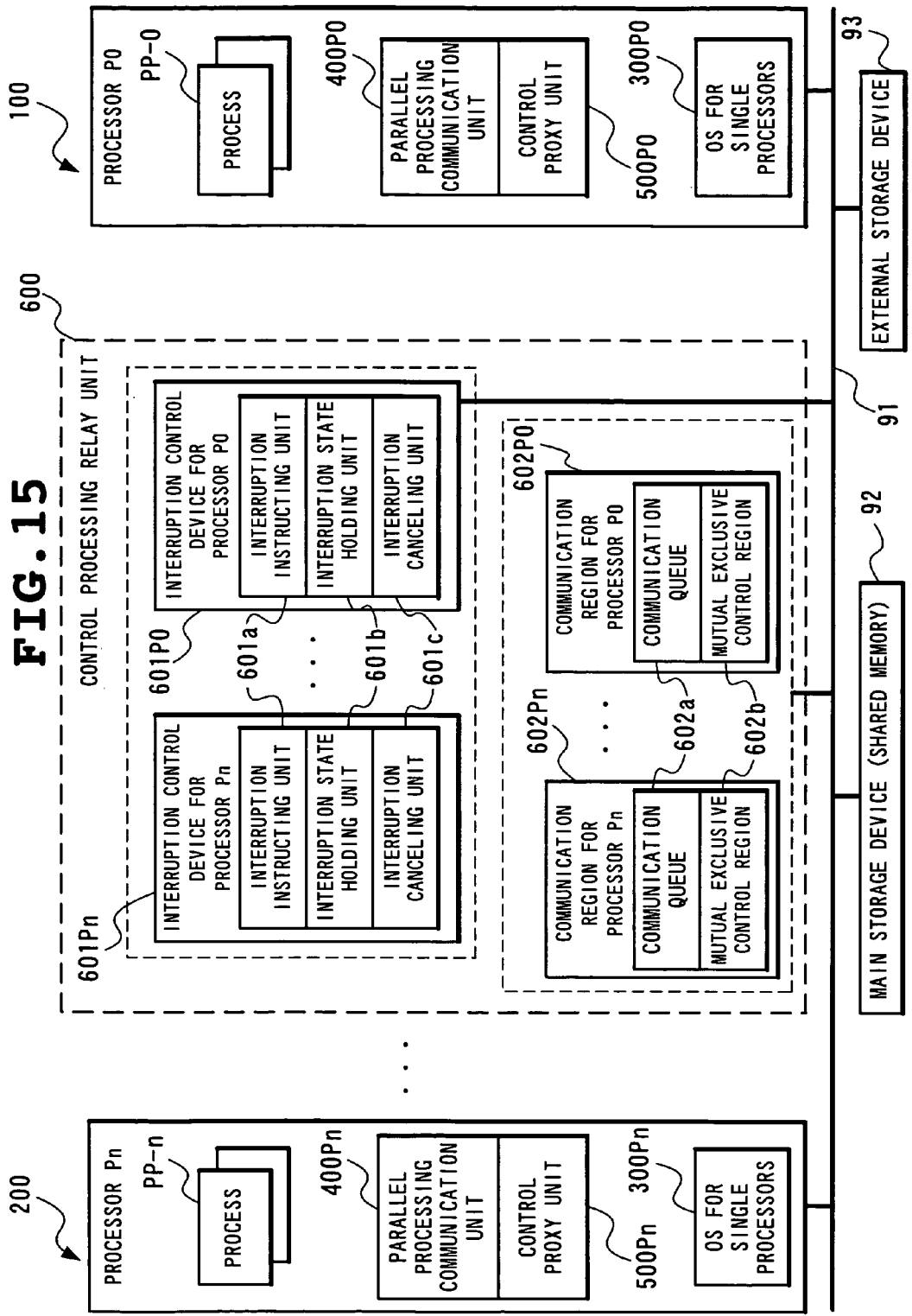
FIG. 15 is a block diagram showing an internal structure of a control processing relay unit in the parallel processing system according to the second example.
Figure 16:
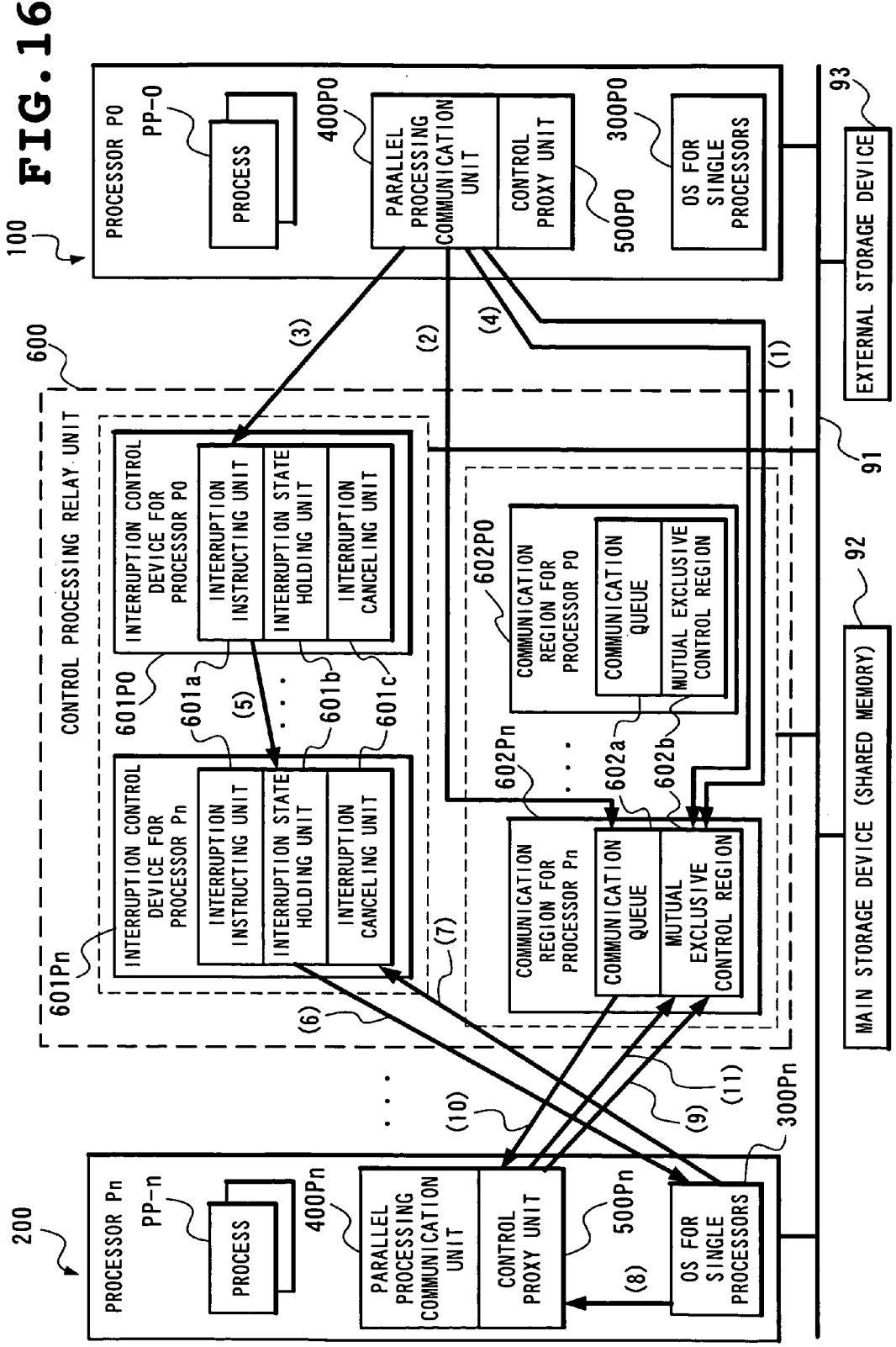
FIG. 16 is a diagram for use in explaining processing operation of the control processing relay unit in the parallel processing system according to the second example.

First, structure of the control processing relay unit 600 is shown in FIG. 15. As illustrated in the figure, the control processing relay unit 600 is structured to include interruption control devices 601P0 to 601Pn corresponding to the respective processors P0 to Pn and communication regions 602P0 to 602Pn corresponding to the respective processors P0 to Pn. Here, the communication regions 602P0 to 602Pn are ensured in the main storage device 92.

The interruption control devices 601P0 to 601Pn each have the same structure as that in the control processing relay unit 60 according to the first example shown in FIG. 6 and is formed of an interruption instructing unit 601*a*, an interruption state holding unit 601*b* and an interruption canceling unit 601*c*.

Also, the communication regions 602P0 to 602Pn each basically have the same structure as that in the first example shown in FIG. 6 and is formed of a communication queue 602*a* as a combination of the communication reason holding region 62*a* and the communication data holding region 62*b* shown in FIG. 6, and a mutual exclusive control region 602*c*.

As an example, operation of the communication processing from the parallel processing communication unit 400P0 on the first processor side 100 to the processor Pn on the second processor side 200 will be described with reference to FIG. 16.

(1) The parallel processing communication unit 400P0 locks the mutual exclusive control region 602*b* of the communication region 602Pn for the processor Pn. More specifically, bring a lock variable stored in the mutual exclusive control region 602*b* to a locked state to prevent the communication region 602Pn for the processor Pn in question from being used by other processor (2) The parallel processing communication unit 400P0 stores the communication reason information and the communication data (required data including the request contents) in the communication queue 602a of the communication region 602Pn.

As the communication reason information to be stored, in a case of the communication processing for process creation/activation as mentioned above, information indicative of "activation of process" (e.g. data such as a predetermined numeric value corresponding to the parallel processing) is stored.

(3) At the time point of (1), if the communication queue 602a of the communication region 602Pn is empty, the parallel processing communication unit 400P0 instructs the interruption instructing unit 601a of its own interruption control device 601P0 to interrupt the processor Pn.

(4) The parallel processing communication unit 400P0 of the processor P0 brings the mutual exclusive control region 602b of the communication region 602Pn for the processor Pn to the unlocked state. If the communication queue 602a of the communication region 602Pn is not empty at the time point of (1), the processing terminates at this point because no interruption is required.

(5) The interruption instructing unit 601a of the interruption control device 601P0 sets information indicative of an interruption at the interruption state holding unit 601b of the interruption control device 601Pn corresponding to the processor Pn. As a result, the processor Pn enters the interrupted state.

(6) The OS 300Pn for single processors of the processor Pn accepts the interruption based on the condition of the interruption state holding unit 601b of the interruption control device 601Pn for the processor Pn.

(7) The OS 300Pn for single processors in the processor Pn releases its interrupted state by clearing the interruption information of its own interruption state holding unit 601b by means of the interruption canceling unit 601c in the interruption control device 601Pn.

(8) The OS 300Pn for single processors in the processor Pn activates its own control proxy unit 500Pn.

(9) The control proxy unit 500Pn of the processor Pn sets a lock at the mutual exclusive control region 602b of its own communication region 602Pn.

(10) The control proxy unit 500Pn of the processor Pn further deletes the communication reason information and the communication data from the communication queue 602a of its own communication region 602Pn.

(11) The control proxy unit 500Pn of the processor Pn unlocks the mutual exclusive control region 602b of the communication region 602Pn for the processor Pn. This makes the communication region 602Pn for the processor Pn be usable by other processor.

Thus, by using the control processing relay unit 600, transmission and reception of control signals and data between the first processor 100 and the second processor 200 is realized.

Figure 17:
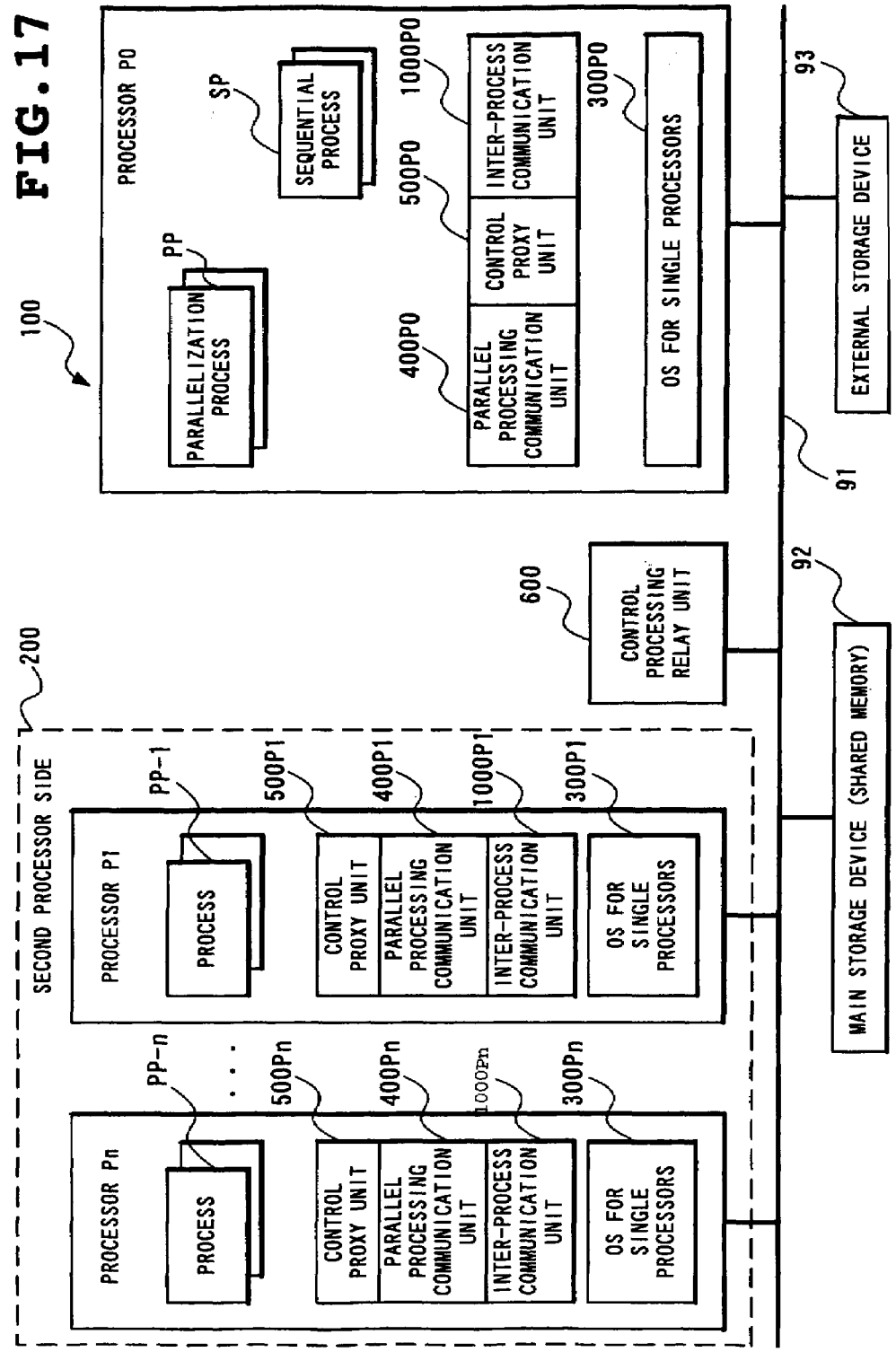
FIG. 17 is a block diagram showing a structure of a parallel processing system according to a third example to which the present invention is applied.

Next, a parallel processing system according to a third example to which the present invention is applied will be described with reference to FIG. 17 and the drawings to follow. FIG. 17 is a block diagram showing a structure of the parallel processing system according to the third example, in which components common to those in FIG. 13 are referenced by the same numerals.

In the above-described synchronous processing in the second example, between processes, it is necessary for one process to repeat checking whether data on the main storage device 92 is updated by other process, resulting in requiring extra processing as much as the repetition, while the present example enables high-performance synchronization and data transmission and reception between processes which require none of such extra processing.

As shown in FIG. 17, the parallel processing system according to the third example includes, similarly to the second example, a multiprocessor composed of a plurality of processors (CPU) P0 to Pn (n is an integer not less than 1) connected through a system bus 91 which is logically divided into two groups of a first processor side 100 and a second processor side 200, with OSes 300P0 to 300Pn for single processors mounted which operate on the processor P0 on the first processor side 100 and the processors (CPU) P1 to Pn on the second processor side 200.

The third example is characterized in further including, in addition to the parallel processing communication units 400P0-400Pn for executing parallel processing of the processor P0 on the first processor side 100 and the processors P1 to Pn on the second processor side 200 and the control proxy units 500P0 to 500Pn in the second embodiment, inter-process communication units 1000P0 to 1000Pn for realizing communication between the respective processes executed on the processor P0 on the first processor side 100 and on the processors P1 to Pn on the second processor side 200.

In other words, the present example enables the inter-process communication function which is conventionally mounted on an OS for multiprocessors to be realized on a parallel processing system by an OS for single processors which operates an OS and an application for single processors on a multiprocessor, thereby enabling an inter-process communication function to be provided on a user-level.

Since also in the present example, the proxy unit 70 by which the OS 300P0 for single processors on the first processor side 100 communicates with a process executed on the second processor side 200 as shown in the first example executes completely the same function as that in the first example, no description will be made thereof for the sake of convenience.

Since structure and operation of other components than the above-described inter-process communication units 1000P0 to 1000Pn are completely the same as those described above in the second example, description will be made only of the inter-process communication units 1000P0 to 1000Pn.

The inter-process communication units 1000P0 to 1000Pn realize communication between the processes executed on the processors P1 to Pn by using such system as a semaphore or a message queue.

Description will be made here with respect to a case where the inter-process units 1000P0 to 1000Pn conduct inter-process communication using the semaphore system.

Figure 18:
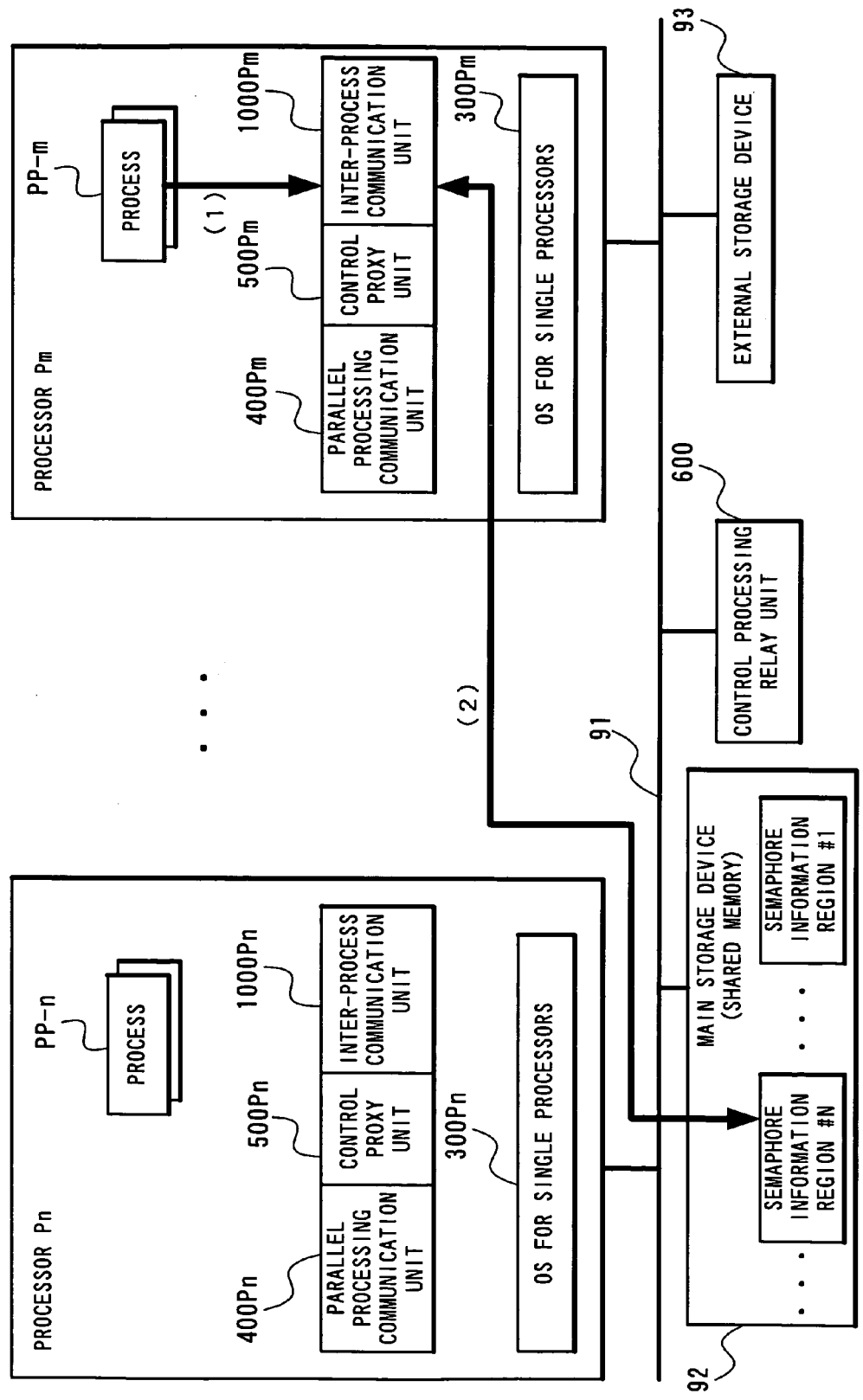
FIG. 18 is a diagram for use in explaining operation to be executed when a process in a processor conducts semaphore-up or-down by using a semaphore system by means of an inter-process communication unit in the parallel processing system according to the third example.

As illustrated in FIG. 18, description will be made of a case where when a process PP-m and a process PP-n are executed on a processor Pm and a processor Pn on the second processor side 200, respectively, the process PP-m and the process PP-n communicate by using the semaphore system by means of inter-process communication units 1000Pm and 1000Pn.

Semaphore is a system for a plurality of processes to communicate and synchronize with each other on a multi-task OS on which a plurality of processes are simultaneously executed and is a kind of shared flag (counter) to which processes to be synchronized with each other pay attention to execute processing according to a change of the counter, thereby realizing communication (synchronization).

First, with reference to FIG. 18, description will be made of operation of the process PP-m on the processor Pm of upping or downing a semaphore information region (shared flag) of the main storage device 92. Assume here that semaphore-up is to increment a counter value of the semaphore information region and semaphore-down is to decrement the counter value of the semaphore information. When semaphore-down is not allowed, the process in question sleeps to enter a waiting state and is waked up by semaphore-up.

(1) When the process PP-m on the processor Pm ups or downs the semaphore (semaphore counter), it makes a request to that effect to the inter-process communication unit 1000Pm.

(2) The inter-process communication unit 1000Pm having received the request accesses a semaphore information region #N (as many semaphore information regions as a number predetermined by the system are ensured) as a shared flag distinguishable by a semaphore number ensured in the main storage device 92 to determine whether the semaphore can be upped or downed.

Figure 19:
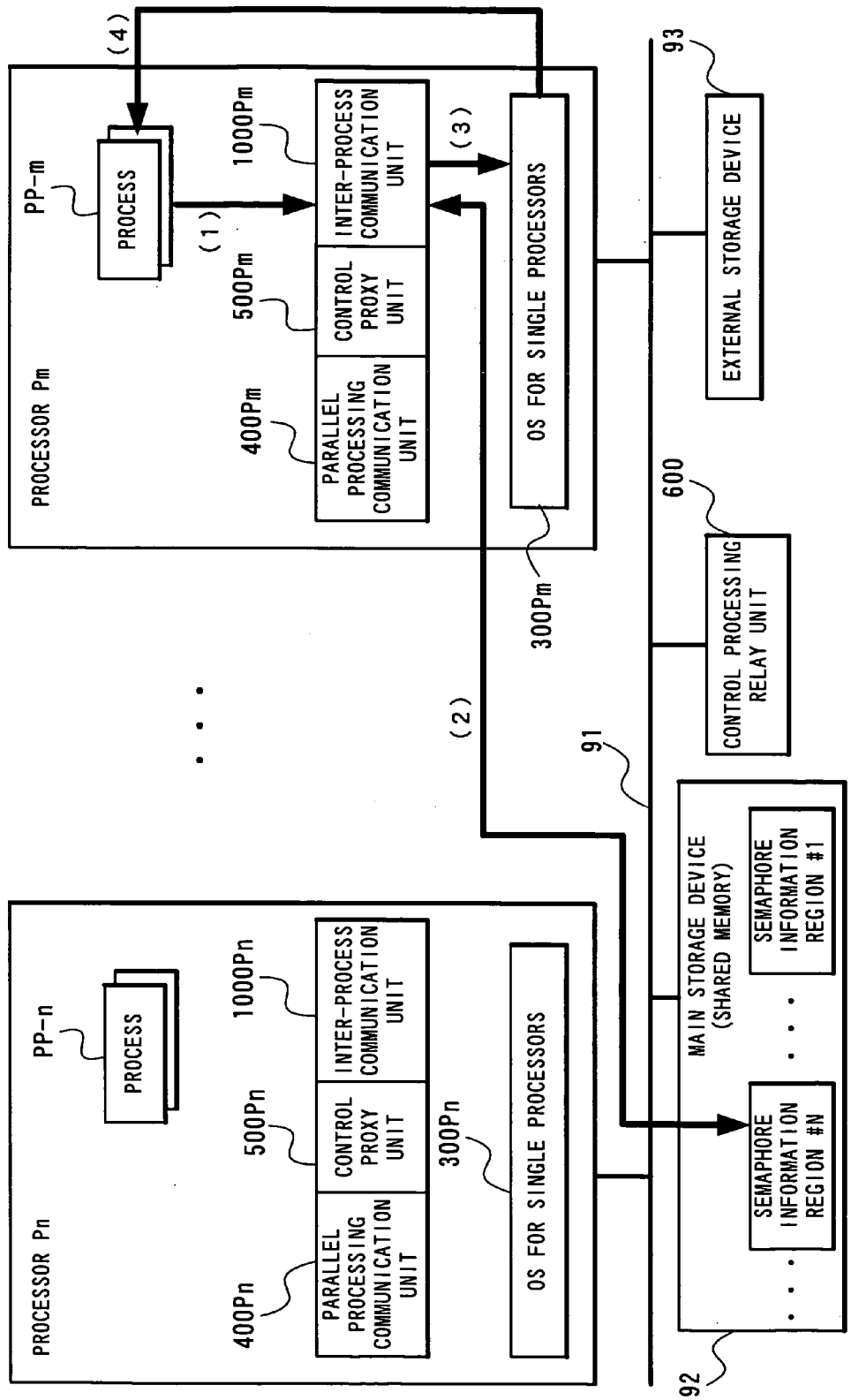
FIG. 19 is a diagram for use in explaining operation to be executed when a process in a processor conducts semaphore-down by using the semaphore system by means of the inter-process communication unit in the parallel processing system according to the third example.

Next, with reference to FIG. 19, description will be made of a case where the process PP-m on the processor Pm downs the semaphore (semaphore flag).

(1) The process PP-m on the processor Pm requests the inter-process communication unit 1000Pm to down the semaphore (semaphore flag).

(2) The inter-process communication unit 1000Pm having received the request accesses the semaphore information region #N ensured in the main storage device 92. Here, an initial value "0" is set as a counter value of the semaphore at the semaphore information region #N and is fixed not to be downed in advance even trying. It is therefore determined that the semaphore can not be downed.

(3) The inter-process communication unit 1000Pm requests the OS 300Pm for single processors to make the process PP-m sleep by using a system call.

(4) The OS 300Pm for single processors makes the process PP-m sleep by using the system call to take out the same from a run queue.

In other words, being not allowed to down the semaphore in the above-described case, the process PP-m sleeps.

Figure 20:
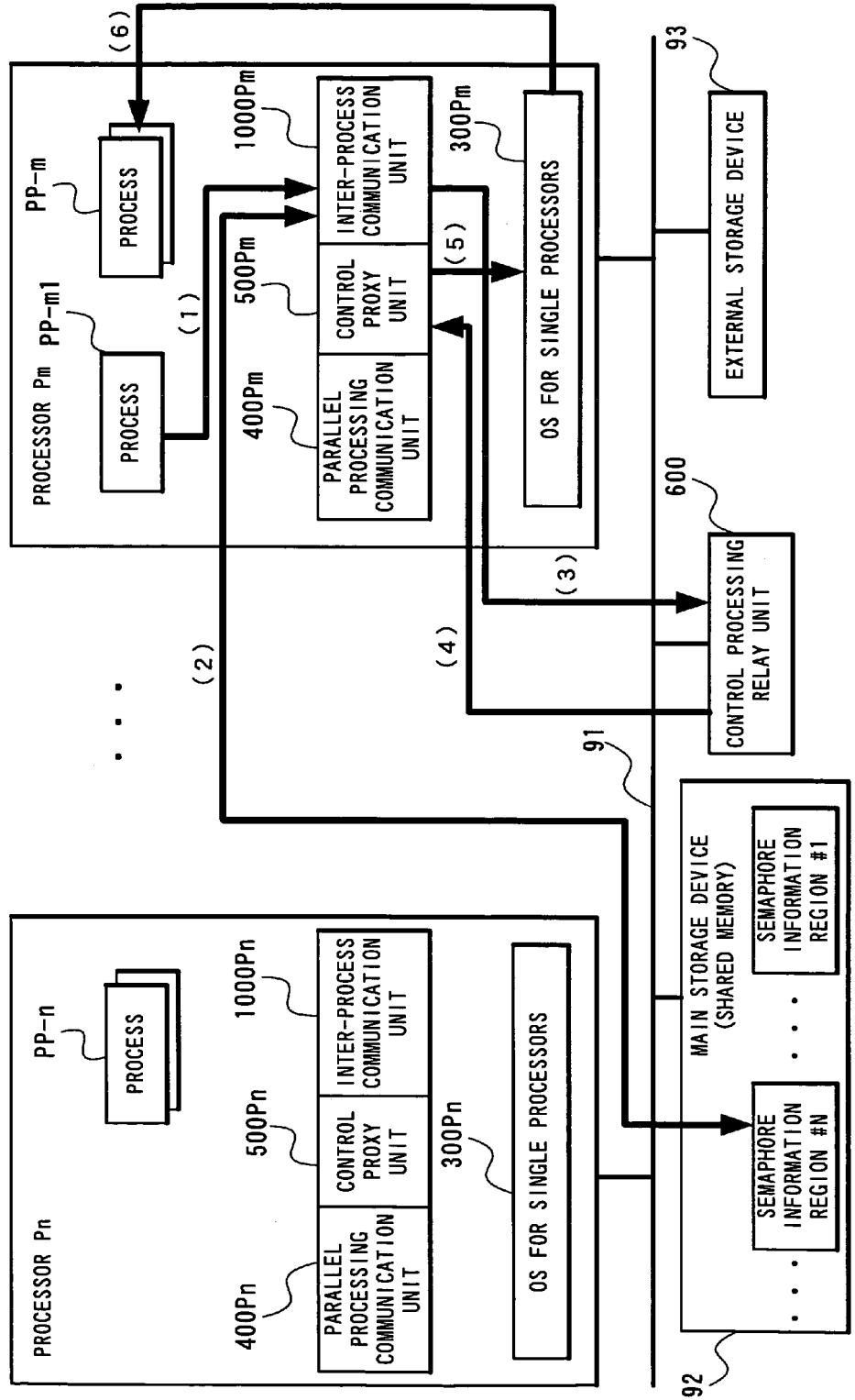
FIG. 20 is a diagram for use in explaining operation to be executed when semaphore-up is conducted between processes in the same processor by using the semaphore system by means of the inter-process communication unit in the parallel processing system according to the third example.

Moreover, with reference to FIG. 20, description will be made of operation executed when with the process PP-m sleeping as described above, a process PP-m1 on the same processor Pm ups the semaphore.

(1) The process PP-m1 requests the inter-process communication unit 1000Pm to up the semaphore.

(2) The inter-process communication unit 1000Pm accesses the semaphore information region #N ensured in the main storage device 92 to determine that there exists the process PP-m waiting for semaphore.

(3) The inter-process communication unit 1000Pm further transmits a message (control message) to a control processing relay unit 600 to request wake-up of the process PP-m.

(4) The control proxy unit 500Pm receives the message from the control processing relay unit 600. Message relay by the control processing relay unit 600 is conducted based on the operation described with reference to FIGS. 15 and 16.

(5) The control proxy unit 500Pm determines from the message that the request is made for wake-up of a process waiting for semaphore to give the OS 300Pm for single processors a request for waking up the process PP-m at the waiting state by using a system call.

(6) The OS 300Pm for single processors wakes up the requested process PP-m by using the system call to connect the same to a run queue. In this case, the waked up process PP-m again tries to down the semaphore.

Requesting wake-up of the process PP-m directly from the inter-process communication unit 1000Pm to the control proxy unit 500Pm by using the communication function of the OS 300Pm for single processors without using control message relay by means of the control processing relay unit 600 described in the processing (3) and (4) set forth above leads to elimination of the processing (3) and (4) to enable high-speed processing.

Figure 21:
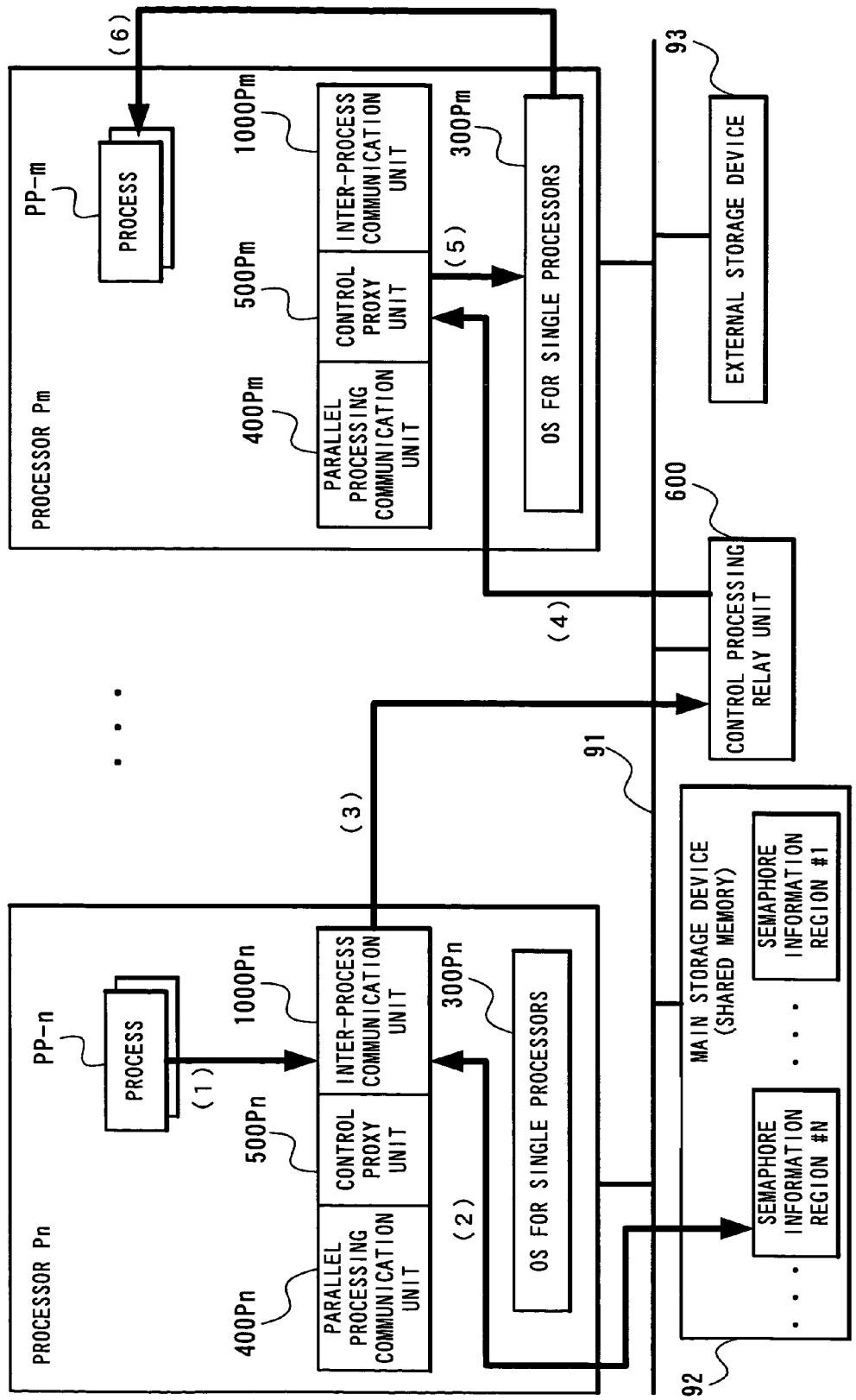
FIG. 21 is a diagram for use in explaining operation to be executed when semaphore-up is conducted between processes in different processors by using the semaphore system by means of the inter-process communication unit in the parallel processing system according to the third example.

With reference to FIG. 21, description will be made of operation conducted in a case where with the process PP-m on the processor Pm sleeping as described above, the process PP-n on other processor Pn ups the semaphore.

(1) The process PP-n on the processor Pn requests semaphore-up from the inter-process communication unit 1000Pn of its own processor Pn.

(2) The inter-process communication unit 1000Pn accesses the semaphore information region #N ensured in the main storage device 92 to determine that there exists the process PP-m waiting for semaphore.

(3) The inter-process communication unit 1000Pn further transmits a message (control message) to the control processing relay unit 600 to request wake-up of the process PP-m.

(4) Subsequently, the control proxy unit 500Pm of the processor Pm receives the message from the control processing relay unit 600. Message relay by the control processing relay unit 600 is conducted based on the operation described with reference to FIGS. 15 and 16.

(5) The control proxy unit 500Pm determines from the message that the request is made for wake-up of a process waiting for semaphore to give the OS 300Pm for single processors a request for waking up the process PP-m at the waiting state by using a system call.

(6) The OS 300Pm for single processors wakes up the requested process PP-m by using the system call to connect the same to a run queue. In this case, the waked up process PP-m again tries to down the semaphore.

Figure 22:
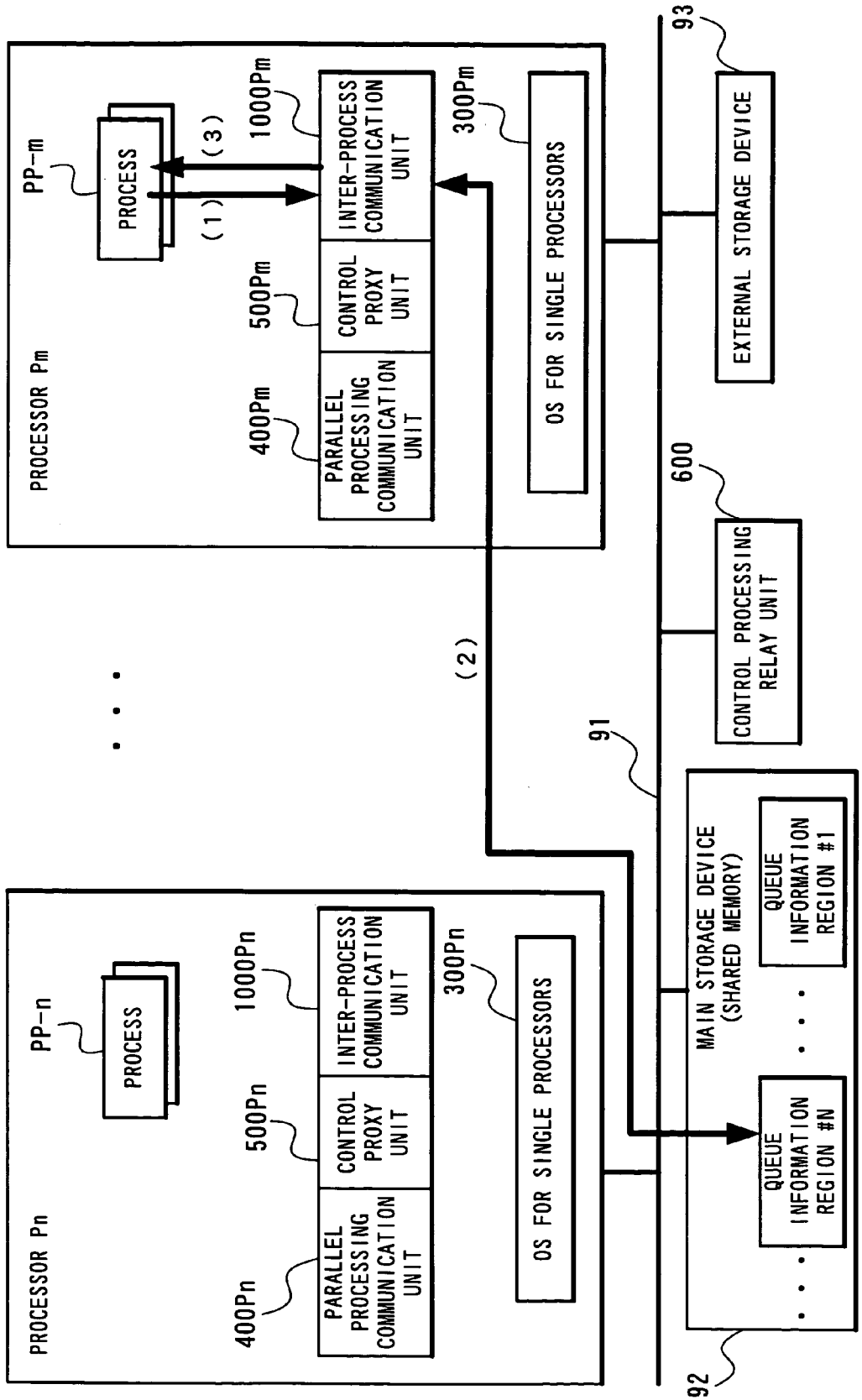
FIG. 22 is a diagram for use in explaining operation to be executed when a process in a processor receives a message by using a message queue system by means of the inter-process communication unit in the parallel processing system according to the third example.

Next, as shown in FIG. 22, description will be made of a case where with the process PP-m and the process PP-n being executed on the processor Pm and the processor Pn on the second processor side 200, the process PP-m and the process PP-n communicate with each other by using a message queue system by means of the inter-process communication units 1000Pm and 1000Pn.

Message queue system, which is a communication method between a plurality of processes, is a system of creating a "queue" as literally indicated by the name and storing a message (processed data transmitted and received between processes) as information in the queue. In the message queue system, a receiver side process is allowed to receive the message in an arbitrary order. When any of the processes receives the message, the message will disappear from the queue.

With reference to FIG. 22, description will be made of a case where the process PP-m on the processor Pm receives a message by using the message queue system. In this case, a message to be obtained exists in a queue information region #N (as many queue information regions as a number predetermined by the system are ensured) distinguishable by a queue number ensured in the main storage device 92.

(1) In order to receive a message, the process PP-m on the processor Pm makes a requests to that effect to the inter-process communication unit 1000Pm.

(2) The inter-process communication unit 1000Pm having received the request accesses the queue information region #N ensured in the main storage device 92 to receive the message.

(3) Then, the inter-process communication unit 1000Pm copies the received message onto the requesting source process PP-m. At this time point, the message in question is erased from the queue information region #N ensured in the main storage device 92.

Next, with reference to FIG. 23, description will be made of second operation executed when the process PP-m on the processor Pm receives a message by the message queue system. In this case, a message to be obtained fails to exist in the queue information region #N ensured in the main storage device 92.

(1) In order to receive a message, the process PP-m on the processor Pm makes a request to that effect to the inter-process communication unit 1000Pm.

(2) The inter-process communication unit 1000Pm having received the request accesses the queue information region #N ensured in the main storage device 92. In this case, determination is made that the message to be obtained fails to exist in the ensured queue information region #N to disable reception of the message.

(3) The inter-process communication unit 1000Pm requests the OS 300Pm for single processors to make the process PP-m sleep by using a system call.

(4) The OS 300Pm for single processors makes the process PP-m sleep by using the system call to disconnect the same from the run queue.

In other words, the process PP-m is not allowed to receive the message, so that it sleeps in the above-described case.

Figure 24:
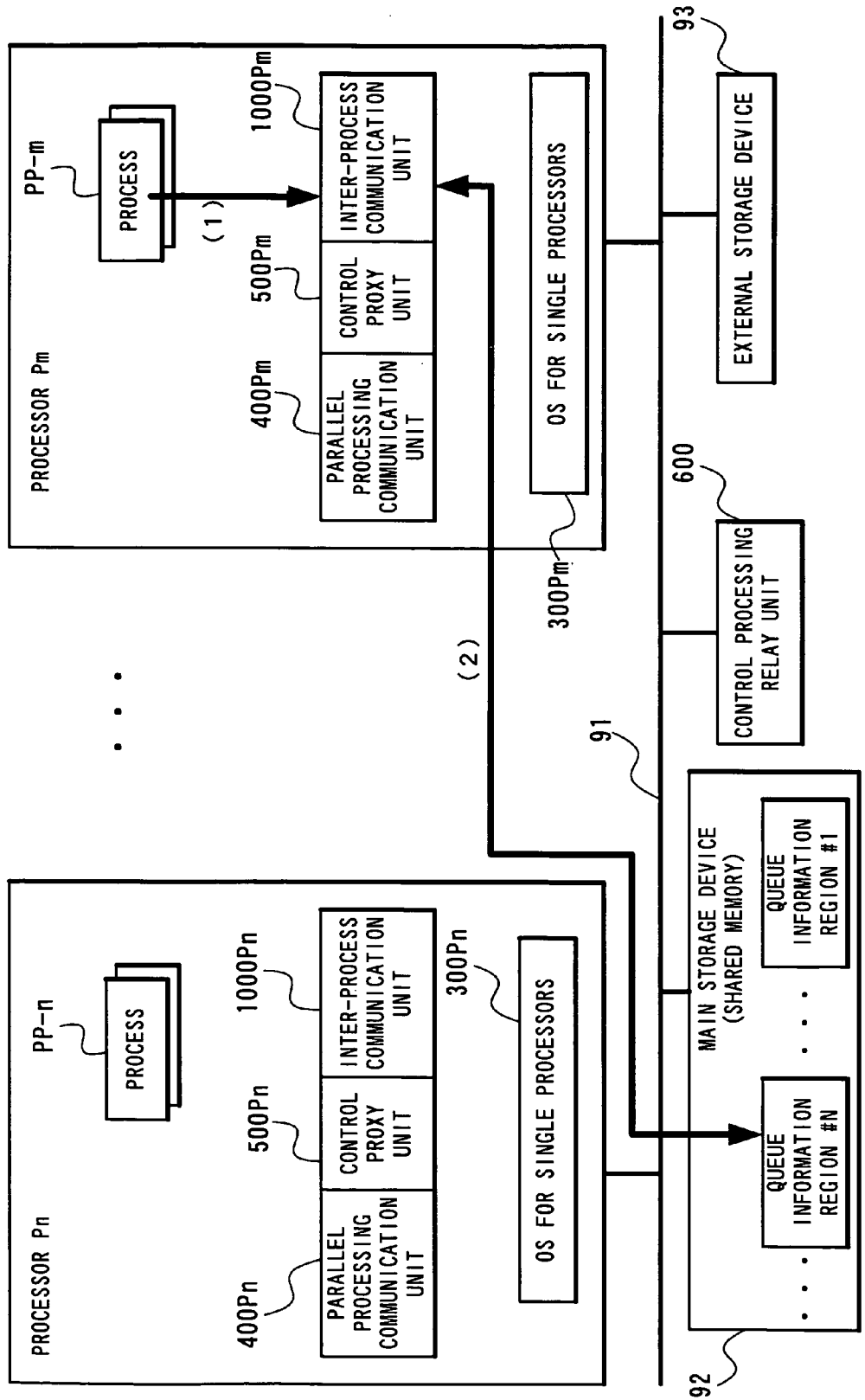
FIG. 24 is a diagram for use in explaining operation to be executed when a process in a processor transmits a message by using the message queue system by means of the inter-process communication unit in the parallel processing system according to the third example.
Figure 25:
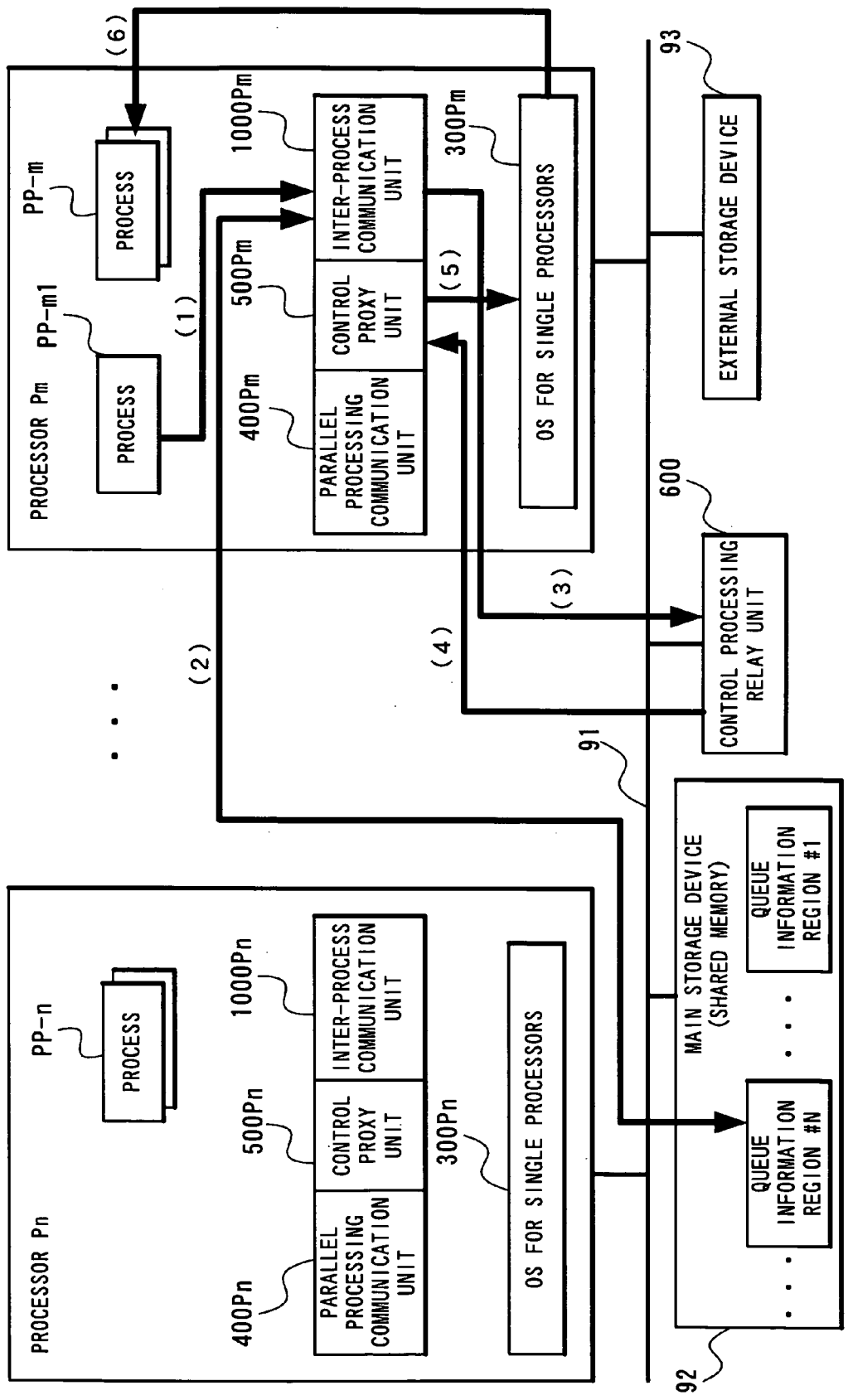
FIG. 25 is a diagram for use in explaining operation to be executed when message transmission and reception is conducted between processes in the same processor by using the message queue system by means of the inter-process communication unit in the parallel processing system according to the third example.

With reference to FIG. 24, description will be made of operation executed when the process PP-m on the processor Pm transmits a message by the message queue system. In this case, no process exists which is waiting for a message to be transmitted and only the message transmission to the queue information region #N ensured in the main storage device 92 is conducted.

(1) In order to transmit a message, the process PP-m on the processor Pm makes a request to that effect to the inter-process communication unit 1000Pm.

(2) The inter-process communication unit 1000Pm having received the request accesses the queue information region #N ensured in the main storage device 92 to store the message from the process PP-m.

Description will be further made of operation executed when a process on the processor Pm transmits a message by the message queue system. In this case, there exists a process waiting for a message to be transmitted. In other words, this is a case where with the process PP-m being unable to receive a message and sleeping, a message is sent from a process PP-m1 as shown in the example in FIG. 23.

(1) The process PP-m1 requests message transmission from the inter-process communication unit (2) The inter-process communication unit 1000Pm accesses the queue information region #N ensured in the main storage device 92 to store the message from the process PP-m1. Here, determination is made that there exists the process PP-m waiting for a message.

(3) The inter-process communication unit 1000Pm further transmits a control message to the control processing relay unit 600 to request wake-up of the process PP-m.

(4) The control proxy unit 500Pm receives the control message from the control processing relay unit 600.

(5) The control proxy unit 500Pm determines from the control message that the command is for waking up a process waiting for a message and requests the OS 300Pm for single processors to wake up the above-described process PP-m at the waiting state by using a system call.

(6) The OS 300Pm for single processors wakes up the requested process PP-m by using the system call to connect the same to the run queue.

In this case, the waked up process PP-m again tries to receive the message. As a result, the message from the process PP-m1 is received by the process PP-m.

Requesting wake-up of the process PP-m directly from the inter-process communication unit 1000Pm to the control proxy unit 500Pm by using the communication function of the OS 300Pm for single processors without using control message relay by the control processing relay unit 600 shown in the above-described processing (3) and (4) leads to elimination of the processing (3) and (4) to enable high-speed processing.

Figure 23:
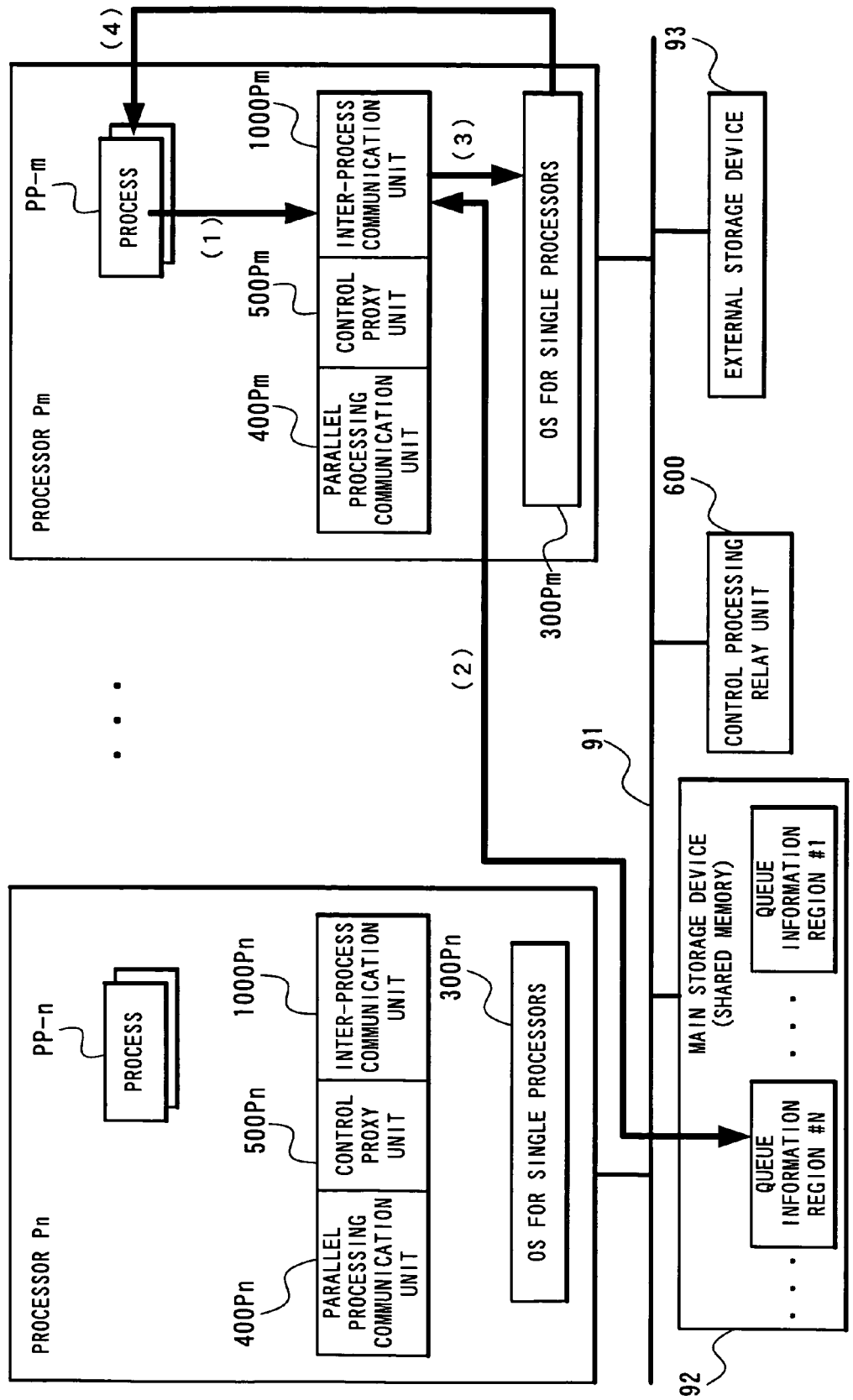
FIG. 23 is a diagram for use in explaining operation to be executed when a process in a processor receives a message by using the message queue system by means of the inter-process communication unit in the parallel processing system according to the third example.
Figure 26:
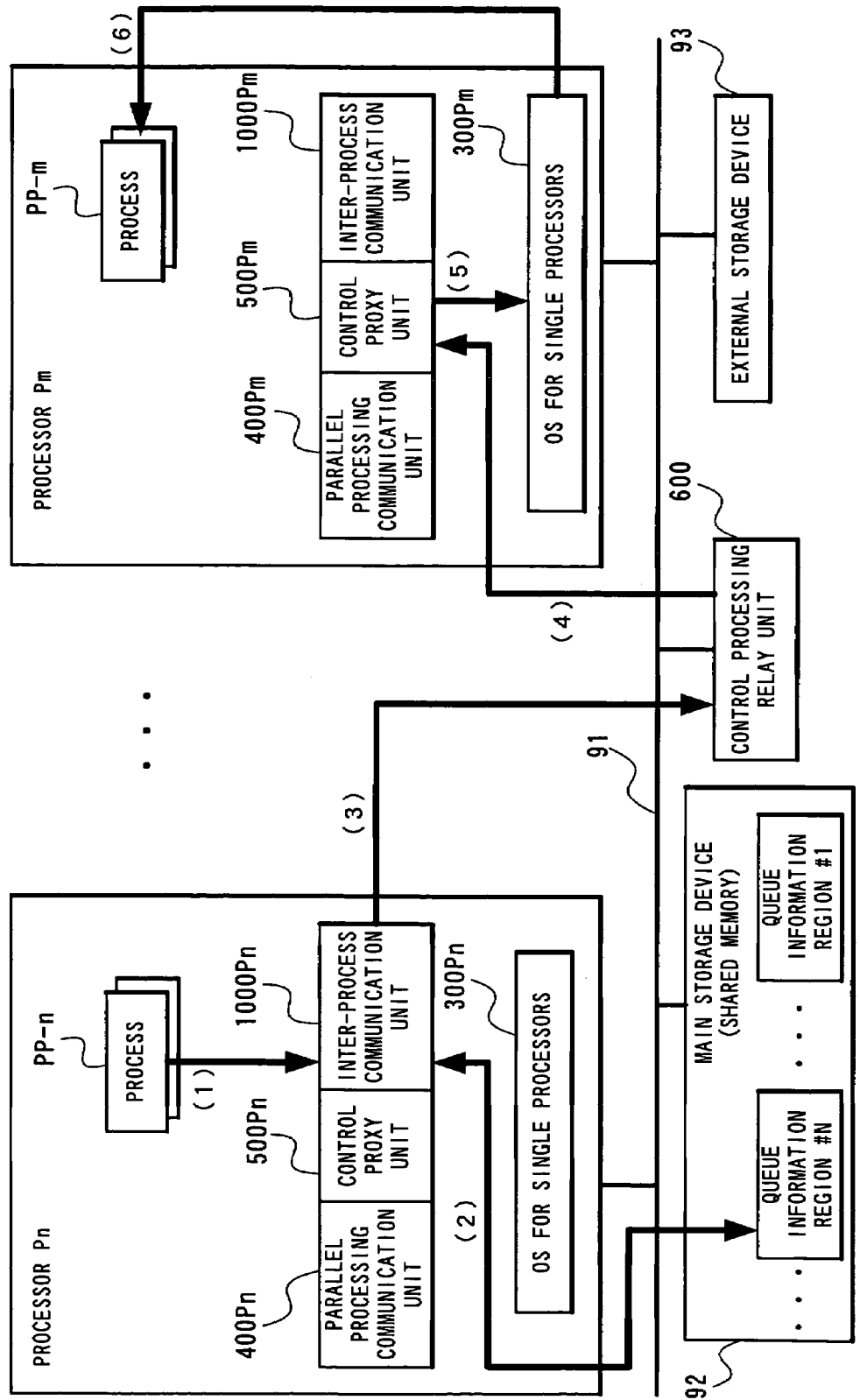
FIG. 26 is a diagram for use in explaining operation to be executed when message transmission and reception is conducted between processes in different processors by using the message queue system by means of the inter-process communication unit in the parallel processing system according to the third example.

With reference to FIG. 26, description will be made of operation conducted in a case where with the process PP-m on the processor Pm sleeping to wait for a message, the process PP-n on other processor Pn transmits a message as shown in FIG. 23.

(1) The process PP-n on the processor Pn requests the inter-process communication unit 1000Pn of its own processor Pn to transmit a message.

(2) The inter-process communication unit 1000Pn accesses the queue information region #N ensured in the main storage device 92 to store the message from the process PP-n. It is determined here that there exists the process PP-m waiting for a message.

(3) The inter-process communication unit 1000Pn further transmits a control message to the control processing relay unit 600 to request wake-up of the process PP-m.

(4) Subsequently, the control proxy unit 500Pm of the processor Pm receives the control message from the control processing relay unit 600.

(5) The control proxy unit 500Pm determines from the control message that the command is for waking up a process waiting for a message and gives the OS 300Pm for single processors a request for waking up the above-described process PP-m at the waiting state by using a system call.

(6) The OS 300Pm for single processors wakes up the requested process PP-m by using the system call to connect the same to a run queue.

In this case, the waked up process PP-m again tries to receive the message. As a result, the message from the process PP-n is received by the process PP-m to execute inter-process communication between different processes.

According to the present example, process control such as process switching and data transmission and reception are enabled by process communication (synchronization or message transmission and reception) within the same processor or between different processors by the inter-process communication units 1000P0 to Pn by using the semaphore system or the message queue system in the manner as described in the foregoing.

Although inter-process communication by an OS for single processors is conducted limitedly between processes in the same processor and process communication between different processors should be conducted by using a network having heavy processing loads or the like, using the semaphore system and the message queue system by the control processing relay unit 600 and the inter-process communication units 1000P0 to Pn whose processing speed is faster than that of network communication realizes inter-process communication having a high processing speed also in a multiprocessor system mounted with an OS for single processors.

As to inter-process communication within the same processor, substantially equivalent performance can be obtained to the processing performance required from sleep to wake-up of a process by an OS for single processors.

A further advantage is that unlike an OS for multiprocessors, even if each processor is mounted with a different OS for single processors, inter-process communication between processors is possible.

Next, description will be made of a specific example of the above-described inter-process communication by using the semaphore system and the message queue system by means of the inter-process communication units 1000P0 to 1000P with reference to FIG. 27.

Figure 27:
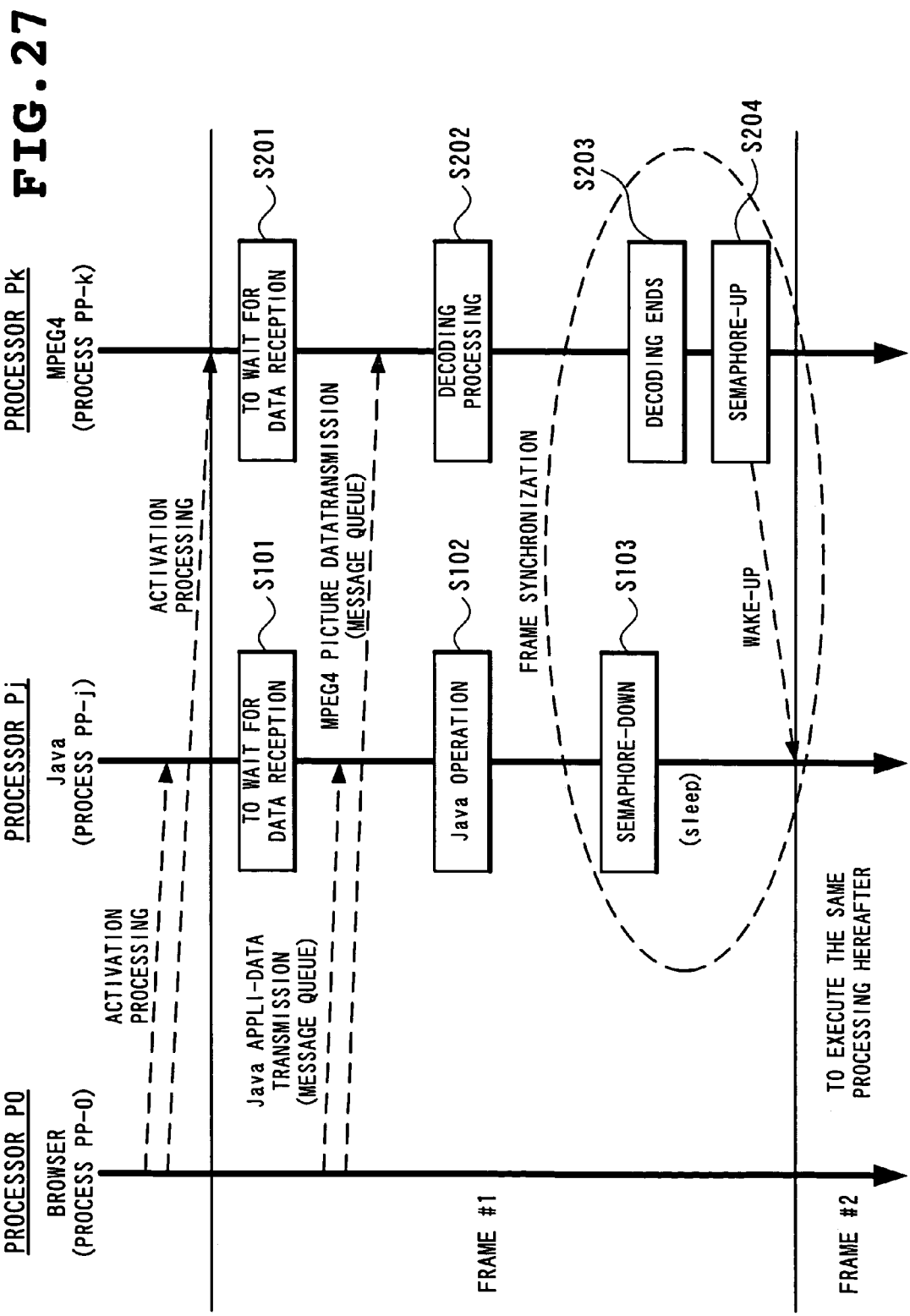
FIG. 27 is a diagram for use in explaining a specific example of inter-process communication by using the semaphore system and the message queue system in the parallel processing system according to the third example.
Figure 28:
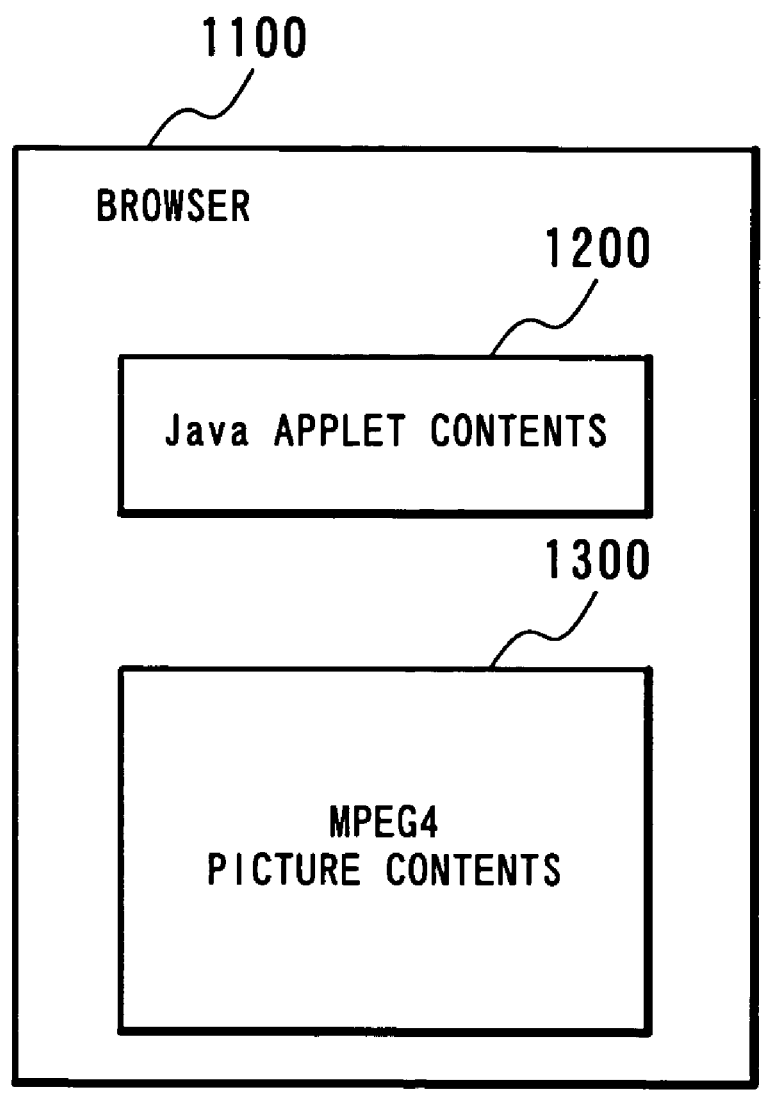
FIG. 28 is a diagram for use in explaining display contents on a browser screen in the specific example shown in FIG. 27.

In FIG. 27, the process PP-0, a process PP-j and a process PP-k are executed on the processor P0, a processor Pj and a processor Pk, respectively. Here, the process PP-0 operates as a browser, the process PP-j as a java applet and the process PP-k as an MPEG4 application and as illustrated in FIG. 28, within a window embedded in a browser 1100 by the process PP-0, java applet contents 1200 by the process PP-j and MPEG4 picture contents 1300 by the process PP-k are displayed in synchronization with each other.

In this example, among the units of work of the application operating on the OS 300P0 for single processors on the first processor side 100, the process PP-0 is operated on the processor P0 and the process PP-j and the process PP-k, which are the processes that can be, parallelized within the application, are parallel-processed in the processor Pj and the processor Pk on the second processor side 200.

In FIG. 27, when the java applet (process PP-j) and the MEPG4 application (process PP-k) are activated, both wait for reception of java appli-data and MPEG4 picture data from the browser (process PP-0) (Steps S101 and S201).

Here, from the process PP-0 of the processor P0, by using message transmission by means of the inter-process communication unit 1000P0, the java appli-data and the MPEG4 picture data are transmitted as a message and received by the java applet (process PP-1) and the MPEG4 application (process PP-k).

As a result, operation by the java applet (process PP-j) is started (Step S102) to start decoding processing by the MPEG4 application (process PP-k) (Step S202).

In this example, since it is clear in advance that operation by the java applet (process PP-j) ends earlier than the decoding processing by the MPEG4 application (process PP-k), the initial value of the semaphore counter is set to "0" such that after finishing the operation, the java applet (process PP-j) waits for completion of the processing by the MPEG4 application (process PP-k), thereby preventing the java applet (process PP-j) having finished the operation earlier from downing the semaphore. In addition, the MPEG4 application (process PP-k) is defined to up the semaphore after finishing the processing.

Although the java applet (process PP-j) tries to down the semaphore (Step S103), it can not down the same because the initial value of the counter is "0", so that it sleeps to wait for semaphore.

When the MPEG4 application (process PP-k) ends the processing (Step S203), it requests semaphore-up (Step S204). As a result, the java applet (process PP-j) waiting for semaphore is waked up and allowed to down semaphore.

Repeating the foregoing operation for each frame results in displaying the contents 1200 of the java applet by the process PP-j and the MEPG4 picture contents 1300 by the process PP-k in synchronization with each other within the window embedded in the browser 1100 by the process PP-0.

Figure 29:
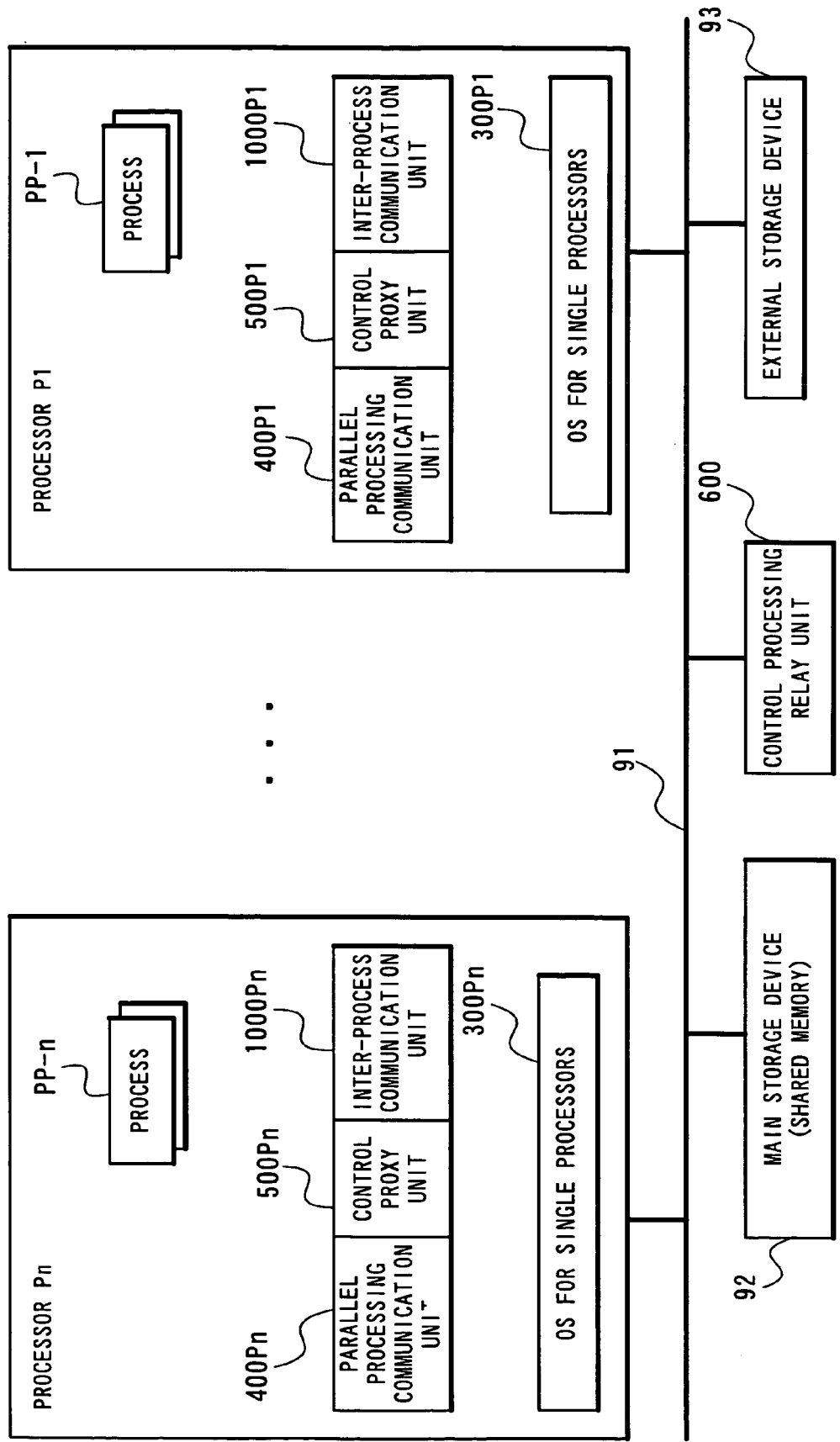
FIG. 29 is a block diagram showing a structure of a parallel processing system according to a fourth example to which the present invention is applied.

Next, a parallel processing system according to a fourth example of the present invention will be described with reference to FIG. 29. FIG. 29 is a block diagram showing a structure of the parallel processing system according to the fourth example, in which components common to those in FIG. 13 are referenced by the same numerals.

As shown in FIG. 29, the parallel processing system according to the fourth example includes a multiprocessor composed of a plurality of processors (CPU) P1~Pn (n is an integer not less than 2) connected through a system bus 91, which are mounted with OSes 300P1 to 300Pn for single processors operating on the respective processors P1 to Pn.

More specifically, the present example differs from the first to third examples in that the multiprocessor is not logically divided into two groups, the first processor side and the second processor side.

The fourth example, similarly to the above-described third example, is characterized in further including, in addition to the parallel processing communication units 400P1 to 400Pn and control proxy units 500P1 to 500Pn for executing parallel processing of the processors P1 to Pn, the inter-process communication units 1000P1 to 1000Pn for realizing communication between the respective processes executed on the processors P1 to Pn.

On the other hand, process control on each of the processors P1 to Pn is possible without having the OS service units 50P1 to 50Pn as provided in the first example and the parallel processing communication units 400P1 to 400Pn as provided in the first to third examples. The OSes 300P1 to 300Pn for single processors on the respective processors P1 to Pn need not be the same OS but be different from each other.

In other words, the present example as well enables the inter-process communication function which is conventionally mounted on an OS for multiprocessors to be realized on a parallel processing system by an OS for single processors which operates an OS for single processors and an application on a multiprocessor, thereby enabling an inter-process communication function to be provided on a user-level.

Execution of each process in each of the processors P1 to Pn is executed without requiring mutual exclusive control with other processor.

Inter-process communication within an individual processor P1~Pn and inter-process communication between the processors are conducted, as described in the third example, by using the semaphore system and the message queue system by means of the inter-process communication units 1000P1 to 1000Pn to execute synchronization processing and data transmission and reception between the processes.

Figure 30:
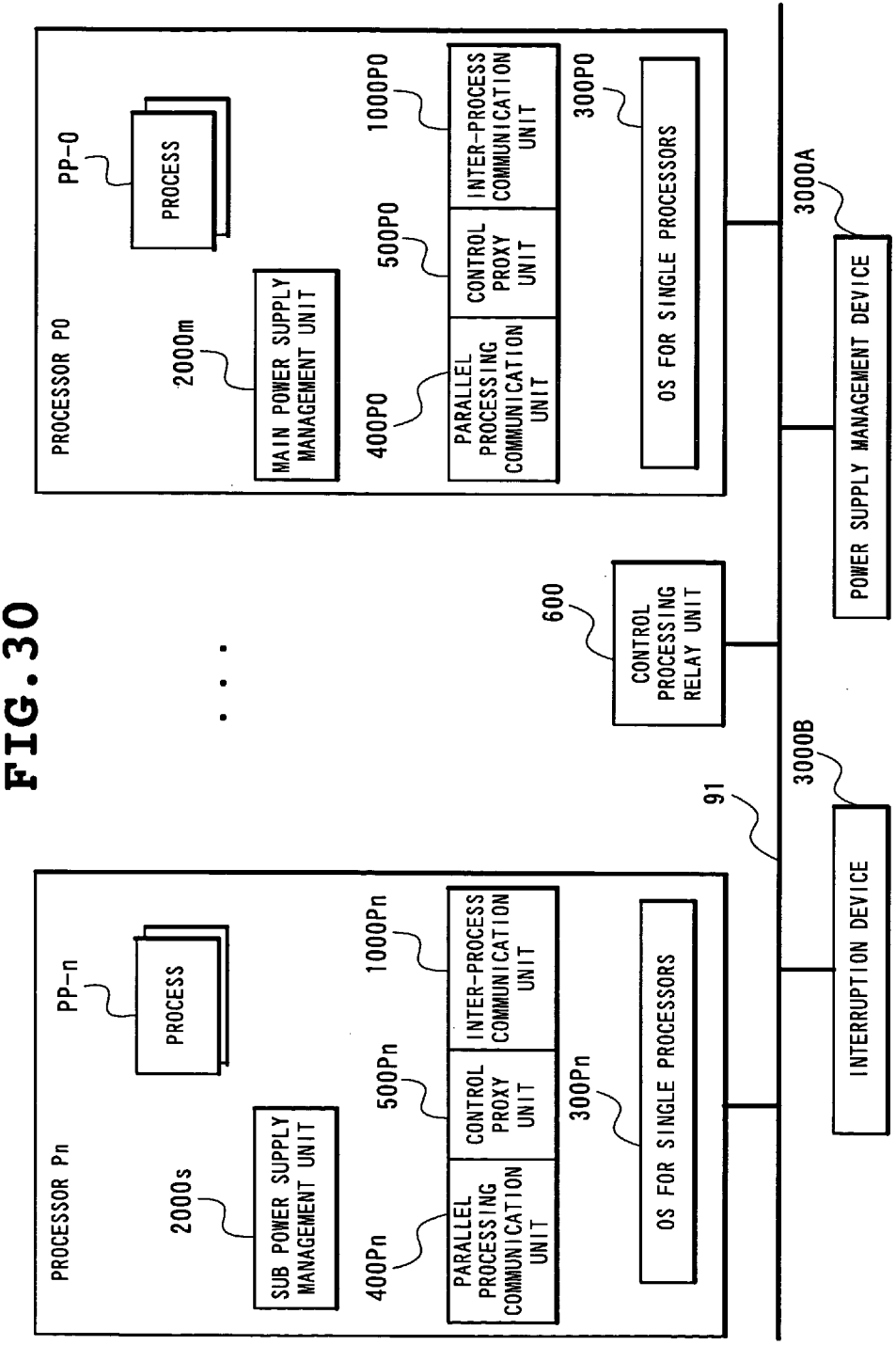
FIG. 30 is a block diagram showing a structure of a power supply management system in a parallel processing system according to a first embodiment of the present invention.

A power supply management system according to the present invention applied to the above-described parallel processing system will be described with reference to FIG. 30. Here, description will be made of a first embodiment in which the power supply management system of the present invention is applied to the parallel processing system shown as the third example.

The power supply management system according to the first embodiment is structured to have a main power supply management unit 2000m provided in the processor P0 of the parallel processing system shown in FIG. 17 and a sub-power supply management unit 2000s provided in each of the processors P1~Pn. Further provided are a power supply management device 3000A which turns ON/OFF the power of each processor P0~Pn and an interruption device 3000B which controls an interruption from the OS 300P0~Pn for single processors. The power supply management device 3000A and the interruption device 3000B are devices controllable by a driver provided in the OS for single processors.

The main power supply management unit 2000m, which is related to power supply management of each processor forming the parallel processing system, has two functions, a function of managing, as software, a state of power supply of other processors P1~Pn and a function of asking for a change of power supply state.

With the power supply management function of the main power supply management unit 2000m, the unit manages any of four states, activate, stop, on the way to activation (state from the start of activation until when the activated state stabilizes), and on the way to stopping (state from the start of stopping until when the stopped state stabilizes) of each of other processors P1~Pn. At the time of activation, the main power supply management unit 2000m checks which of the processors P1~Pn is activated to have its sub power supply management unit operating.

In asking for a change of a power supply state, the main power supply management unit 2000m makes a boot request (processing of turning on power to activate the system) and a halt request (processing of stopping the system to make a transition to a state where power can be turned off) for a part or all of the other processors P1~Pn, and a halt request for all the processors.

The sub power supply management unit 2000s has a function of executing halt processing of its own processor, a function of transmitting an activation message to the main power supply management unit 2000m at the time of activation, and a function of requesting the main power supply management unit 2000m to boot or halt other processors. Although description will made of halt processing as processing for stopping the system to make a transition to a state where power can be turned off in the following, the same can be similarly applied in a case of executing shut-down processing and suspend processing other than the halt processing.

Figure 31:
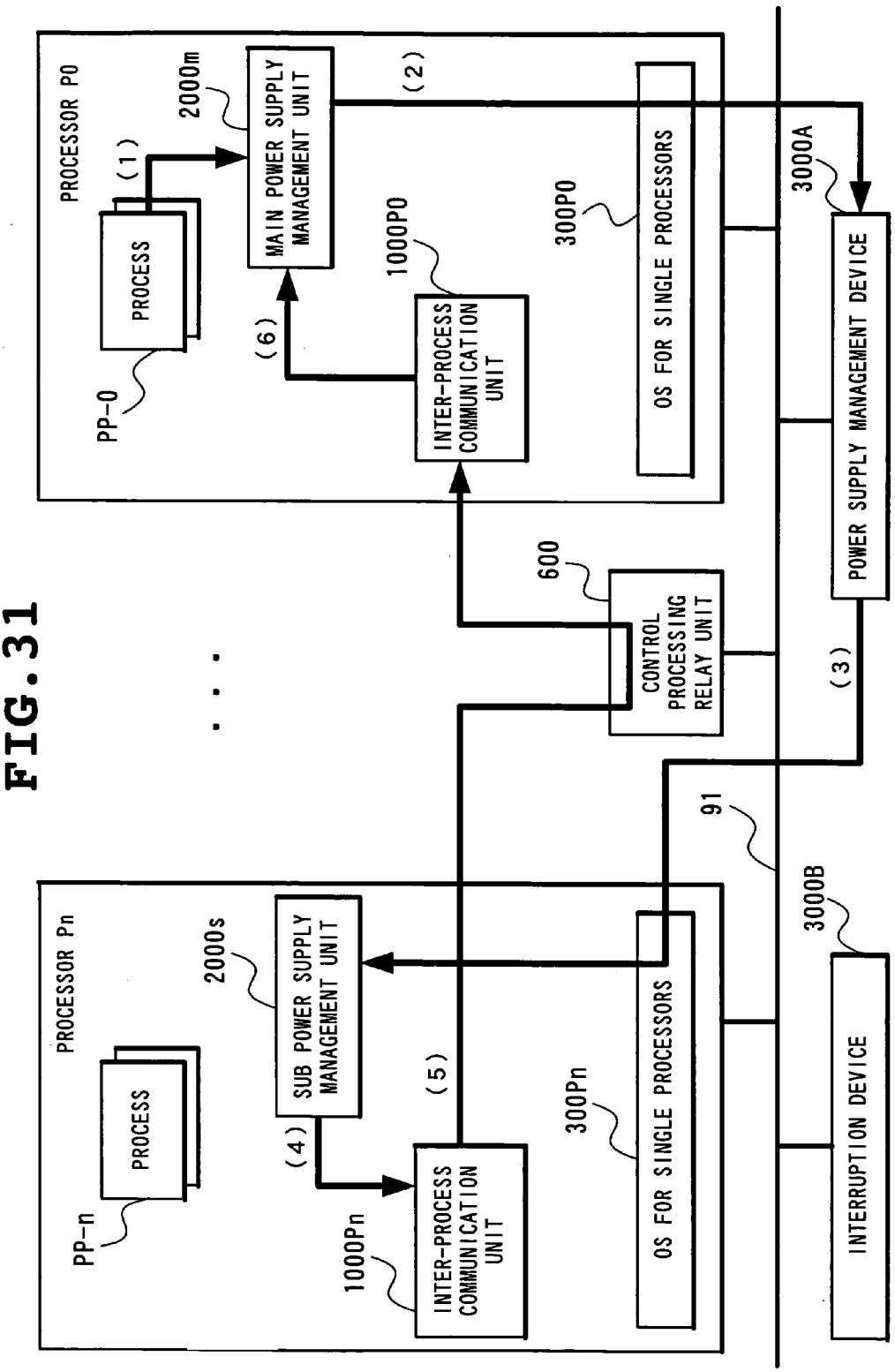
FIG. 31 is a diagram for use in explaining operation of booting a processor in the first embodiment of the present invention.

First, description will be made of operation executed when a process on the processor P0 boots other processor Pn with reference to FIG. 31.

(1) The process on the processor P0 makes a request for booting the processor Pn to the main power supply management unit 2000m. In this boot request, designate the processor Pn as a processor to be booted.

(2) In the confirmation of a state at the time of activation, when the processor Pn is at a stopped state, the main power supply management unit 2000m accesses the power supply management device 3000A of the OS through the OS 300P0 for single processors to turn on the power of the processor Pn. Then, change the state of the processor Pn to an on the way to activation state.

(3) When the power of the processor Pn is turned on, the OS 300Pn for single processors is activated to activate the sub power supply management unit 2000s as well.

(4) Subsequently, the sub power supply management unit 2000s of the processor Pn transmits a boot completion message indicative of completion of booting to its own inter-process communication unit 1000Pn.

(5) The inter-process communication unit 1000Pn on the processor Pn relays the above-described boot completion message to the inter-process communication unit 1000Pn on the processor P0 through the control processing relay unit 600.

(6) The main power supply management unit 2000m of the processor P0 receives the boot completion message from the inter-process communication unit 1000P0 to change the state of the processor Pn to the activated state.

In a case where the processor Pn is not at the stopped state but at an on the way to stopping state, refrain from executing processing until the processor makes a transition to the stopped state at the processing of (6) and again execute the processing starting with the processing (2) when the processor enters the stopped state.

It is also possible to, after the processing of (6), notify the process of the processor P0 which has made the boot request that the booting is completed. For example, in the above-described example, in a case where processing by the process of the processor P0 is kept waiting until booting the processor Pn is completed, it is possible to resume processing by the process of the processor P0 by giving a notification that booting is completed.

In addition, when the processor Pn is at the activated state or the on the way to activation state, ignore the boot request.

Through the foregoing procedure, the processing of booting the processor Pn by the process on the processor P0 is finished.

Figure 32:
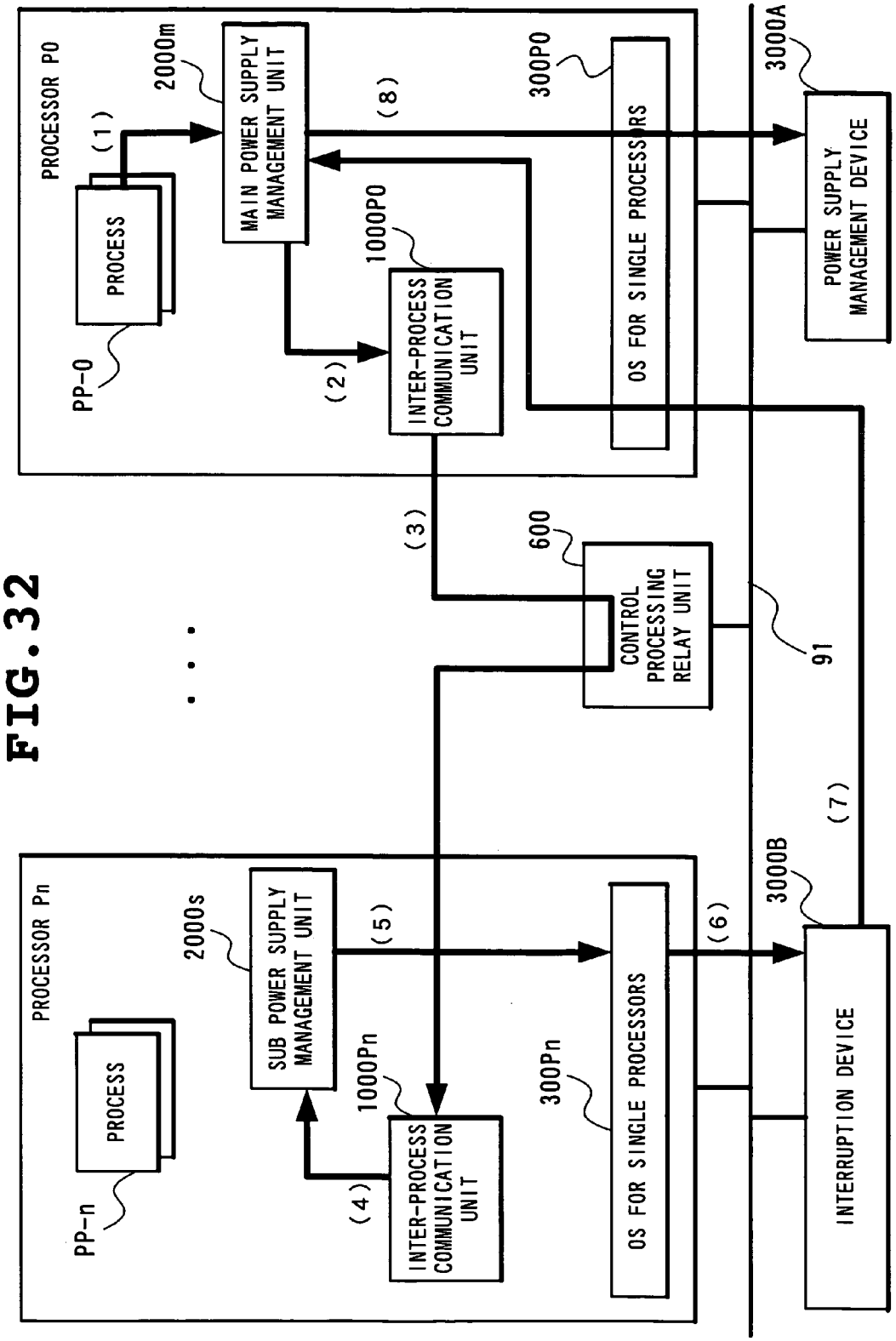
FIG. 32 is a diagram for use in explaining operation of halting a processor in the first embodiment of the present invention.

Next, description will be made of operation of halting other processor Pn by a process on the processor P0 with reference to FIG. 32.

(1) The process on the processor P0 makes a request for halt processing of the processor Pn to the main power supply management unit 2000m.

(2) In confirming a state at the time of activation, when the processor Pn is at the activated state, the main power supply management unit 2000m transmits a halt request message to the inter-process communication unit 1000P0. Also change the state of the processor Pn to the on the way to stopping state.

(3) The inter-process communication unit 1000P0 of the processor P0 relays the halt request message to the inter-process communication unit 1000Pn on the processor Pn via the control processing relay unit 600.

(4) The sub power supply management unit 2000s of the processor Pn receives the halt request message from the inter-process communication unit 1000Pn.

(5) Subsequently, the sub power supply management unit 2000s on the processor Pn determines that the message relates to a halt request to notify the OS 300Pn for single processors of the halt processing.

(6) After the completion of the halt processing, the OS 300Pn for single processors having received the notification notifies the processor P0 of the completion of the processing by using an interruption by the interruption device 3000B of the OS.

(7) The device driver for the power supply management device 3000A for the OS 300P0 for single processors on the processor P0 receives the interruption to notify the main power supply management unit 2000m of the interruption.

(8) The main power supply management unit 2000m having been notified turns off the power of the processor Pn through the power supply management device 3000A for the OS 300P0 for single processors to change the state of the processor Pn to the stopped state.

Here, in a case where the processor Pn is not at the activated state but at the on the way to activation state when a halt request is made, refrain from executing processing until the processor makes a transition to the activated state in the processing of (8) and again execute the processing starting with the processing of (2) when the processor enters the activated state.

When the processor Pn is at the stopped state or on the way to stopping, ignore the halt request.

Through the foregoing procedure, the processing of halting the processor Pn by the process on the processor P0 is finished.

Although the foregoing description has been made of a case where the process of the processor P0 executes the boot processing and the halt processing of other one processor Pn, it is possible to execute the above-described boot processing and halt processing with respect to each processor in parallel to each other based on a boot request or a halt request from all the other processors P1~Pn or a part (a plurality) of other processors.

While the foregoing description has been made of a case where the process of the processor P0 makes a boot request and a halt request with respect to the processor Pn, it is also possible to transmit the boot request and the halt request from a process on other processor to the main power supply management unit 2000m of the processor P0. Transmission of the boot request and the halt request in this case is conducted by the inter-process communication units 1000P1~1000Pn.

In addition, after the processing (8), it is possible to notify the process of the processor P0 having made the halt request that halt is completed. In the above-described example, in a case, for example, where the processing by the process of the processor P0 is kept waiting until halt of the processor Pn is completed, giving a notification that halt is completed allows the processing by the process of the processor P0 to be resumed.

Figure 33:
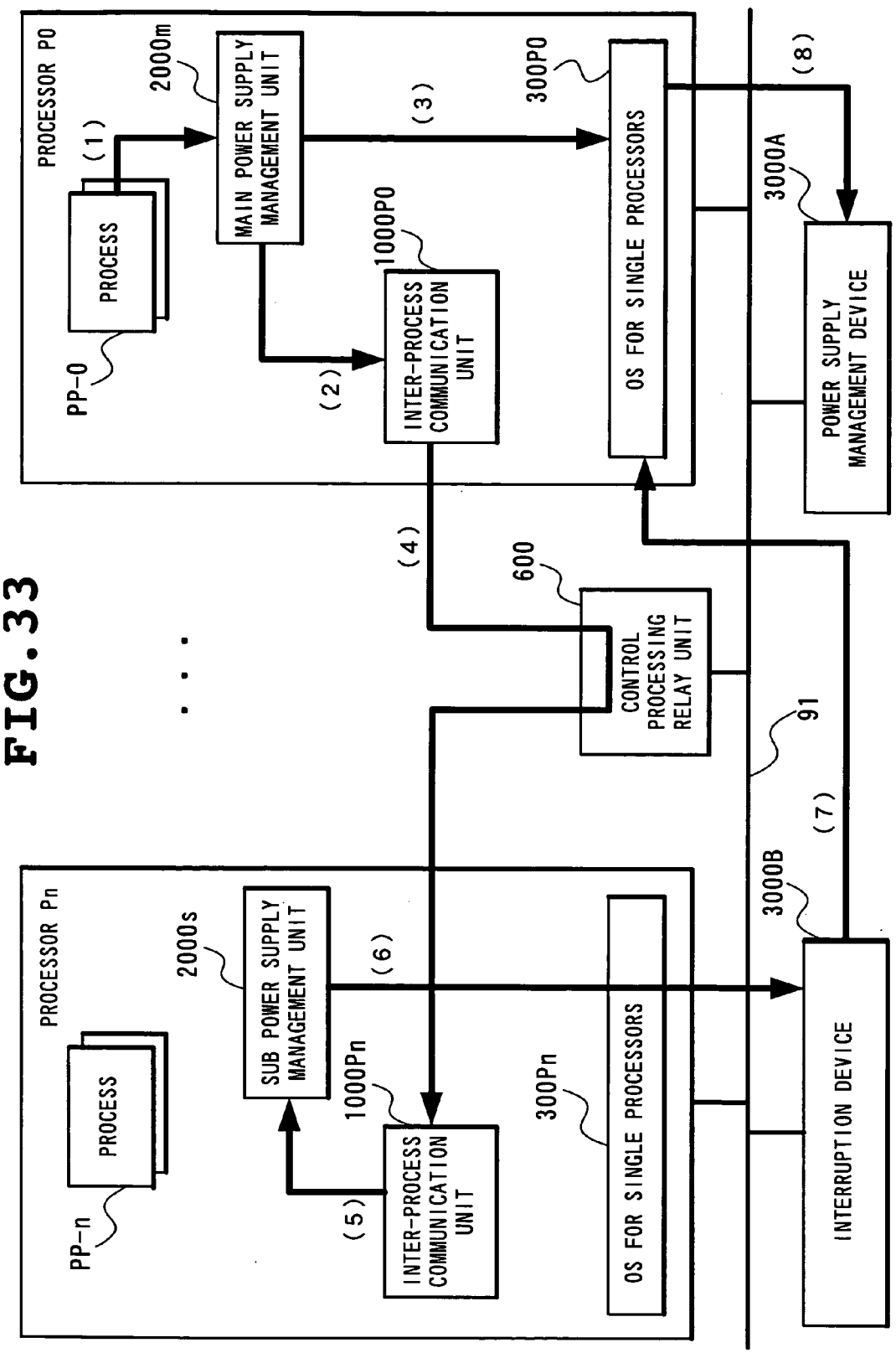
FIG. 33 is a diagram for use in explaining operation of halting all the processors in the first embodiment of the present invention.

In the following, description will be made of operation of halting all the processors P0~Pn including the first processor P0 with reference to FIG. 33.

(1) A process on the processor P0 requests the main power supply management unit 2000m to halt all the processors.

(2) In the confirmation of a state at the time of activation, when there exists a processor at the activated state, the main power supply management unit 2000m transmits a message requesting halt of the processor at the activated state (target processor) to the inter-process communication unit 1000P0. Also change the state of the processor in question to the on the way to stopping state.

(3) The main power supply management unit 2000m of the processor P0 asks the OS 300P0 for single processors to execute halt processing to wait for the halt of the target processor to be completed.

(4) The inter-process communication unit 1000P0 of the processor P0 relays the above-described halt request message to the inter-process communication unit on the target processor via the control processing relay unit 600.

(5) The sub power supply management unit 2000s of the target processor receives the above-described halt request message from the inter-process communication unit.

(6) Subsequently, the sub power supply management unit 2000s on the target processor determines that the message is for a halt request to notify the OS for single processors of the halt processing.

(7) After the completion of the halt processing, the OS for single processors having received the notification notifies the processor P0 of the completion of the processing by using an interruption by the interruption device 3000B of the OS.

(8) The device driver for the power supply management device 3000A of the OS 300P0 for single processors on the processor P0 receives the interruption in question to recognize that the halt processing of the interruption source processor is completed.

(9) Then, turn off the power of the target processor through the power supply management device 3000A of the OS 300P0 for single processors.

(10) When the device driver for the power supply management device 3000A recognizes the completion of all the halt processing in all the processors, turn off the power of the processor P0 through the power supply management device 3000A.

Here, in a case where the processor is not at the activated state but at the on the way to activating state when the halt request is made, refrain from executing the processing until the state makes a transition to the activated state and again execute, when the processor enters the activated state, the processing starting with the processing (2).

In addition, when the processor is at the stopped state or on the way to stopping, ignore the halt request.

Figure 34:
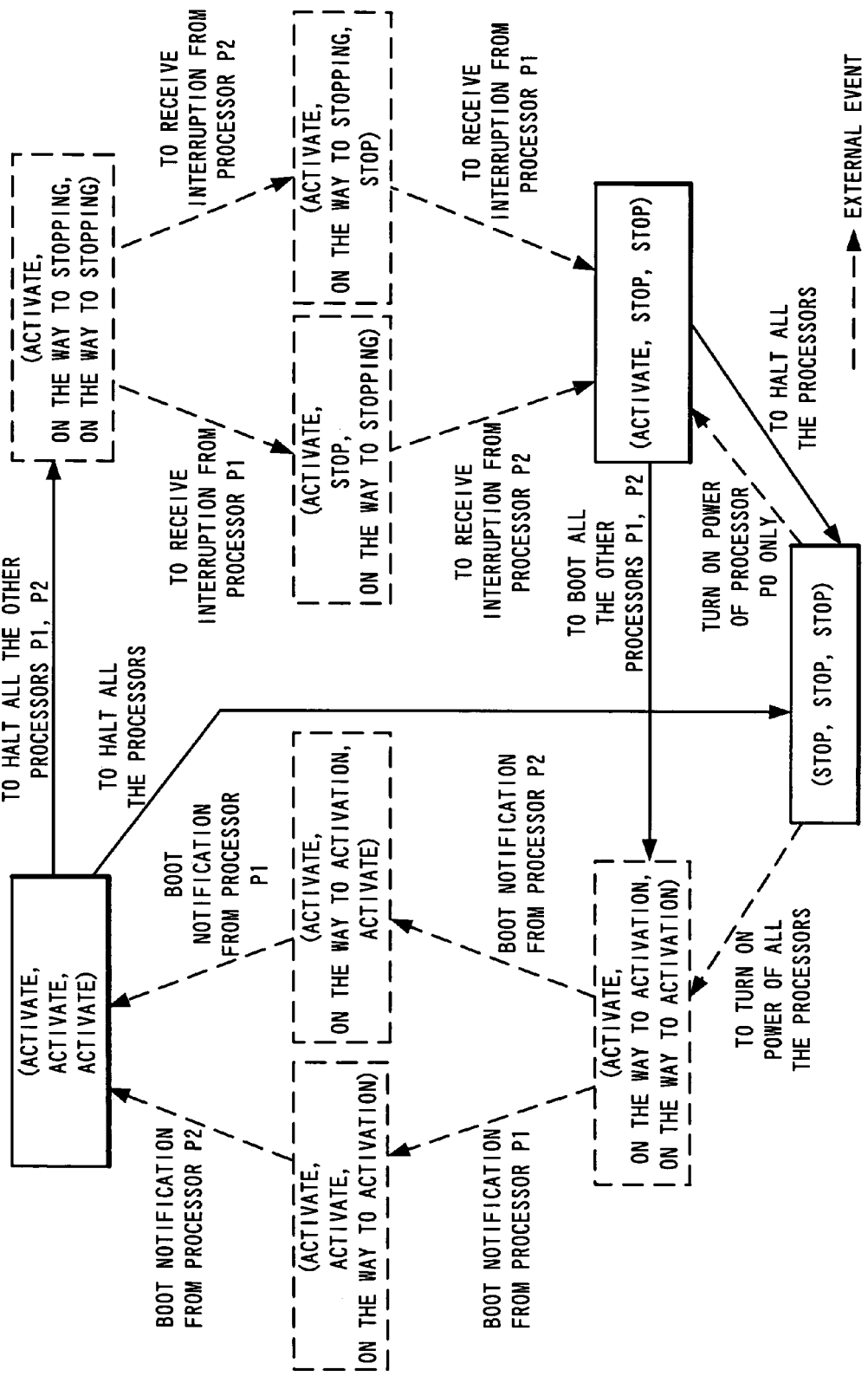
FIG. 34 is a diagram showing state transition of power supply control in a case where the power supply management system according to the first embodiment is applied to a parallel processing system formed of three processors.

FIG. 34 shows state transition of power supply control in a case where the power supply management system according to the first embodiment is applied to the parallel processing system formed of three processors including the first processor P0 and other processors P1 and P2.

Although the foregoing description has been made of a case where power of the processor is turned off or on based on a halt request and a boot request, suspend (inactivate a processor) and resume (return the processor) may be conducted in place of on/off of power supply.

In other times than requesting halt of all the processors, it is possible to conduct suspend (inactivate a processor) and resume (return the processor) as described above to turn off the power at the time of making a halt request for all the processors.

Although the power supply management system according to the first embodiment has been described with respect to a case where power of a processor is turned on/off by the power supply management device 3000A based on the boot and halt requests in a manner as described above, request for changing a power supply voltage and a clock frequency of each processor can be also executed by the same processing as that described above which is conducted is response to a boot request or a halt request. It is for example possible to process a request for changing a power supply voltage of a processor from 0V to an arbitrary volt as a boot request and process a request for changing a power supply voltage from an arbitrary volt to 0V as a halt request.

Figure 35:
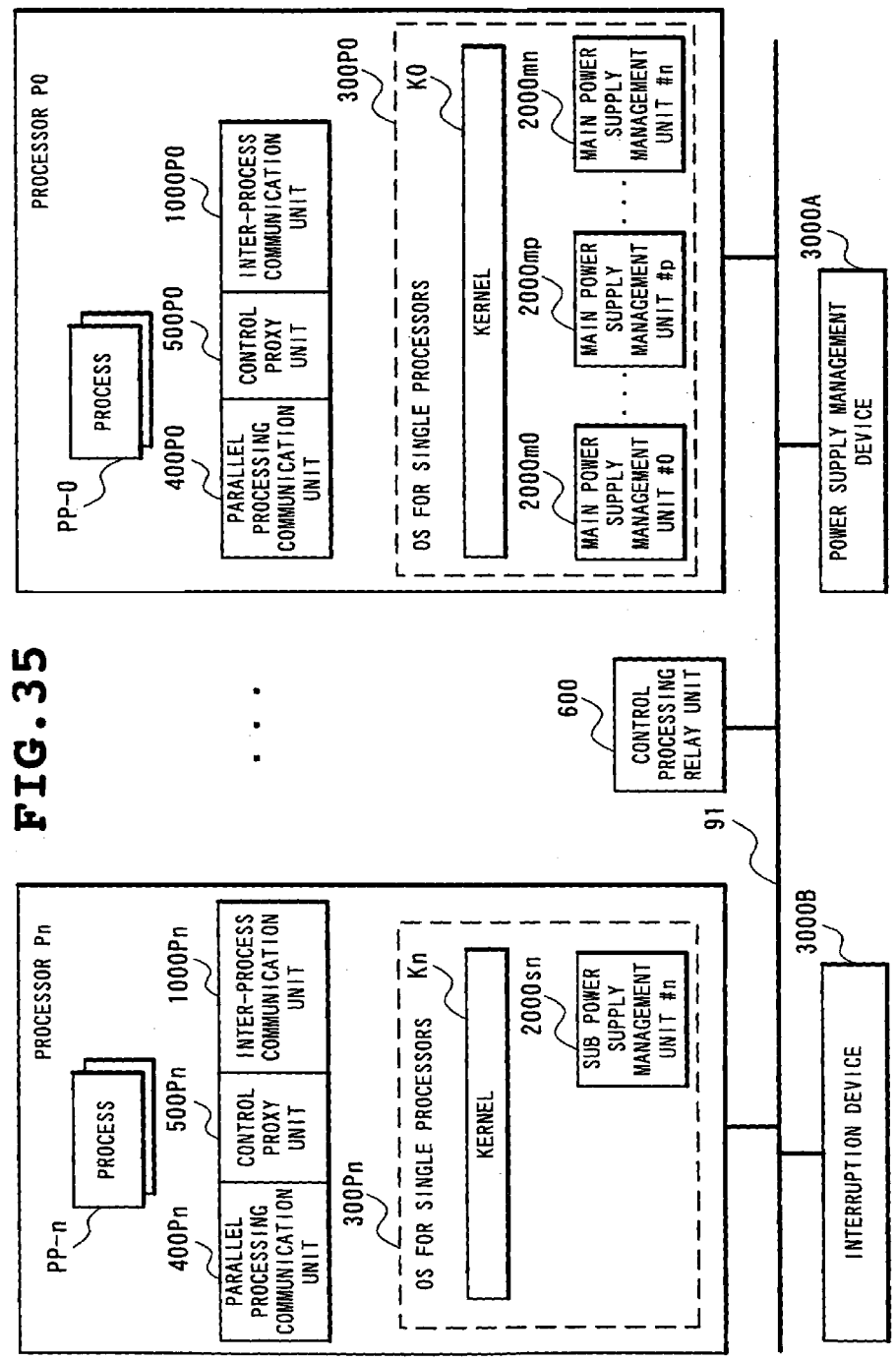
FIG. 35 is a block diagram showing a structure of a power supply management system in a parallel processing system according to a second embodiment of the present invention.

Next, a second embodiment of the power supply management system applied to the parallel processing system will be described with reference to FIG. 35.

As to a main power supply management unit in the power supply management system according to the present embodiment, provided are not the main power supply management unit 2000m which is provided in the first embodiment as a unique process but main power supply management units 2000m0~2000mn corresponding to the respective processors as device drivers which manage power supply state of each processor by making use of the power supply management function provided in the OS 300P0 for single processors of the first processor P0.

These main power supply management units 2000m0~2000mn are mounted as a device driver of the OS 300P0 for single processors, which read and use a predetermined command (request) for device management provided in advance in the OS 300P0 for single processors as a command (request) for power supply management to make a request for changing a power supply state.

For example, commands "probe" and "remove" which are predetermined commands for device management provided in advance in the OS 300P0 for single processors are used as commands for activation and stopping processors, respectively.

As a sub power supply management unit, which is a sub system of kernels K1~Kn provided in the OS P1~Pn for single processors of other processors P1~Pn, sub power supply management units 2000s1~2000sn corresponding to the main power supply management units 2000m1~2000mn provided in the processor P0 are arranged in the processors P1~Pn, respectively. These sub power supply management units 2000s1~2000sn execute processing for changing a power supply state according to a request command from the corresponding main power supply management units 2000m0~2000mn.

Next, operation of the power supply management system according to the second embodiment will be described.

Figure 36:
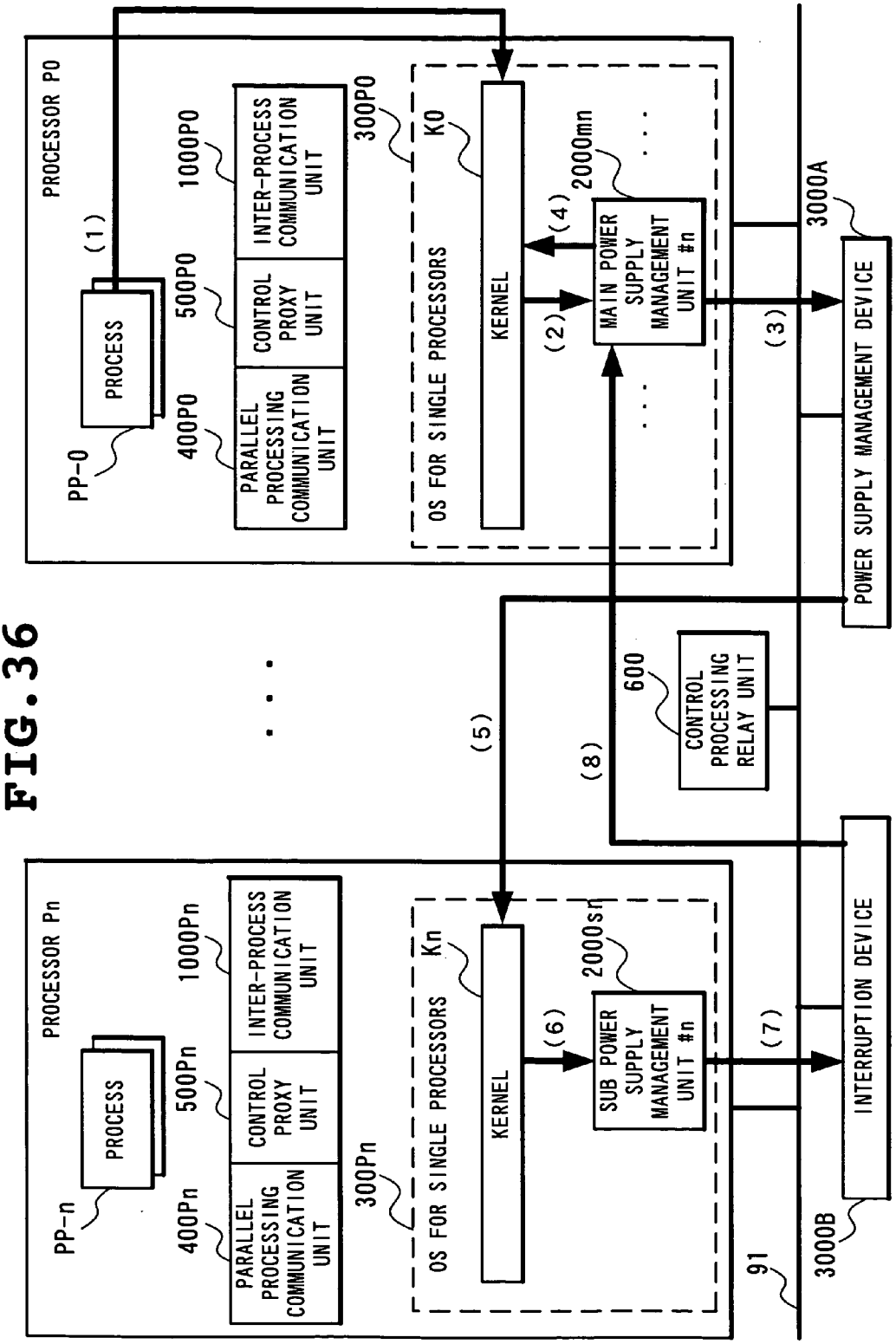
FIG. 36 is a diagram for use in explaining operation of activating a processor in the second embodiment of the present invention.

First, description will be made of operation of activating the processor Pn from a process on the processor P0 with reference to FIG. 36.

(1) The process on the processor P0 requests probing of the processor Pn as a device through a kernel K0 of the OS 300P0 for single processors.

(2) The kernel K0 calls a probe function of the main power supply management unit 2000mn corresponding to the processor Pn.

(3) The main power supply management unit 2000mn accesses the power supply management device 3000A to turn on the power of the processor Pn. Here, the main power supply management unit 2000mn changes the state of the device (state of the processor Pn) to the activated state.

(4) Then, the main power supply management unit 2000mn finishes the processing of the probe function to return the processing to the kernel K0.

(5) By the turning-on of the processor Pn, the kernel Kn on the processor Pn and the sub power supply management unit 2000sn are activated.

(6) The kernel Kn calls an initialization function of the sub power supply management unit 2000sn as a device.

(7) The sub power supply management unit 2000sn accesses the interruption device 3000B by the initialization function to notify the processor P0 of the completion of the activation.

(8) The main power supply management unit 2000mn receives an interruption to change the state of the device (state of the processor Pn) to the activated state.

In the above-described operation, when the activation time of the processor Pn is early, the main power supply management unit 2000mn may execute the processing (4) after waiting for the processing (5) and (8) to be completed without executing the same immediately. When the processor Pn is on the way to activation, ignore the request in question and when it is on the way to stopping, interrupt the processing, and resume the processing when the processor is brought to the stopped state.

The foregoing description has been made of a case where from the process of the processor P0, probe processing and remove processing of one other processor Pn are executed, it is also possible to execute the above-described boot processing and halt processing with respect to each processor in parallel to each other based on a boot request or a halt request of all the other processors P1~Pn or a part (plurality) of other processors.

Moreover, the foregoing description has been made of a case of activating a processor in response to a probe request, returning an inactive processor in response to a resume request, for example, can be realized by the same processing as described above by changing "probe" to "resume".

Next, operation executed when stopping the processor Pn from the process on the processor P0 will be described with reference to FIG. 37.

(1) The process on the processor P0 requests remove of the processor Pn as a device via the kernel K0 of the OS 300P0 for single processors.

(2) The kernel K0 calls a remove function of the main power supply management unit 2000mn corresponding to the processor Pn.

(3) The main power supply management unit 2000mn transmits a remove request to the control processing relay unit 600. Here, the main power supply management unit 2000mn changes the state of the device (state of the processor Pn) to the stopped state.

(4) Then, the main power supply management unit 2000mn finishes the processing of the remove function to return the processing to the kernel K0.

(5) The sub power supply management unit 2000sn of the processor Pn receives the remove request from the control processing relay unit 600.

(6) The sub power supply management unit 2000sn as a device executes processing necessary for a remove request and accesses the interruption device 3000B to notify the processor P0 of the completion of stop.

(7) The main power supply management unit 2000mn receives the interruption to change the state of the device (state of the processor Pn) to the stopped state, as well as accessing the power supply management device 3000A to turn off the power of the processor Pn.

When the stopping time of the processor Pn is early in the above-described operation, the main power supply management unit 2000mn can execute the processing (4) after waiting for the processing (5) to (7) to be completed without executing the processing (4) immediately.

Although the foregoing description has been made of a case of stopping a processor in response to a remove request, bringing a processor at the activated state to an inactive state in response to a suspend request, for example, can be realized by the same processing as described above by changing "remove" to "suspend".

The foregoing description has been made of a case where from the process of the processor P0, the probe processing and the remove processing of one other processor Pn are executed, it is also possible to execute the above-described probe processing and remove processing with respect to each processor in parallel to each other based on a probe request or a remove request of all the other processors P1~Pn or a part (plurality) of other processors.

Furthermore, operation of stopping the processor P0 itself will be described with reference to FIG. 38.

(1) A process on the processor P0 requests remove of the processor P0 as a device through the kernel K0.

(2) The kernel K0 calls a remove function of the main power supply management unit 2000m0.

(3) The main power supply management unit 2000m0 confirms that all the other main power supply management units finish the remove processing to be at the stopped state (confirming that power of the corresponding processors P1~Pn is turned off) and changes the state of the device (state of the processor P0) to the stopped state to execute processing necessary for remove.

(4) The main power supply management unit 2000m0 changes the state of the device (state of the processor P0) to the stopped state and accesses the power supply management device 3000A to turn off the power of the processor P0.

In a case where at the time when a probe request and a remove request are made, a target processor is at a transitional state, it is possible to ignore the requests without receiving all of them, or keep the probe request and the remove request waiting to process these requests after the state of the power of the processor is fixed.

Figure 37:
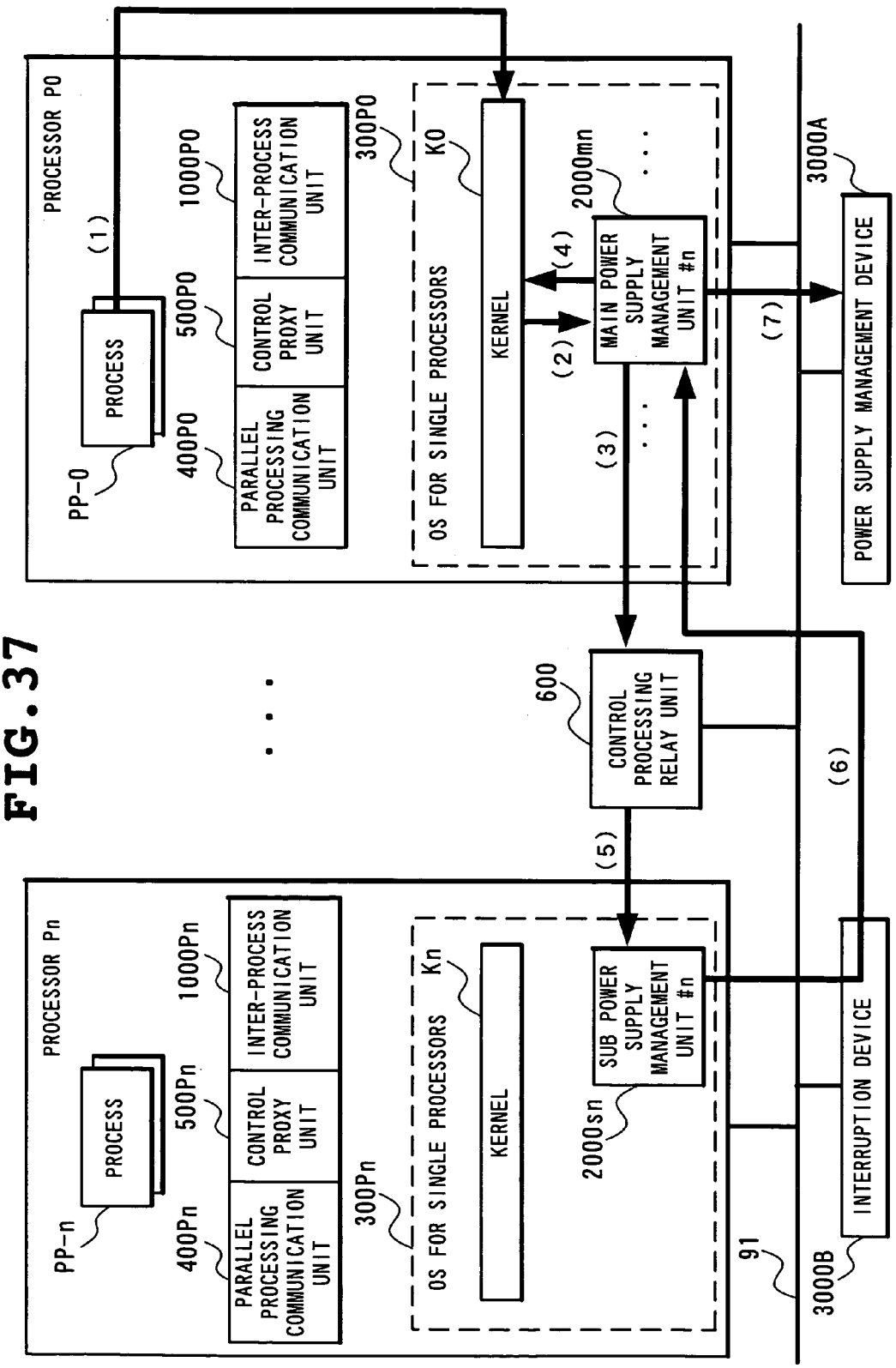
FIG. 37 is a diagram for use in explaining operation of stopping a processor in the second embodiment of the present invention.
Figure 38:
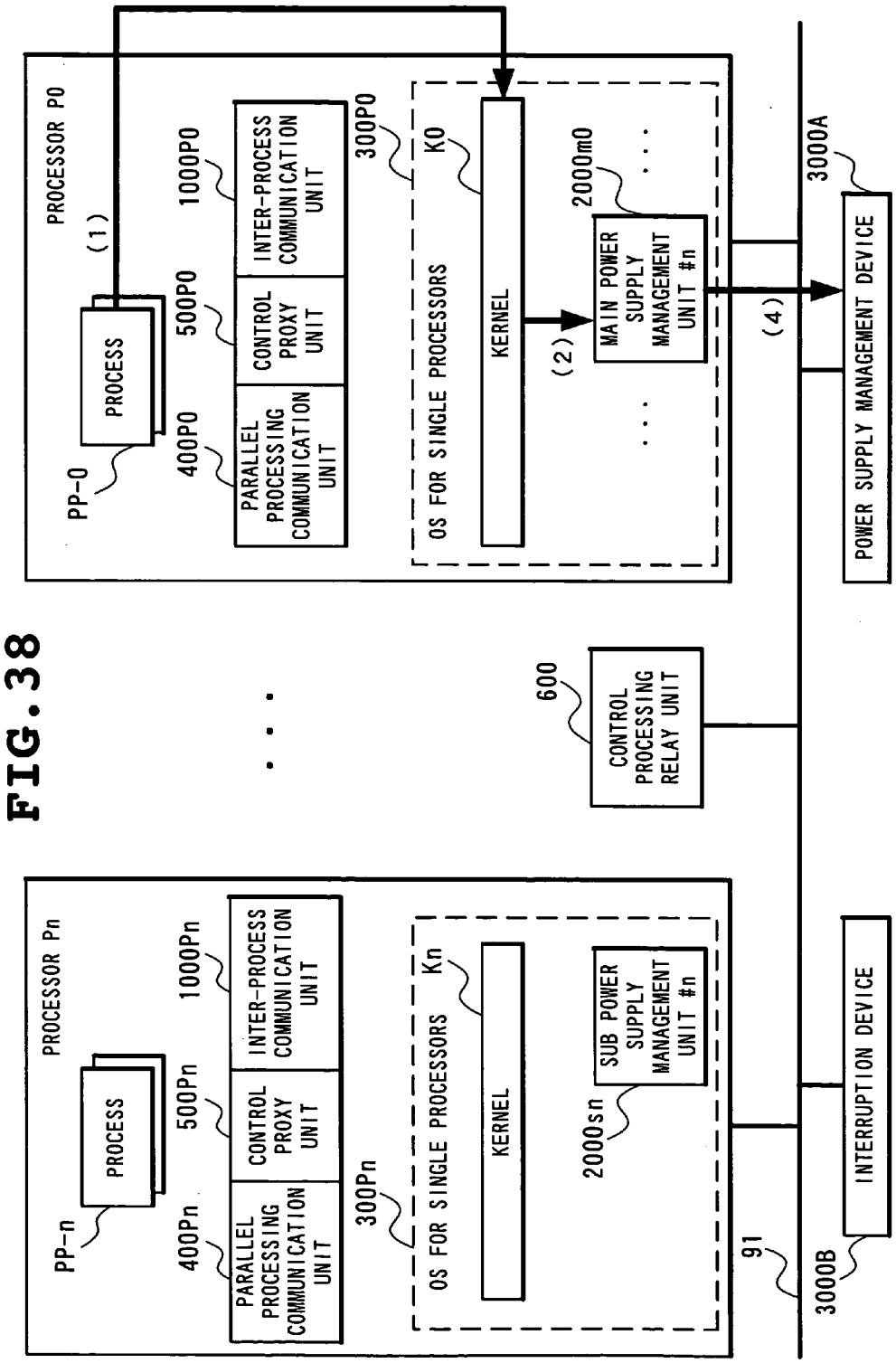
FIG. 38 is a diagram for use in explaining operation of a processor itself when stopping in the second embodiment of the present invention.

In response to remove requests from all the processors, execute the remove processing shown in FIG. 37 with respect to the processors P1~Pn, while execute the processing shown in FIG. 38 with respect to the processor P0.

In the power supply management system according to the second embodiment, a power supply voltage and a clock frequency of each processor may be changed by using a scale request other than the above-described probe, remove, suspend and resume requests.

The above-described first and second embodiments can be similarly applied to other systems than the parallel processing system of the third example. Application of the power supply management systems according to the first and second embodiments of the present invention to the parallel processing systems of the first and second examples can be similarly realized by providing, in each processor, the inter-process communication units 1000P0~1000Pn which enable communication between processes.

In addition, the above-described parallel processing systems according to the respective embodiments can be realized by a parallel processing program having the respective functions of the parallel processing unit, the OS service unit, the control processing relay unit, the proxy unit and the inter-process communication unit and the power supply management system can be realized as well by a power supply management program having the functions of the main power supply management unit and the sub power supply management unit. These programs are stored in a magnetic disk, a semiconductor memory or other recording medium, and loaded from the recording medium onto a computer processing device to control the operation of the computer processing device, thereby realizing the above-described respective functions.

Although the present invention has been described with respect to the preferred embodiments and specific examples in the foregoing, the present invention is not necessarily limited to the above-mentioned embodiments and specific examples and may be implemented in variations within the scope of its technical idea.

As described in the foregoing, in a parallel processing system by an OS for single processors in which an OS and an existing application for single processors are operated on a multiprocessor without modifying them to enable the existing application to realize parallel processing by the multiprocessor, the present invention enables power supply management with simple control without requiring complicated control as is required in a parallel processing system by an OS for multiprocessors and without requiring drastic modification of the OS.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A power supply management system in a parallel processing system by an OS for single processors, wherein
on a parallel processing system which
operates an OS and an application for single processors on a multiprocessor,
said multiprocessor being logically divided into two groups of a first processor side and a second processor side, and
controls a unit of work that can be parallelized within said application operating on a processor on said first processor side as a new unit of work on a processor on said second processor side, thereby executing parallel processing by said multiprocessor with respect to said application,
the processor on said first processor side accepts a request for activating or stopping a processor from a unit of work on any of the processors and controls a device of said OS for single processors to activate or stop the requested processor, and
said processor requested to be activated or stopped executes processing necessary for said activation or stop based on a notification from said first processor side,
wherein further comprising
on said first processor side a main power supply management unit having a function, regarding power supply management of each processor, of managing a state of power supply of said second processor side and a function of making a request for changing a power supply state to said OS for single processors, and
on said second processor side, a sub power supply, management unit having a function of executing processing necessary for said activation or stop and a function of making a request for activation or stop of other processor to said main power supply management unit.

2. The power supply management system in a parallel processing system by an OS for single processors as set forth in claim 1, wherein
said request for activation or stop of the processor is a boot request or a halt request.

3. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors, and
on said second processor side, a sub power supply management unit having a function of executing processing necessary for said activation or stop and a function of making a request for activation or stop of an other processor to said main power supply management unit, wherein
said request for activation or stop of the processor is a boot request or a halt request.

4. The power supply management system in a parallel processing system by an OS for single processors as set forth in claim 1, comprising:
a main power supply management unit which is mounted, as a device of said OS for single processors, on said OS for single processors on said first processor side to manage a state of power supply of said second processor side, as well as using a predetermined request for device management provided in advance in the OS for single processors as a request for power supply management to make a request for changing a state of power supply, and
a sub power supply management unit provided in said OS for single processors on said second processor side to execute processing necessary for said activation or stop, as well as transmitting an activation message to said main power supply management unit at the time of activation.

5. The power supply management system in a parallel processing system by an OS for single processors as set forth in claim 4, wherein
a plurality of said main power supply management units are provided corresponding to the respective processors on said second processor side.

6. The power supply management system in a parallel processing system by an OS for single processors as set forth in claim 4, wherein
a probe or remove request which is a predetermined request for device management is read as said request for activation or stop of the processor.

7. The power supply management system in a parallel processing system by an OS for single processors as set forth in claim 4, wherein
a plurality of said main power supply management units are provided corresponding to the respective processors on said second processor side, and
a probe or remove request which is a predetermined request for device management is read as said request for activation or stop of the processor.

8. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors,
on said second processor side, a sub power supply management unit having a function of executing processing necessary for said activation or stop and a function of making a request for activation or stop of other processor to said main power supply management unit, and
an inter-process communication unit provided in the processor on said first processor side and in the processor on said second processor side to enable synchronous processing and data transmission and reception between units of work on the processor on said first processor side and on the processor on said second processor side, wherein
said inter-process communication unit executes synchronous processing for power supply management between said main power supply management unit and said sub power supply management unit.

9. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors, and
on said second processor side, a sub power supply management unit having a function of executing processing necessary for said activation or stop and a function of making a request for activation or stop of an other processor to said main power supply management unit, said main power supply management unit and said sub power supply management unit being incorporated as a module.

10. The power supply management system in a parallel processing system by an OS for single processors as set forth in claim 1, wherein
when said processor to which said request for activation or stop is made is on the way to activation or on the way to stopping, said request is queued until said on the way to activation or stopping state is fixed.

11. The power supply management system in a parallel processing system by an OS for single processors as set forth in claim 1, wherein
when said processor to which said request for activation or stop is made is on the way to activation or on the way to stopping, said request is ignored.

12. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors, and
on said second processor side, a sub power supply management unit having a function of executing processing necessary for said activation or stop and a function of making a request for activation or stop of an other processor to said main power supply management unit, wherein
in making said processor activation request, said main power supply management unit having received the request activates the requested processor,
as well as receiving a notification of completion of activation from said sub power supply management unit of the activated processor to change the state of power supply of said activated processor to an activated state.

13. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors, and
on said second processor side, a sub power supply management unit having a function of executing processing necessary for said activation or stop and a function of making a request for activation or stop of an other processor to said main power supply management unit, wherein
in making said processor stop request, said main power supply management unit having received the request requests said sub power supply management unit of the requested processor to execute processing necessary for stopping,
and receives a notification of completion of the processing from said processor to stop said requested processor and change the state of power supply of said activated processor to a stopped state.

14. The power supply management system in a parallel processing system by an OS for single processors as set forth in claim 1, comprising:
on said first processor side, a main power supply management unit having a function, regarding power supply management of each processor, of managing a state of power supply of said second processor side and a function of making a request for changing a power supply state to said OS for single processors, and on said second processor side, a sub power supply management unit having a function of executing processing necessary for said activation or stop and a function of making a request for activation or stop of an other processor to said main power supply management unit, wherein in making a request for stopping all the processors, said main power supply management unit having received the request requests said sub power supply management unit of other processor to execute processing necessary for stopping, and receives a notification of completion of the processing from said other processor to stop said other processor and thereafter controls the device of said OS for single processors to stop the processor to which the unit belongs.

15. The power supply management system in a parallel processing system by an OS for single processors as set forth in claim 1, wherein in addition to activation or stop of a processor, a request for halting or returning a processor is received to control the device of said OS for single processors, thereby halting or returning the requested processor, and a processor requested to make said halt or return executes processing necessary for said halt or return based on a notification from said first processor side.

16. The power supply management system in a parallel processing system by an OS for single processors as set forth in claim 1, wherein in addition to activation or stop of a processor, a request for changing a power supply voltage or a clock frequency of a processor is received to control the device of said OS for single processors, thereby changing the power supply voltage or the clock frequency of the requested processor, and the processor requested to have said power supply voltage or clock frequency changed executes processing necessary for changing said power supply voltage or clock frequency based on a notification from said first processor side.

17. A power supply management program in a parallel processing system by an OS for single processors, wherein on a parallel processing system which operates an OS and an application for single processors on a multiprocessor, said multiprocessor being logically divided into two groups of a first processor side and a second processor side, and controls a unit of work that can be parallelized within said application operating on a processor on said first processor side as a new unit of work on a processor on said second processor side, thereby executing parallel processing by said multiprocessor with respect to said application, one processor on said first processor side accepts a request for activating or stopping a processor from a unit of work on any of the processors and controls a device of said OS for single processors to execute a function of activating or stopping the requested processor, and said processor requested to be activated or stopped executes a function of executing processing necessary for said activation or stop based on a notification from said one processor, wherein further comprising on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of other processor to said main power supply management program.

18. The power supply management program in a parallel processing system by an OS for single processors as set forth in claim 17, wherein said request for activation or stop of the processor is a boot request or a halt request.

19. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of an other processor to said main power supply management program, wherein said request for activation or stop of the processor is a boot request or a halt request.

20. The power supply management program in a parallel processing system by an OS for single processors as set forth in claim 17, comprising:

a main power supply management program which is mounted, as a device of said OS for single processors, on said OS for single processors on said first processor side to manage a state of power supply of said second processor side, as well as using a predetermined request for device management provided in advance in the OS for single processors as a request for power supply management to make a request for changing a state of power supply, and a sub power supply management program provided in said OS for single processors on said second processor side to execute processing necessary for said activation or stop, as well as transmitting an activation message to said main power supply management program at the time of activation.

21. The power supply management program in a parallel processing system by an OS for single processors as set forth in claim 20, a probe or remove request which is a predetermined request for device management is read as said request for activation or stop of the processor.

22. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, on said second processor side, a sub power supply management program having a function of executing processing necessary for said activation or stop and a function of making a request for activation or stop of another processor to said main power supply management program, and an inter-process communication unit provided in the processor on said first processor side and in the processor on said second processor side to enable synchronous processing and data transmission and reception between units of work on the processor on said first processor side and on the processor on said second processor side, wherein said inter-process communication unit executes synchronous processing for power supply management between said main power supply management program and said sub power supply management program.

23. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of another processor to said main power supply management program, said main power supply management program and said sub power supply management program being incorporated as a module.

24. The power supply management program in a parallel processing system by an OS for single processors as set forth in claim 17, wherein when said processor to which said request for activation or stop is made is on the way to activation or on the way to stopping, said request is queued until said on the way to activation or stopping state is fixed.

25. The power supply management program in a parallel processing system by an OS for single processors as set forth in claim 17, wherein when said processor to which said request for activation or stop is made is on the way to activation or on the way to stopping, said request is ignored.

26. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of another processor to said main power supply management program, wherein in making said processor activation request, said main power supply management program having received the request activates the requested processor, as well as receiving a notification of completion of activation from said sub power supply management program of the activated processor to change the state of power supply of said activated processor to an activated state.

27. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of another processor to said main power supply management program, wherein in making said processor stop request, said main power supply management program having received the request requests said sub power supply management program of the requested processor to execute processing necessary for stopping, and receives a notification of completion of the processing from said processor to stop said requested processor and change the state of power supply of said activated processor to a stopped state.

28. The power supply management program in a parallel processing system by an OS for single processors as set forth in claim 17, comprising:

on said first processor side, a main power supply management program having a function, regarding power supply management of each processor, of managing a state of power supply of said second processor side and a function of making a request for changing a power supply state to said OS for single processors, and on said second processor side, a sub power supply management program having a function of executing processing necessary for said activation or stop and a function of making a request for activation or stop of another processor to said main power supply management program, wherein in making a request for stopping all the processors, said main power supply management program having received the request requests said sub power supply management program of said other processor to execute processing necessary for stopping, and receives a notification of completion of the processing from said other processor to stop said other processor and thereafter controls the device of said OS for single processors to stop the processor to which the program belongs.

29. The power supply management program in a parallel processing system by an OS for single processors as set forth in claim 17, wherein in addition to activation or stop of a processor, a request for halting or returning a processor is received to control the device of said OS for single processors, thereby halting or returning the requested processor, and a processor requested to make said halt or return executes processing necessary for said halt or return based on a notification from said first processor side.

30. The power supply management program in a parallel processing system by an OS for single processors as set forth in claim 17, wherein in addition to activation or stop of a processor, a request for changing a power supply voltage or a clock frequency of a processor is received to control the device of said OS for single processors, thereby changing the power supply voltage or the clock frequency of the requested processor, and the processor requested to have said power supply voltage or clock frequency changed executes processing necessary for changing said power supply voltage or clock frequency based on a notification from said first processor side.

31. A power supply management system in a parallel processing system by an OS for single processors, wherein on a parallel processing system which operates an OS and an application for single processors on a multiprocessor, and controls a unit of work that can be parallelized within said application operating on one processor as a new unit of work on an other processor, thereby executing parallel processing by said multiprocessor with respect to said application, said one processor accepts a request for activating or stopping a processor from a unit of work on any of the processors and controls a device of said OS for single processors to activate or stop the requested processor, and said processor requested to be activated or stopped executes processing necessary for said activation or stop based on a notification from said one processors, wherein further comprising on a side of said one processor, a main power supply management unit having a function, regarding power supply management of each processor, of managing a state of power supply of said second processor side and a function of making a request for changing a power supply state to said OS for single processors, and on a side of said processor requested to be activated or stopped, a sub power supply management unit having a function of executing processing necessary for said activation or stop and a function of making a request for activation or stop of other processor to said main power supply management unit.

* * * * *